(12) United States Patent
Endo et al.

(10) Patent No.: US 8,476,609 B2
(45) Date of Patent: Jul. 2, 2013

(54) EXTREME ULTRAVIOLET LIGHT SOURCE DEVICE, LASER LIGHT SOURCE DEVICE FOR EXTREME ULTRAVIOLET LIGHT SOURCE DEVICE, AND METHOD FOR CONTROLLING SATURABLE ABSORBER USED IN EXTREME ULTRAVIOLET LIGHT SOURCE DEVICE

(75) Inventors: Akira Endo, Jena (DE); Krzysztof Nowak, Hiratsuka (JP); Hideo Hoshino, Hiratsuka (JP); Tatsuya Ariga, Hiratsuka (JP); Masato Moriya, Hiratsuka (JP); Osamu Wakabayashi, Hiratsuka (JP)

(73) Assignee: Gigaphoton Inc., Tochigi (JP)

( * ) Notice: Subject to any disclaimer, the term of this patent is extended or adjusted under 35 U.S.C. 154(b) by 0 days.

(21) Appl. No.: 13/306,358

(22) Filed: Nov. 29, 2011

(65) Prior Publication Data
US 2012/0068091 A1    Mar. 22, 2012

Related U.S. Application Data

(63) Continuation of application No. 12/566,865, filed on Sep. 25, 2009, now Pat. No. 8,093,571.

(30) Foreign Application Priority Data

Sep. 26, 2008 (JP) .................. 2008-249186
Sep. 17, 2009 (JP) .................. 2009-216203

(51) Int. Cl.
*G02B 26/02* (2006.01)
(52) U.S. Cl.
CPC ..................... *G02B 26/02* (2013.01)
USPC ............................ 250/504 R; 372/22; 372/34

(58) Field of Classification Search
USPC ................ 250/504 R, 493.1; 372/22, 34, 92, 372/98, 99
See application file for complete search history.

(56) References Cited

U.S. PATENT DOCUMENTS

| 3,638,137 A | 1/1972 | Krupke |
| 4,143,332 A | 3/1979 | Michon et al. |

(Continued)

FOREIGN PATENT DOCUMENTS

| JP | 2006-128157 | | 5/2006 |
| JP | 2008-270549 | A | 11/2008 |
| JP | 2009-026854 | A | 2/2009 |

OTHER PUBLICATIONS

Rechard F. Haglund et al. "Gaseous Saturable Absorbers for the Helios CO2 Laser System", IEEE Journal of Quantum Electronics, 1981, vol. 17 Issue9, pp. 1799-1808.

(Continued)

*Primary Examiner* — Kiet T Nguyen
(74) *Attorney, Agent, or Firm* — McDermott Will & Emery LLP

(57) ABSTRACT

An EUV light source of the present invention is capable of using a saturable absorber stably and continuously in a high heat load state. A saturable absorber (SA) device is disposed on a laser beam line to absorb feeble light, such as self-excited oscillation light, parasitic oscillation light or return light. SA gas from an SA gas cylinder and buffer gas from a buffer gas cylinder are mixed to be a mixed gas. The mixed gas is supplied to an SA gas cell via a supply pipeline, and absorbs the feeble light included in the laser beam. The mixed gas is exhausted via an exhaust pipeline, and is sent to a heat exchanger. The mixed gas, cooled down by a heat exchanger, is sent back to the SA gas cell by a circulation pump.

20 Claims, 38 Drawing Sheets

U.S. PATENT DOCUMENTS

| | | | |
|---|---|---|---|
| 4,399,011 A | | 8/1983 | Hsu et al. |
| 4,499,582 A | | 2/1985 | Karning et al. |
| 5,163,315 A | | 11/1992 | Asai et al. |
| 5,335,245 A | | 8/1994 | Marie et al. |
| 5,434,875 A | | 7/1995 | Rieger et al. |
| 5,495,494 A | * | 2/1996 | Molva et al. ............ 372/98 |
| 5,559,823 A | * | 9/1996 | Valette .................. 372/92 |
| 5,698,120 A | | 12/1997 | Kurosawa et al. |
| 6,002,697 A | | 12/1999 | Govorkov et al. |
| 7,317,196 B2 | | 1/2008 | Partlo et al. |
| 7,352,463 B2 | | 4/2008 | Bounaix |
| 7,903,715 B2 | | 3/2011 | Nowak et al. |
| 7,916,388 B2 | | 3/2011 | Bykanov et al. |
| 7,928,416 B2 | | 4/2011 | Fomenkov |
| 8,000,361 B2 | | 8/2011 | Abe et al. |
| 2005/0025407 A1 | | 2/2005 | Wang et al. |
| 2006/0225534 A1 | | 10/2006 | Swihart et al. |
| 2007/0001131 A1 | | 1/2007 | Ershov et al. |
| 2008/0069157 A1 | | 3/2008 | Ariga et al. |
| 2008/0181268 A1 | | 7/2008 | Dubois et al. |
| 2010/0078577 A1 | | 4/2010 | Moriya et al. |

OTHER PUBLICATIONS

P. Woskoboinikow et al. "Saturable gas absorber for a 9-μm-band $CO_2$-laser amplifier", Optics Letters, Jul. 1979, vol. 4, No. 7, pp. 199-201.

* cited by examiner

EXTREME ULTRAVIOLET LIGHT SOURCE DEVICE, LASER LIGHT SOURCE DEVICE FOR EXTREME ULTRAVIOLET LIGHT SOURCE DEVICE, AND METHOD FOR CONTROLLING SATURABLE ABSORBER USED IN EXTREME ULTRAVIOLET LIGHT SOURCE DEVICE

RELATED APPLICATIONS

This application is a Continuation of U.S. application Ser. No. 12/566,865, filed on Sep. 25, 2009, now U.S. Pat. No. 8,093,571, claiming priority of Japanese Patent Application Nos. 2008-249186, filed on Sep. 26, 2008 and 2009-216203, filed on Sep. 17, 2009, the entire contents of each of which are hereby incorporated by reference.

BACKGROUND OF THE INVENTION

1. Field of the Invention

The present invention relates to an extreme ultraviolet light source device, a laser light source device for the extreme ultraviolet light source device, and a method for adjusting the laser light source device for an extreme ultraviolet light source device.

2. Description of the Related Art

A semiconductor chip is created, for example, by reduction projection of a mask, on which a circuit pattern is drawn, onto a wafer coated with resist, and repeating such processing as etching and thin film deposition. As semiconductor processing increases the degree of miniaturization, light with an even shorter wavelength is demanded.

To meet this demand, a semiconductor exposure technology for using light with an extremely short wavelength, 13.5 nm, and a reduction optical system, is under consideration. This technology is called EUVL (Extreme Ultraviolet Lithography). Hereafter extreme ultraviolet light is referred to as "EUV light".

As the EUV light source, an LPP (Laser Produced Plasma) light source, a DPP (Discharge Produced Plasma) light source and an SR (Synchrotron Radiation) light source are known.

The LPP light source is a light source which generates plasma by irradiating a laser beam onto a target material, and using the EUV light radiated from this plasma. The DPP light source is a laser source which uses plasma generated by discharge. And the SR light source is a light source using orbital radiation light. Among these three types of light sources, the LPP light source has a high possibility to provide high output EUV light, since the plasma density can be increased and a solid angle for collection can be increased more than the other types.

In order to obtain a high output driver laser beam at a high repetition rate, a laser light source device constituted based on an MOPA (Master Oscillator Power Amplifier) system has been proposed (Japanese Patent Application Laid-Open No. 2006-128157).

In the LPP light source, a saturable absorber can be used so that a laser beam, reflected by the target material in the chamber and returned to the optical path (so called "return light"), parasitic oscillation light and self-excited oscillation light in the amplifier are absorbed.

The saturable absorber has a characteristic to absorb a laser beam having an intensity less than a predetermined value. By using a saturable absorber, damage to an amplifier and laser oscillator can be prevented, and the quality of a laser beam can be increased by removing small pulses called "pedestals".

A technology on a saturable absorber is known, however which is not a prior art on an extreme ultraviolet light source (U.S. Pat. No. 3,638,137).

For an extreme ultraviolet light source device, a carbon dioxide laser (hereafter $CO_2$ laser) is used at high output (pulse energy 100 to 200 mJ) at high repetition rate (10 to 200 kHz). An extreme ultraviolet light source device is demanded to have a capability to supply a laser beam having stable pulse energy and pulse waveforms for a long time.

In order to use a $CO_2$ pulse laser stably for a long time in such a high load state (state where high repetition rate and high pulse energy are required), oscillation due to parasitic oscillation, self-excited oscillation and return light must be suppressed. A possible method is to dispose a saturable absorber on the optical path of the laser beam in order to prevent the parasitic oscillation and self-excited oscillation so that the pulse energy and pulse waveform are stabilized.

In the prior art (U.S. Pat. No. 3,638,137), however, an object of the art is not using a saturable absorber in order to stably use a high output $CO_2$ pulse laser for a long time. Therefore in this prior art, a gas cell is disposed in a resonator of the $CO_2$ laser, and a cylinder of $SF_6$ (sulfur hexafluoride) and a cylinder of $C_2F_3$ are connected to the gas cell, so as to supply a mixed gas (saturable absorber gas) of $SF_6$ and $C_2F_3$ to the gas cell. The mixed gas supplied to the gas cell absorbs a laser beam less than a predetermined value emits heat, and then is exhausted from the gas cell.

In the prior art, parasitic oscillation, self-excited oscillation or oscillation due to return light can be prevented by supplying mixed gas to the gas cell until gas in each cylinder is emptied. However the amount of gas that can be stored in a gas cylinder is limited, and the mixed gas that is once used is exhausted, so gas in each gas cylinder will eventually be used up. Once each gas cylinder is emptied and can no longer supply mixed gas to the gas cell, the gas cell cannot normally perform the expected function.

It is also possible to seal the mixed gas in the gas cell, or to decrease the flow rate of the mixed gas supplied to the gas cell. In these cases, however, the temperature of the mixed gas in the gas cell rises when the laser beam passes through, and the mixed gas decomposes and can no longer play the role of a saturable absorber. In this way, the problem of the prior art is that the saturable absorber gas cell cannot be operated stably for a long time.

SUMMARY OF THE INVENTION

With the foregoing in view, it is an object of the present invention to provide an extreme ultraviolet light source device, a laser light source device for the extreme ultraviolet light source device and an extreme ultraviolet light source device, which can stably operate the saturable absorber cell for a long time and a method for controlling the saturable absorber used thereof. It is another object of the present invention to provide: an extreme ultraviolet light source device, a laser light source device for the extreme ultraviolet light source device and an extreme ultraviolet light source device, which can stably operate the saturable absorber cell for a long time, and further which can correct the direction and wavefront profile of the laser beam to be a predetermined direction and predetermined shape of wavefront profile by adjusting the wavefront of the laser beam that passes through the saturable absorber cell to be axially symmetric; and a device and method for controlling or stabilizing the saturable absorber used thereof. Other objects of the present invention will be clarified by description of the embodiments herein below.

To solve the above problems, an extreme ultraviolet light source device according to a first aspect of the present invention is an extreme ultraviolet light source device for generating extreme ultraviolet light, the device including: a target material supply unit for supplying target material into a chamber; a laser oscillator for outputting a pulse laser beam; at least two amplifiers for amplifying the laser beam that is output from the laser oscillator; a focusing optical system for irradiating the laser beam onto the target material by focusing the laser beam, which is amplified by the amplifier, to a predetermined position in the chamber; and a saturable absorber device, disposed on an optical path between the laser oscillator and the predetermined position, for absorbing at least a laser beam having light intensity not greater than a predetermined value and suppressing laser beam transmission. The saturable absorber device includes: a saturable absorber cell having an input window that is disposed in an input side for the laser beam to enter, an output window that is disposed in an output side for the laser beam to be output, a flow space that is formed between the windows where the saturable absorber flows, an inlet for letting the saturable absorber enter the flow space, and an outlet for letting the saturable absorber out from the flow space; a pipeline for connecting the inlet and the outlet; a transport unit, disposed in the middle of the pipeline, for transporting the saturable absorber that flows out of the outlet, so as to flow into the flow space via the inlet; and a temperature adjustment unit, disposed in the middle of the pipeline, for adjusting temperature of the saturable absorber transported by the transporting unit.

According to a second aspect, in the first aspect, the saturable absorber cell includes: an input window that is disposed on an input side where the output laser beam of the laser oscillator enters; an output window that is disposed on an output side where the output laser beam of the laser oscillator is output; the flow space formed between the windows; the inlet; and the outlet.

According to the third aspect, in the first aspect, the inlet and the outlet are disposed so that the flow of the saturable absorber in the flow space becomes approximately symmetric with respect to an optical axis of the laser beam that passes through the flow space.

According to the fourth aspect, in the first aspect, the inlet and the outlet are disposed so that the flow of the saturable absorber in the flow space becomes approximately symmetric with respect to an optical axis of the laser beam that passes between the windows.

According to the fifth aspect, in the second aspect, the inlet or the outlet is disposed near each window, so that the saturable absorber flows on an inner face side of each of the windows and the saturable absorber moves along the optical axis of the laser beam between the windows.

According to the sixth aspect, in the second aspect, the inlet is disposed on the input window side and the output window side respectively, and the outlet is disposed between the windows.

According to the seventh aspect, in the second aspect, the outlet is disposed on the input window side and the output window side respectively, and the inlet is disposed approximately at the center between the windows.

According to the eighth aspect, in the sixth aspect, the inlet is disposed inclined toward the center of the inner face of each window.

According to the ninth aspect, in the seventh aspect, the outlet is disposed inclined toward the center of the inner face of each window.

According to the tenth aspect, in the second aspect, each window is formed to be circular, a plurality of inlets are disposed on the input window side and the output window side respectively, so as to be axially symmetric with respect to the optical axis of the laser beam that passes between the windows, each inlet disposed on the input window side is disposed in parallel with a tangential line direction of the input window, and each inlet disposed on the output window side is disposed in parallel with a tangential line direction of the output window, and a plurality of outlets are disposed between the windows so as to be axially symmetric with respect to the optical axis of the laser beam.

According to the eleventh aspect, in the second aspect, each windows is formed to be circular, a plurality of outlets are disposed on the input window side and the output window side respectively, so as to be symmetric with respect to the laser beam passing between the windows, each outlets disposed on the input window side is disposed in parallel with a tangential line direction of the input window, and each outlet disposed on the output windows side is disposed in parallel with a tangential line direction of the output window, and a plurality of inlets are disposed between the windows so as to be symmetric with respect to the laser beam.

According to the twelfth aspect, in the second aspect, each window is formed to be circular, a plurality of outlets are disposed on the input window side and the output window side respectively, so as to be axially symmetric with respect to the optical axis of the laser beam that passes between the windows, and a plurality of inlets are disposed between the windows so as to be axially symmetric with respect to the optical axis of the laser beam, and a flow control member, in which a plurality of flow holes for letting the saturable absorber flow are formed, is disposed between an outer circumference of the inner face side of each window and each outlet.

According to the thirteenth aspect, in the twelfth aspect, the flow control member comprises: a tubular member which is disposed coaxially in each window, and one edge of which is disposed on the inner face side of each window, and which has the flow hole individually; and a ring-shaped collar portion that covers an area between the other edge of the tubular member and an inner wall portion of the flow space, so that the saturable absorber does not flow into each outlet from an area other than each flow hole.

According to the fourteenth aspect, in the first aspect, a plurality of the saturable absorber cells are disposed, such that a flow direction of the saturation absorber in one saturable absorber cell and a flow direction of the saturated absorber in the other saturable absorber cell are opposite from each other.

According to the fifteenth aspect, in the first aspect, the input windows and the output window are constituted by a common window, and a reflection optical system for reflecting the output laser beam of the laser oscillator that enters from the common window and letting the laser beam output from the common window is disposed in the flow space.

According to the sixteenth aspect, in any of the first to fifteenth aspects, the extreme ultraviolet light source device further comprises a wavefront compensation device for compensating a wavefront of the laser beam that passes the saturable absorber device.

According to the seventeenth aspect, in the sixteenth aspect, the wavefront compensation device includes: a wavefront measurement unit for directly or indirectly measuring a direction and a wavefront profile of the laser beam; a wavefront compensation unit for compensating the direction and the wavefront profile of the laser beam to be a predetermined direction and a predetermined wavefront profile; and a wavefront control unit for operating the wavefront compensation unit based on a measurement result from the wavefront measurement unit.

According to the eighteenth aspect, in the first aspect, the extreme ultraviolet light source device further comprises a control unit for controlling the transport unit and the temperature adjustment unit.

According to the nineteenth aspect, in the first aspect, the temperature adjustment unit is constituted by a heat exhausting device for exhausting heat absorbed by the saturable absorber.

According to the twentieth aspect, in any one of the first to sixteenth aspects, the temperature adjustment unit is constituted by a heat exhausting device for exhausting heat absorbed by the saturable absorber, and a control device for controlling the temperature of the saturable absorber.

An extreme ultraviolet light source device according to the twenty first aspect of the present invention is an extreme ultraviolet light source device for generating an extreme ultraviolet light, the device including: a target material supply unit for supplying target material into a chamber; a laser oscillator for outputting a pulse laser beam; at least two amplifiers for amplifying the laser beam that is output from the laser oscillator; a focusing optical system for irradiating an amplified laser beam onto the target material by focusing the laser beam, which is amplified by the amplifier and is output, to a predetermined position in the chamber; and a saturable absorber device, disposed on an optical path between the laser oscillator and the predetermined position, for absorbing at least a laser beam having a light intensity not greater than a predetermined value and suppressing laser beam transmission, and the saturable absorber device includes a saturable absorber cell having a main body unit that has a flow space where the saturable absorber flows, an inlet for letting the saturable absorber enter the flow space, an outlet for letting the saturable absorber out from the flow space, and a window constituted by diamonds for passing the output laser beam from the laser oscillator to the flow space.

A pulse laser device according to the present invention includes: a laser oscillator for outputting a pulse laser beam; at least two amplifiers for amplifying the laser beam that is output from the laser oscillator; and a saturable absorber device, disposed on an optical path between the laser oscillator and the amplifier, or on an optical path between the amplifiers, for absorbing at least a laser beam having light intensity not greater than a predetermined value and suppressing laser beam transmission, and the saturable absorber device includes: a saturable absorber cell having an input window that is disposed in an input side for the laser beam to enter, an output window that is disposed in an output side for the laser beam to be output, a flow space that is formed between the windows where the saturable absorber flows, an inlet for letting the saturable absorber enter into the flow space, and an outlet for letting the saturable absorber out from the flow space; a pipeline for connecting the inlet and the outlet; a transport unit, disposed in the middle of the pipeline, for transporting the saturable absorber that flows out of the outlet, so as to flow into the flow space via the inlet; and a temperature adjustment unit, disposed in the middle of the pipeline, for adjusting temperature of the saturable absorber transported by the transport unit. The input window and the output window may be one common window.

A method for controlling a saturable absorber according to the present invention is a method for controlling a saturable absorber that is used for an extreme ultraviolet light source device that generates extreme ultraviolet light, the method having the steps of: circulating the saturable absorber in a saturable absorber cell in which a laser beam for generating the extreme ultraviolet transmits; maintaining temperature of the saturable absorber to be circulated at a predetermined temperature; and letting the saturable absorber flow in the saturable absorber cell, so that temperature of distribution of each window of the saturable absorber cell becomes approximately symmetric with respect to an optical axis of the laser beam.

According to the present invention, the saturable absorber can be circulated and reused, and the temperature of the saturable absorber can be adjusted. Therefore decomposition of the saturable absorber due to heat can be suppressed, and the saturable absorber can be operated stably for a long time.

According to the present invention, the inlet and the outlet are disposed so that the flow of the saturable absorber in the flow space becomes approximately symmetric with respect to the optical axis of the laser beam that passes through between the windows. Therefore the temperature distribution of each window of the saturable absorber cell can be axially symmetric with respect to the optical axis of the laser beam. As a result, the profile of the wavefront of the laser beam that passes through the saturable absorber cell can be axially symmetric, and the wavefront of the laser beam can be easily compensated.

According to the present invention, the window of the saturable absorber cell can be constituted by diamonds. Since the thermal conduction of a diamond window is very high, the temperature distribution that is generated on the window can be controlled. Hence the wavefront and direction of the laser beam that transmits through the diamond window can be stabilized.

DESCRIPTION OF THE PREFERRED EMBODIMENTS

Embodiments of the present invention will now be described in detail with reference to the drawings. In the present embodiment, a saturable absorber device 33 is disposed on an optical path where a laser beam passes, as described below. The saturable absorber device 33 circulates saturable absorber gas and reuses it while controlling the temperature of the saturable absorber gas. In the following description, saturable absorber is abbreviated to SA. Therefore the saturable absorber device 33 is called an SA device 33, the saturable absorber gas is called an SA gas, and the saturable absorber gas cell 330 is called an SA gas cell 330 respectively.

Embodiment 1

Figure 1:
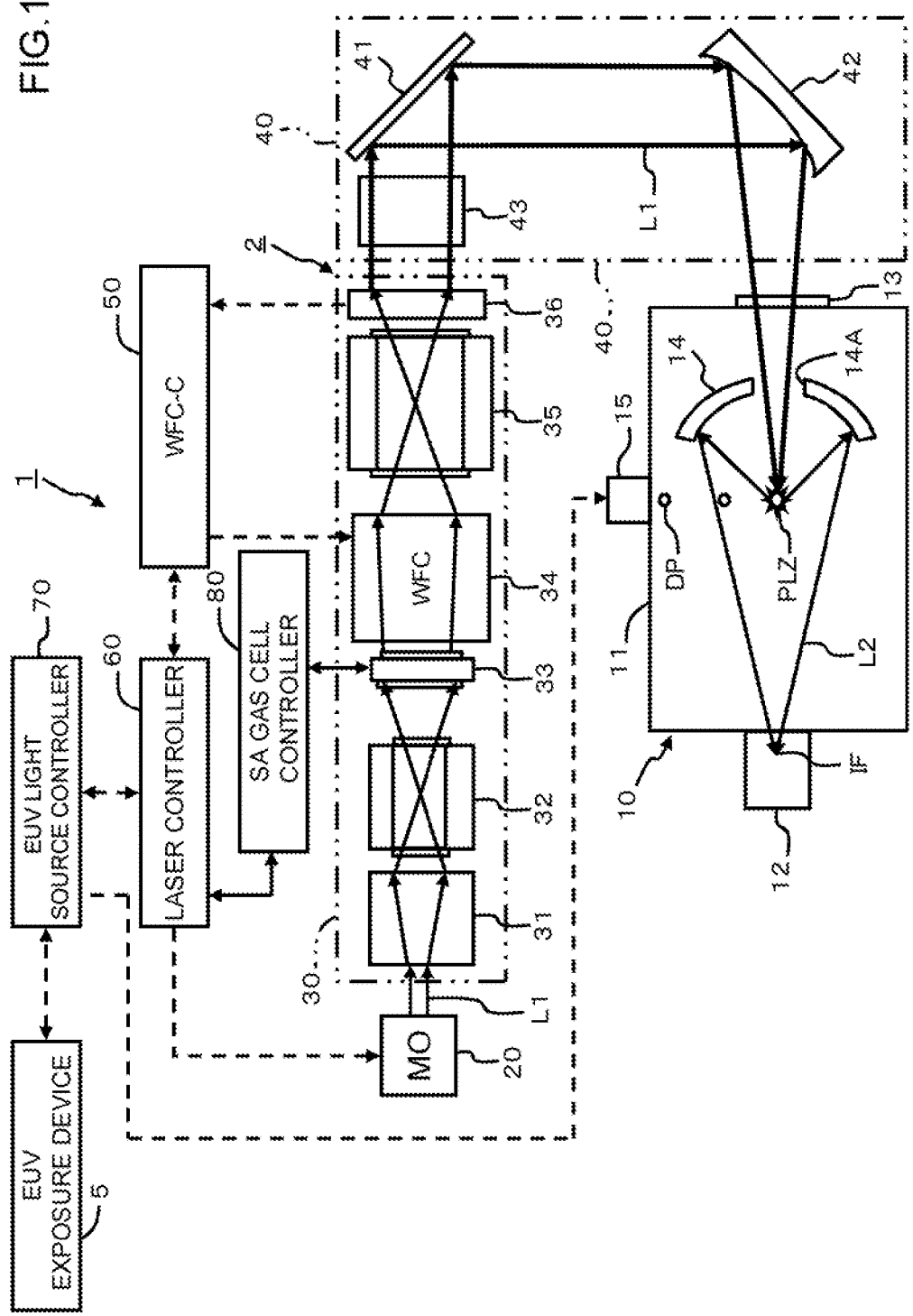
FIG. 1 is a block diagram of an EUV light source device according to a first embodiment of the present invention.

A first embodiment of the present invention will now be described with reference to FIG. 1 to FIG. 14. FIG. 1 is a block diagram depicting a general configuration of an EUV light source device 1.

The EUV light source device 1 has, for example, a chamber 10 for generating EUV light, a laser light source device 2 for supplying laser light to the chamber 10, and an EUV light source controller 70. The laser light source device 2 has, for example, a laser oscillator (Master Oscillator) 20 that determines the time waveform and repetition rate of the laser pulse, an amplification system 30, a focusing system 40, a wavefront correction controller (WFC-C) 50, and a laser controller 60. The EUV light source device 1 supplies EUV light to an EUV exposure device 5. In the following description and drawings, the wavefront compensation controller may be indicated as WFC-C (Wave Front Compensator Controller).

An overview of the chamber 10 will be described first. The chamber 10 has, for example, a chamber main body 11, a connection unit 12, a window 13, an EUV collector mirror 14, and a target material supply unit 15.

The chamber main body 11 is kept in a vacuum state by a vacuum pump, which is not illustrated. In the chamber main body 11, a mechanism for collecting debris, for example, can be installed.

The connection unit 12 is disposed so as to connect the chamber 10 and the EUV exposure device 5. The EUV light generated in the chamber main body 11 is supplied to the EUV exposure device 5 via the connection unit 12.

The window 13 is disposed on the chamber main body 11. The driver laser beam from the laser light source device 2 enters the chamber main body 11 via the window 13.

The EUV collector mirror 14 is a mirror for reflecting the EUV light and collecting it to an intermediate focus (IF). The intermediate focus (IF) is set in the connection unit 12. The EUV collector mirror 14 ideally has a concave surface, such as a spheroid, that generates no aberration, in order to transfer and form an image of a plasma generation point at IF. A multilayer coating constituted by molybdenum coating and silicon coating, for example, is disposed on the surface of the EUV collector mirror 14, whereby the EUV light with about a 13 nm wavelength is reflected.

The target material supply unit 15 supplies the target material, such as tin, as a liquid, solid or gas. The tin can also be supplied as a tin compound, such as stannane ($SnH_4$). If tin is supplied as liquid, a method for liquidizing pure tin by heating it up to a melting point, or a method for supplying a solution containing tin, or a colloidal solution containing tin or a tin compound, can be used. In the description of the present embodiment, a tin droplet DP is used for an example of a target material, but the present invention is not limited to a tin droplet. Another material, such as lithium (Li) or Xenon (Xe), for example, may be used.

Movement of the chamber 10 will be described first in brief. A driver laser beam L1 focuses at a predetermined position in the chamber main body 11 via the input window 13. The target material supply unit 15 drops the tin droplet DP onto this predetermined position. The predetermined position in this case is a position on a first focal point of the EUV collector mirror 14. The tin droplet DP is dropped onto this first focal point. The optical system is disposed such that the first focal point and the focusing point of the laser match. And at the same timing as the time when the tin droplet DP reaches the predetermined position, the laser light source device 2 outputs the driver laser beam L1 with a predetermined output. The tin droplet DP is irradiated by the focused driver laser beam L1, and becomes plasma PLZ. The plasma PLZ radiates EUV light L2. The EUV light L2 is collected to the intermediate focus IF in the connection unit 12 by the EUV collector mirror 14, and is supplied to the EUV exposure device 5.

Now the configuration of the laser light source device 2 will be described. The laser light source device 2 is constituted as a carbon dioxide pulse laser light source device, and outputs the pulses of the driver laser beam L1 having a 10.6 μm wavelength, a single lateral mode, a 100 kHz repetition rate, a 100 to 200 mJ pulse energy, and 10 kW to 20 kW, for example.

The laser beam that is output from the laser oscillator 20 is amplified by the amplification system 30, and is then transmitted to a focusing system 40. The focusing system 40 supplies the driver laser beam L1 to the chamber 10. The focusing system 40 has, for example, a reflecting mirror 41, an off-axis parabolic concave mirror 42, and a relay optical system 43. In the following description, the oscillator 20 side is called the "upstream side", and the chamber 10 side is called the "downstream side" with the laser beam traveling direction as a reference.

The amplification system 30 has, for example, a relay optical system 31, a pre-amp (preamplifier) 32, an SA device 33, a wavefront compensator (WFC) 34, a main-amp (main amplifier) 35 and a sensor 36. In the following description and drawings, the preamplifier is referred to as the "pre-amp, and the main amplifier is referred to as the "main-amp". The wavefront compensator may be referred to as the WFC (Wave Front Compensator). The SA device 33 will be described later with reference to FIG. 2 and FIG. 3.

The relay optical system 31 is an optical system for adjusting a divergent angle of a beam and a size of the beam of the laser beam that is output from the laser oscillator 20, so that the amplification area in the pre-amp 32 is efficiently filled with the laser beam that is output from the laser oscillator 20. The relay optical system 31 expands the beam diameter of the laser beam that is output from the laser oscillator 20 so as to be transformed to be a predetermined beam luminous flux.

The pre-amp 32 amplifies the entered laser beam, and outputs it. The laser beam amplified by the pre-amp 32 enters the SA device 33. The SA device 33 has a function to let the laser beam have a light intensity not less than a predetermined threshold pass, and not to let the laser beam have a light intensity less than the predetermined threshold pass.

By this, the SA device 33 absorbs the laser beam that returns from the chamber 10 (return light), the parasitic oscillation light and the self-excited oscillation light from the main-amp, so as to prevent damage to the pre-amp 32 and the laser oscillator 20. The SA device 33 also plays a role of improving the quality of pulse waveforms of the laser beam by suppressing pedestals. A pedestal is a small pulse which is generated in a close proximity time before/after a main pulse.

Figure 2:
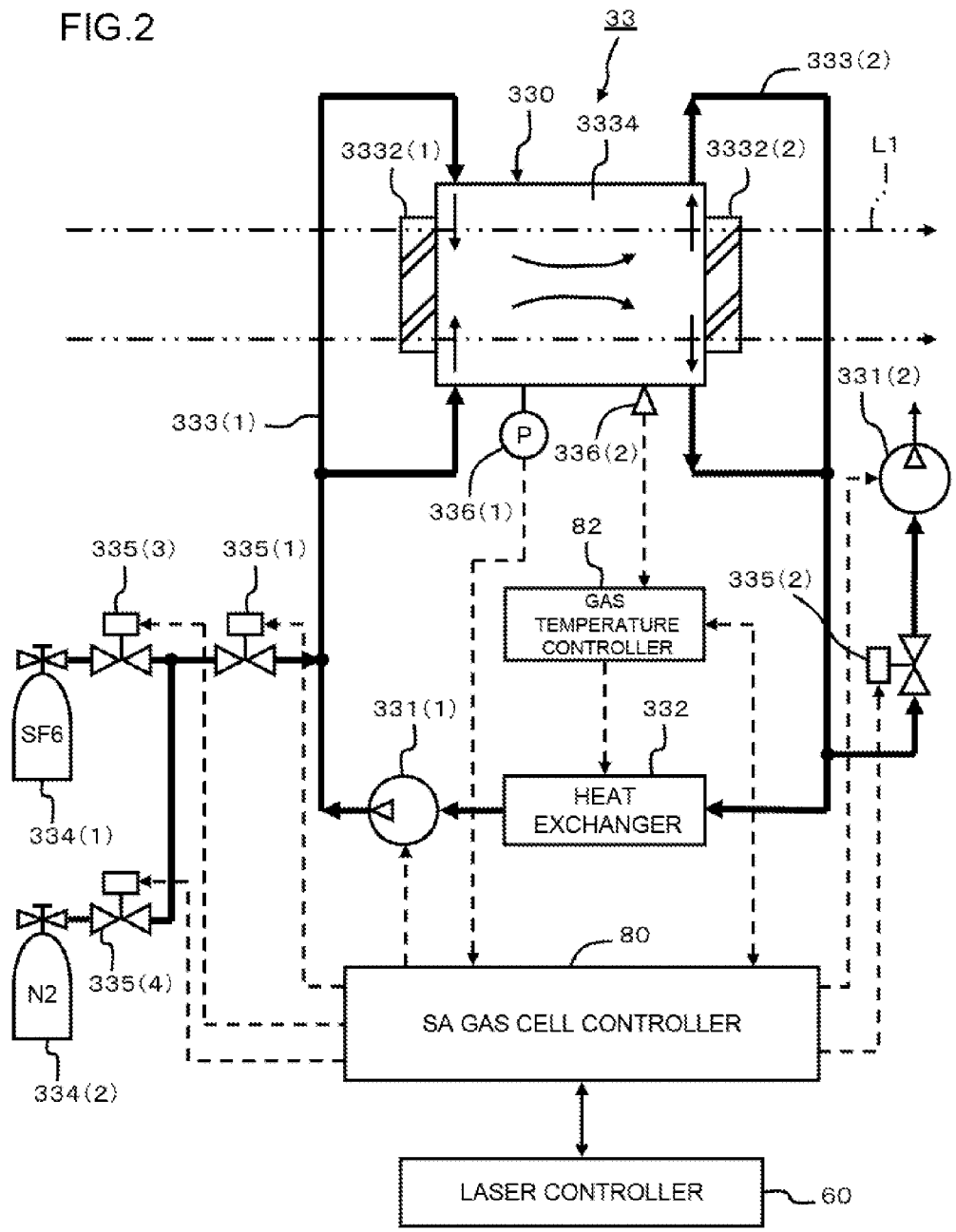
FIG. 2 is a block diagram of an SA device.

FIG. 2 is a diagram depicting a configuration of the SA device 33. The SA device 33 has, for example, an SA gas cell 330, a circulation pump 331 (1), an exhaust pump 331 (2), a heat exchanger 332, a supply pipe line 333 (1), an exhaust pipeline 333 (2), an SA gas cylinder 334 (1), a buffer gas cylinder 334 (2), individual valves 335 (1) to 335 (4), a pressure sensor 336 (1), a temperature sensor 336 (2), an SA gas cell controller 80, and a gas temperature controller 82.

The configuration shown in FIG. 2 is an example, and the present invention is not limited to the configuration shown in FIG. 2. The present invention can be implemented only if the device for cooling SA gas (including mixed gas) heated by the laser beam (e.g. heat exchanger) is included in a circuit for circulating the SA gas. In other words, it is sufficient if the configuration allows exhausting the heat of the SA gas while circulating the SA gas. If this configuration is used, the SA gas is not decomposed by heating of the SA gas at least during normal operation, and a lengthy operation can be possible.

The SA gas cell 330 will be described first with reference to FIG. 3. The SA gas cell 330 has, for example, a tubular holder 3300 with a water cooling jacket, windows 3332 (1) and 3332 (2), which are disposed on both ends of the holder 3300, a flow space 3334 disposed between the windows, inlets 3336 (1) and 3336 (2) which are disposed in the holder 3300 so as to be connected to a flow space 3334, and outlets 3338 (1) and 3338 (2) which are disposed in the holder 3300 so as to be connected to the flow space 3334. The holder 3330 is an example of a "main body unit having a flow space".

Each window 3332 (1) and 3332 (2) is formed to be a disk, using a material that has high thermal conductivity, and which is transparent to a $CO_2$ laser beam. An example of such a material is diamond.

A diamond window has very high thermal conductivity, so the influence of heat conducted from the SA gas on the diamond window can be decreased. Therefore distortion of the wavefront of the laser beam, that passes through the SA gas, can be suppressed. In other words, by using a diamond window, distortion of the wavefront can be prevented without installing a circulation system to circulate the SA gas and a temperature control system to control the temperature of the SA gas.

The laser beam enters from the input window 3332 (1) to the flow space 3334, passes through the flow space 3334, and is output from the output window 3332 (2). Each window 3332 (1) and 3332 (2) is installed in the holder 3330 air-tightly via such a seal element as an O-ring.

The flow space 3334 is a tubular space created by each window 3332 (1) and 3332 (2) and the holder 3300. The axis center of the flow space 3334 (center line in the lateral direction in FIG. 3) and the optical axis of the laser beam L1 are set to be coaxial as default.

In the flow space 3334, a plurality of inlets 3336 (1) and 3336 (2) are disposed at the input window 3332 (1) side, and a plurality of outlets 3338 (1) and 3338 (2) are disposed at the output window 3332 (2) side. Each inlet 3336 (1) and 3336 (2) and each outlet 3338 (1) and 3338 (2) are disposed facing each other to be symmetric with respect to the optical axis of the laser beam respectively. The supply pipeline 333 (1) is connected to each inlet 3336 (1) and 3336 (2), and the exhaust pipeline 333 (2) is connected to each outlet 3338 (1) and 3338 (2).

The SA gas flows in from the supply pipeline 333 (1) to the flow space 3334 via each inlet 3336 (1) and 3336 (2). After flowing in the diameter direction along the inner face side of the input window 3332 (1), the SA gas moves in the flow space 3334 to the outlet side along the optical axis of the laser beam. The SA gas flows along the inner face side of the output window 3332 (2) in the diameter direction, and flows into each outlet 3338 (1) and 3338 (2). The SA gas is exhausted from each outlet 3338 (1) and 3338 (2) via the exhaust pipeline 333 (2), and is sent to the heat exchanger 332. The inner face refers to one of the surfaces of the window that faces the flow space 3334.

Referring back to FIG. 2, the circulation pump 331 (1) is a pump for circulating the SA gas in the SA device 33. The outlet of the circulation pump 331 (1) is connected to the supply pipeline 333 (1), and the inlet of the circulation pump 331 (1) is connected to the exhaust pipeline 333 (2) via the heat exchanger 332. The circulation pump 331 (1) is activated according to an instruction from the SA gas cell controller 80, and supplies SA gas, cooled down by the heat exchanger 332, to the supply pipeline 333 (1).

The exhaust pump 331 (2) is a pump for removing the SA gas from the SA device 33. The exhaust pump 331 (2) is connected to a middle of the exhaust pipeline 333 (2) via the exhaust valve 335 (2). The exhaust valve 335 (2) can be constituted by a normally-closed two-port electromagnetic valve, for example. The supply valve 335 (1) and exhaust valve 335 (2) are activated according to an instruction from the SA gas cell controller 80, and suck exhaust SA gas stagnating in each pipeline 333 (1) and 333 (2), SA gas cell 330 and heat exchanger 332.

The heat exchanger 332 is disposed such that the supply pipeline 333 (1) and the exhaust pipeline 333 (2) are connected. The heat exchanger 332 is a device for keeping the temperature of the SA gas constant. The heat exchanger 332 is activated according to an instruction from the gas temperature controller 82, and adjusts the temperature of the SA gas.

As mentioned above, the supply pipeline 333 (1) is a pipeline for supplying the SA gas to the SA gas cell 330, and the exhaust pipeline 333 (2) is a pipeline for exhausting the SA gas from the SA gas cell 330. The supply pipeline 333 (1) and the exhaust pipeline 333 (2) are connected via the heat exchanger 332 and the circulation pump 331 (1).

The SA gas cylinder 334 (1) is a container for storing SA gas, such as $SF_6$ (sulfur hexafluoride). The buffer gas cylinder 334 (2) is a container for storing buffer gas, such as $N_2$ (nitrogen) and rare gas (He, Ar). The types of SA gas and buffer gas are not limited to the those mentioned above.

A desirable SA gas can be selected according to the wavelength of the carbon dioxide laser. If the wavelength of the carbon dioxide laser beam is 10.6 μm, for example, then $SF_6$ can be used. If the wavelength of the carbon dioxide laser beam is 9.6 μm, for example, $CH_3OH$, $CH_3F$, HCOOH, $CD_3OD$, $CD_3F$ and DCOOD (D: deuterium) can be used. And if the wavelength of the carbon dioxide laser beam is 9.3 μm, for example, then $C_2F_2Cl$ can be used.

The outlet of the SA gas cylinder 334 (1) is connected to the inlet of the gas supply valve 335 (1) via the SA gas valve 335 (3). In the same way, the outlet of the buffer gas cylinder 334 (2) is connected to the inlet of the gas supply valve 335 (1) via the buffer gas valve 335 (4). The outlet of the gas supply valve 335 (1) is connected to a middle of the supply pipeline 333 (1). Each valve 335 (1), 335 (3) and 335 (4) are constituted by a normally-closed two-port electromagnetic valve, and opens/closes according to an instruction of the SA gas cell controller 80.

FIG. 2 shows a case when the SA gas and the buffer gas are provided by different gas cylinders 334 (1) and 334 (2) respectively, and mixed gas is generated in the SA device 33. The present invention is not limited to this, but a mixed gas cylinder, for storing mixed gas in which the SA gas and the buffer gas are mixed at a predetermined ratio, may be used. In this case, the outlet of the mixed gas cylinder is connected to the inlet of the gas supply valve 335 (1). Therefore the valves 335 (3) and 335 (4) in FIG. 2 can be omitted, and a configuration of the SA device 33 can be simplified.

The pressure sensor 336 (1) is a sensor for detecting pressure in the SA gas cell 330, and outputting it to the SA gas cell controller 80. The temperature sensor 336 (2) is a sensor for detecting the temperature in the SA gas cell 330, and outputting it to the gas temperature controller 82.

The SA gas cell controller 80 is a control device for controlling operation of the SA device 33. The SA gas cell controller 80 circulates the mixed gas of the SA gas and the buffer gas in the SA device 33 by executing the later mentioned processing, and controls the temperature of the mixed gas. The SA gas cell controller 80 notifies the control result to the laser controller 60.

The gas temperature controller 82 is a control device for controlling the heat exchanger 332 so that the temperature of the mixed gas becomes a predetermined temperature. The gas temperature controller 82 controls the operation of the heat exchanger 332 according to an instruction from the SA gas cell controller 80, and notifies the result to the SA gas cell controller 80. The SA gas cell controller 80 may control the temperature of the mixed gas without differentiating the gas temperature controller 82 and the SA gas cell controller 80.

Figure 3:
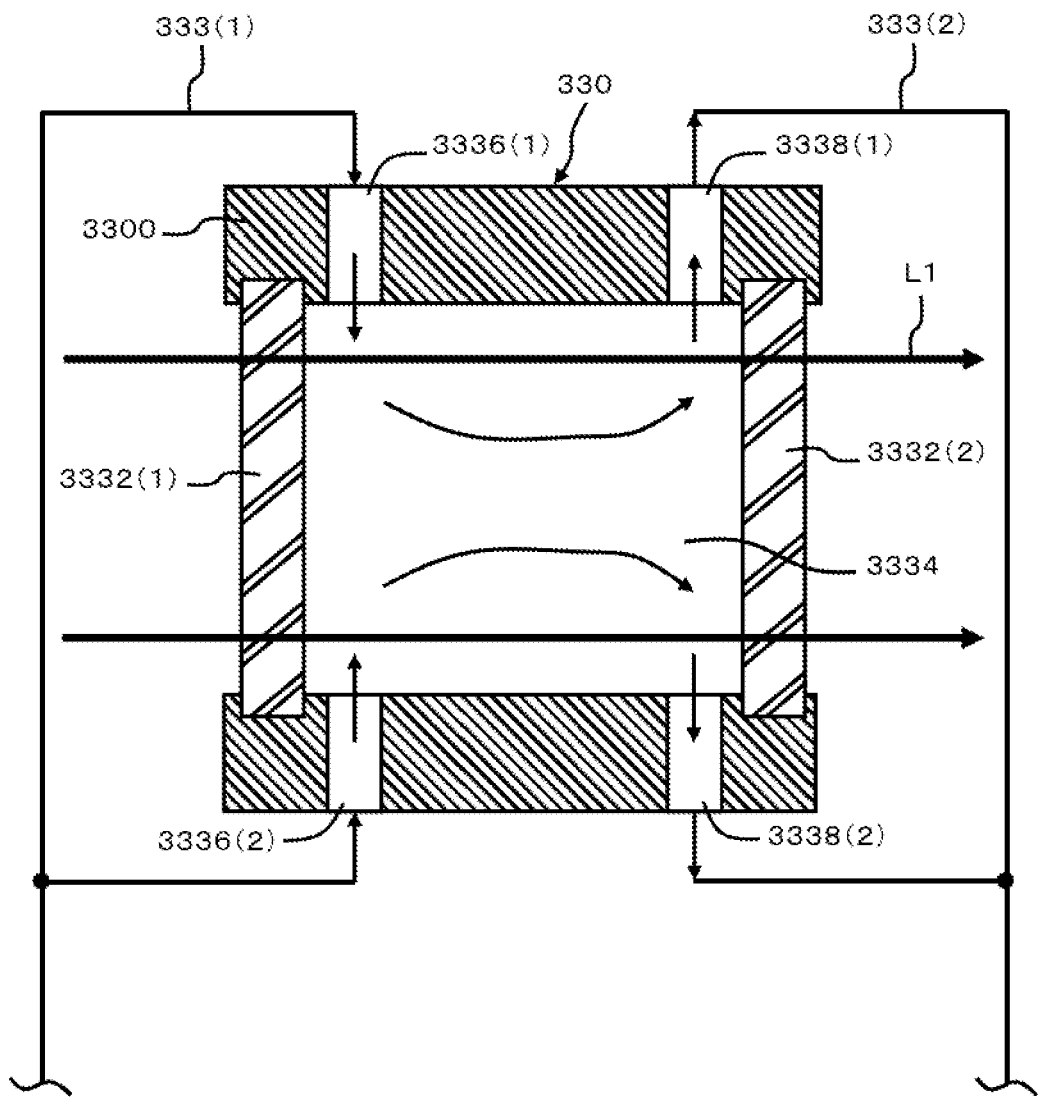
FIG. 3 is a diagram depicting an SA gas cell.
Figure 4:
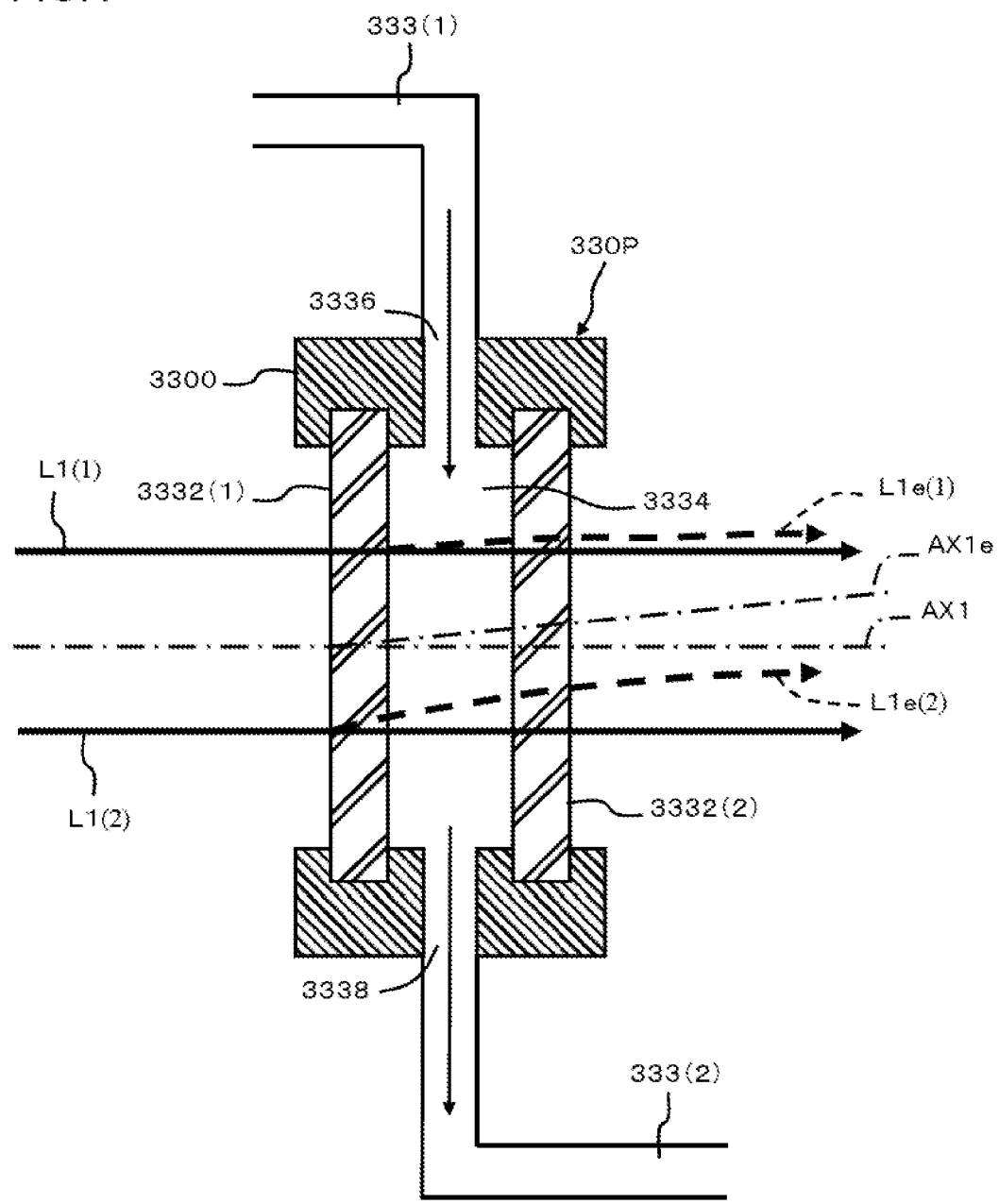
FIG. 4 is a diagram depicting a state of how the wavefront and the direction of the laser beam that transmits through the saturable absorber change.

FIG. 4 shows a state of change of the direction and the wavefront profile of the laser beam that passes through the SA gas cell. The configuration of the SA gas cell is simplified in FIG. 4 to make explanation easier. Therefore in FIG. 4, the SA gas cell is denoted with 330P so as to distinguish it from the SA gas cell 330 in FIG. 3.

Figure 5:
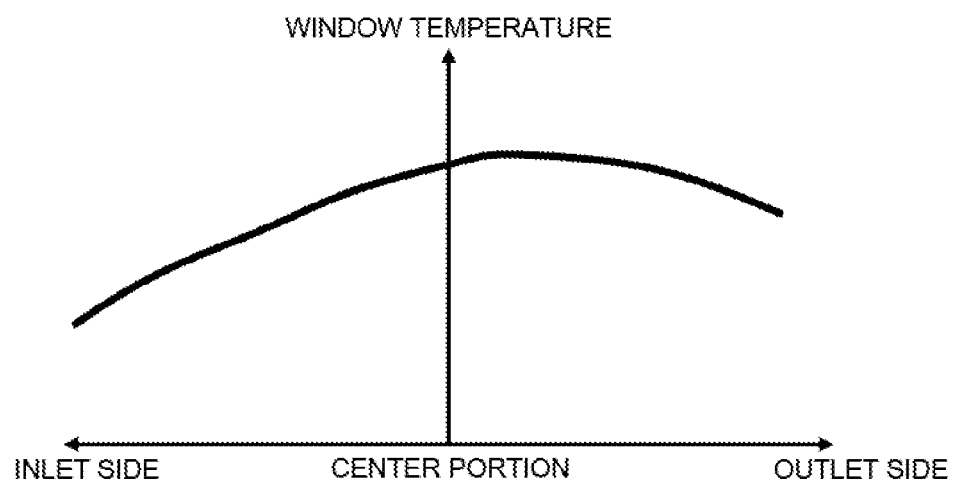
FIG. 5 is a graph depicting the temperature change of the saturable absorber.

FIG. 5 is a graph depicting the temperature distribution generated in the SA gas cell 330. The mixed gas flows from the inlet 3336 to the flow space 3334 between the windows 3332 (1) and 3332 (2), absorbs a laser beam not greater than the threshold of the laser beam, and flows out from the outlet 3338. Thereby the temperature distribution which shifts in the flow direction of the mixed gas is generated in the SA gas cell 330. Because of the temperature distribution of the windows 3332 (1) and 3332 (2), the distribution of the refractive index of the windows 3332 (1) and 3332 (2) change.

As a result, the edge L1 (1) and the edge L1 (2) of the laser beam that passes through the SA gas cell 330 shift in a direction AX1e, which deviated from the reference optical axis AX1, as shown in the broken lines L1e (1) and L1e (2) in FIG. 4. The wavefront of the laser beam L1 that passes through the SA gas cell 330 does not change concentrically maintaining the reference optical axis AX1 at the center, but shifts along the axis AX1e. In other words, by passing through the SA gas cell 330, the direction of the laser beam L1 shifts, and the wavefront profile also changes.

Even if the laser beams L1e (1) and L1e (2), of which traveling direction and wavefront profile shifted, directly enter the main-amp 35, the expected amplification function cannot be implemented. This is because the amplification area of the main-amp 35 cannot be efficiently filled by the laser beam.

In the present embodiment, to solve this problem, each inlet 3336 (1) and 3336 (2) and each outlet 3338 (1) and 3338 (2) are disposed, as shown in FIG. 3, so that the temperature distribution of each window 3332 (1) and 3332 (2) of the SA gas cell 330 become axially symmetric with respect to the optical axis of the laser beam. Thereby according to the present embodiment, the wavefront profile of the laser beam that passes through the SA gas cell 330 can be axially symmetric with respect to the optical axis of the laser beam. Furthermore according to the present embodiment, as shown in FIG. 1 the wavefront compensator (WFC) 34 is disposed between the SA gas cell 330 and the main-amp 35. An example of the wavefront compensator (WFC) 34 will be described later. A method for controlling the wavefront compensator (WFC) 34 according to the signal from the sensor 36 will also be described later with reference to another diagram.

Figure 6:
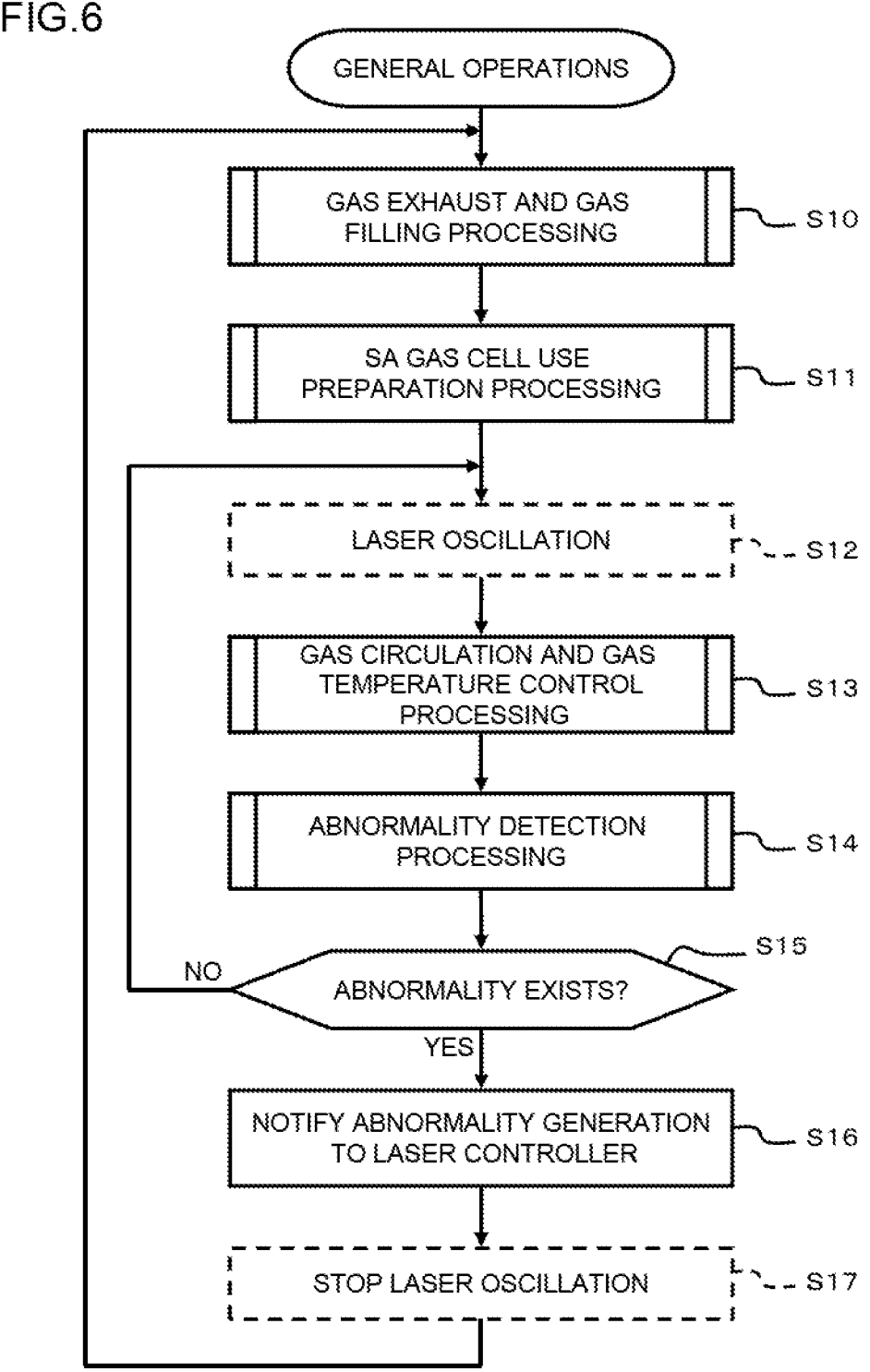
FIG. 6 is a flow chart depicting a general operation of the SA device.

The operation of the SA device 33 will now be described with reference to FIG. 6 to FIG. 10. FIG. 6 is a flow chart depicting a main processing that is a general operation, and FIG. 7 to FIG. 10 are flow charts depicting the subroutines called up during main processing. Each flow chart to be described below shows an overview of each processing, which may be different for an actual computer program. Those skilled in the art would change or delete a step or add a new step in the flow charts.

In the main processing in FIG. 6, the SA gas cell controller 80 executes gas exhausting and gas filling processing (S10) first. Details on S10 will be described in FIG. 7. In S10, the SA device 33 is exhausted by vacuuming and then filled with the mixed gas.

Then the SA gas cell controller 80 executes the processing for preparing the SA gas cell for use (S11). S11 will be described in detail later in FIG. 8. In S11, the heat exchanger 332 is operated so that the temperature of the mixed gas that circulates in the SA device 33 becomes a predetermined temperature.

When the SA device 33 is prepared, the laser controller 60 controls the laser oscillator 20 to emit the laser beam (S12). The SA gas cell controller 80 executes processing to circulate gas and control the gas temperature (S13). S13 will be described in detail later in FIG. 9. In S13, inside the SA device 33 is controlled so that the mixed gas at a predetermined temperature circulates.

Then the SA gas cell controller 80 executes the abnormality detection processing (S14). S14 will be described in detail later in FIG. 10. Then the SA gas cell controller 80 determines whether an abnormality was detected (S15) in the abnormality detection processing (S14).

If there is no abnormality (S15: NO), S12 to S15 are repeated. If an abnormality was detected (S15: YES), the SA gas cell controller 80 notifies the laser controller 60 that an abnormality occurred (S16). The laser controller that received this notice outputs the signal to the laser oscillator 20, and stops oscillation of the laser beam (S17). After the abnormality is cleared, the SA gas cell controller 80 returns to S10, and fills the mixed gas into the SA gas cell 330 again.

Figure 7:
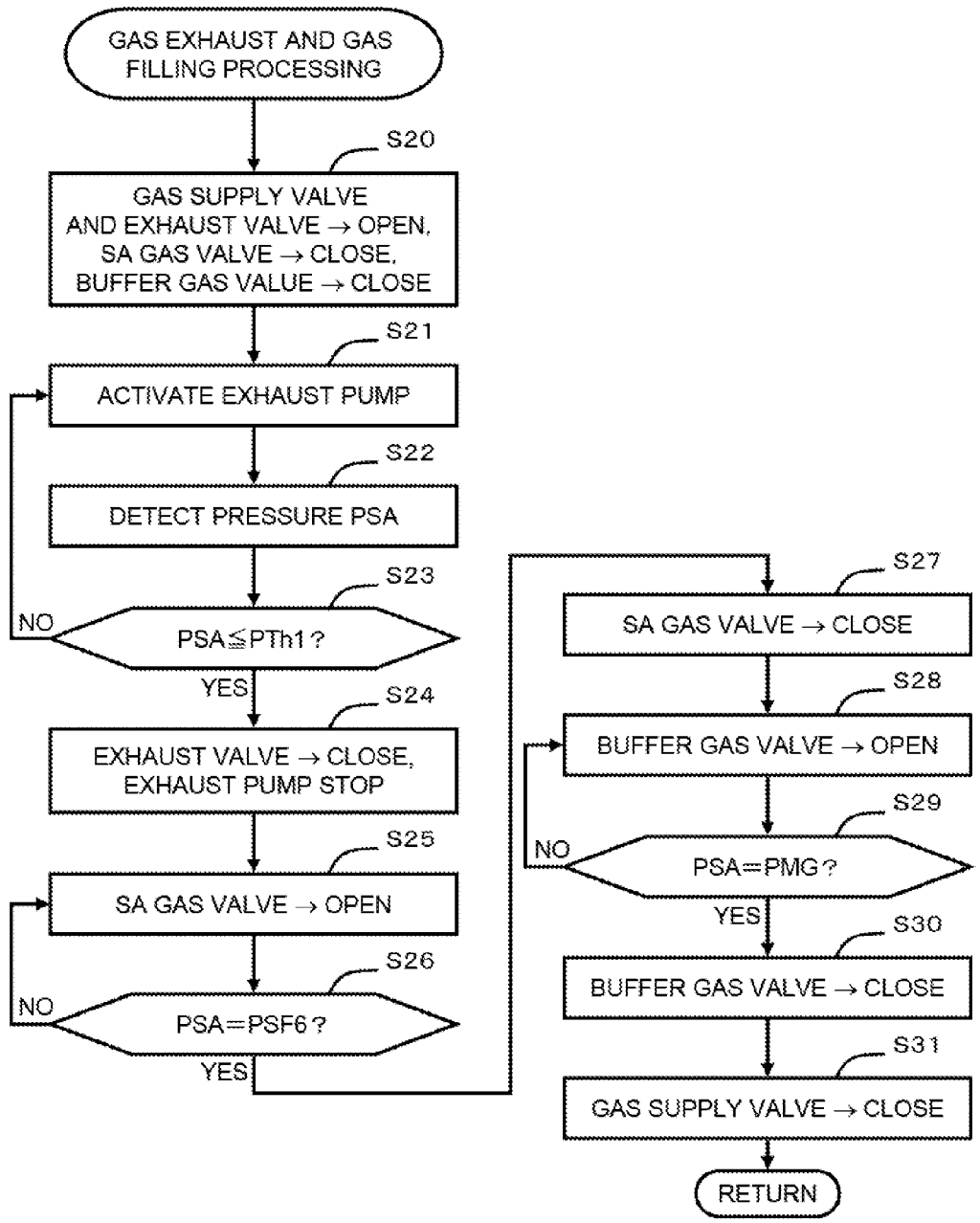
FIG. 7 is a flow chart depicting gas exhaust and gas filling processing.

FIG. 7 is a flow chart depicting the gas exhausting and gas filling processing (S10 in FIG. 6). The SA gas controller 80 opens the gas supply valve 335 (1) and exhaust valve 335 (2), and closes the SA gas valve 335 (3) and the buffer gas valve 335 (4) respectively (S20). For a valve constituted by a normally-closed electromagnetic valve, it is unnecessary to output a close valve signal to close the valve from the SA gas cell controller 80.

The SA gas cell controller 80 activates the exhaust pump 331 (2) (S21), and reads the detection signal from the pressure sensor 336 (1) (S22). The SA gas cell controller 80 determines whether the pressure value PSA detected by the pressure sensor 336 (1) became a predetermined pressure value PTh1 or less (S23). The predetermined pressure PTh1 is set to be a value in a pressure (substantially vacuumed) state that does not negatively influence the performance of the SA.

If the pressure value PSA drops to a predetermined pressure value PTh1 (S23: YES), this means that the old mixed gas in the SA device 33 has exhausted to the outside. Therefore the SA gas cell controller 80 outputs a signal to the exhaust valve 335 (2) to close the valve, and stops the exhaust pump 331 (2) (S24).

The SA gas cell controller 80 outputs the signal to the SA gas valve 335 (3) to open the valve (S25). The SA gas stored in the SA gas cylinder 334 (1) flows into the supply pipeline 333 (1) via the SA gas valve 335 (3) and the gas supply valve 335 (1), and flows into the exhaust pipeline 333 (2) and the heat exchanger 332 via the SA gas cell 330. As the SA gas is filled into the SA device 33, the pressure valve PSA detected by the pressure sensor 336 (1) increases. The SA gas cell controller 80 stands by until the pressure value PSA reaches a predetermined SA gas pressure value PSF6 (S26).

If the pressure value PSA reaches the predetermined SA gas pressure value PSF6 (S26: YES), this means that the predetermined amount of SA gas has filled the SA device 33, so the SA gas cell controller 80 closes the SA gas calve 335 (3) (S27).

Then the SA gas cell controller 80 outputs a signal to the buffer gas valve 335 (4) to open the valve (S28). Thereby the buffer gas stored in the buffer gas cylinder 334 (2) flows into the supply pipeline 333 (1) via the buffer gas valve 335 (4) and gas supply valve 335 (1). The buffer gas also flows into the SA gas cell 330, exhaust pipeline 333 (2) and heat exchanger 332, and is mixed with the SA gas which has been filled.

The SA gas cell controller 80 stands by until the pressure valve PSA detected by the pressure sensor 336 (1) reaches a predetermined mixed gas pressure PMG (S29). If the pressure value PSA reached the predetermined mixed gas pressure PMG (S29: YES), this means that the SA device 33 is filled with the mixed gas at the predetermined pressure PMG, therefore the SA gas cell controller 80 closes the buffer gas valve 335 (4) (S30), and also closes the gas supply valve 335 (1) (S31).

Figure 8:
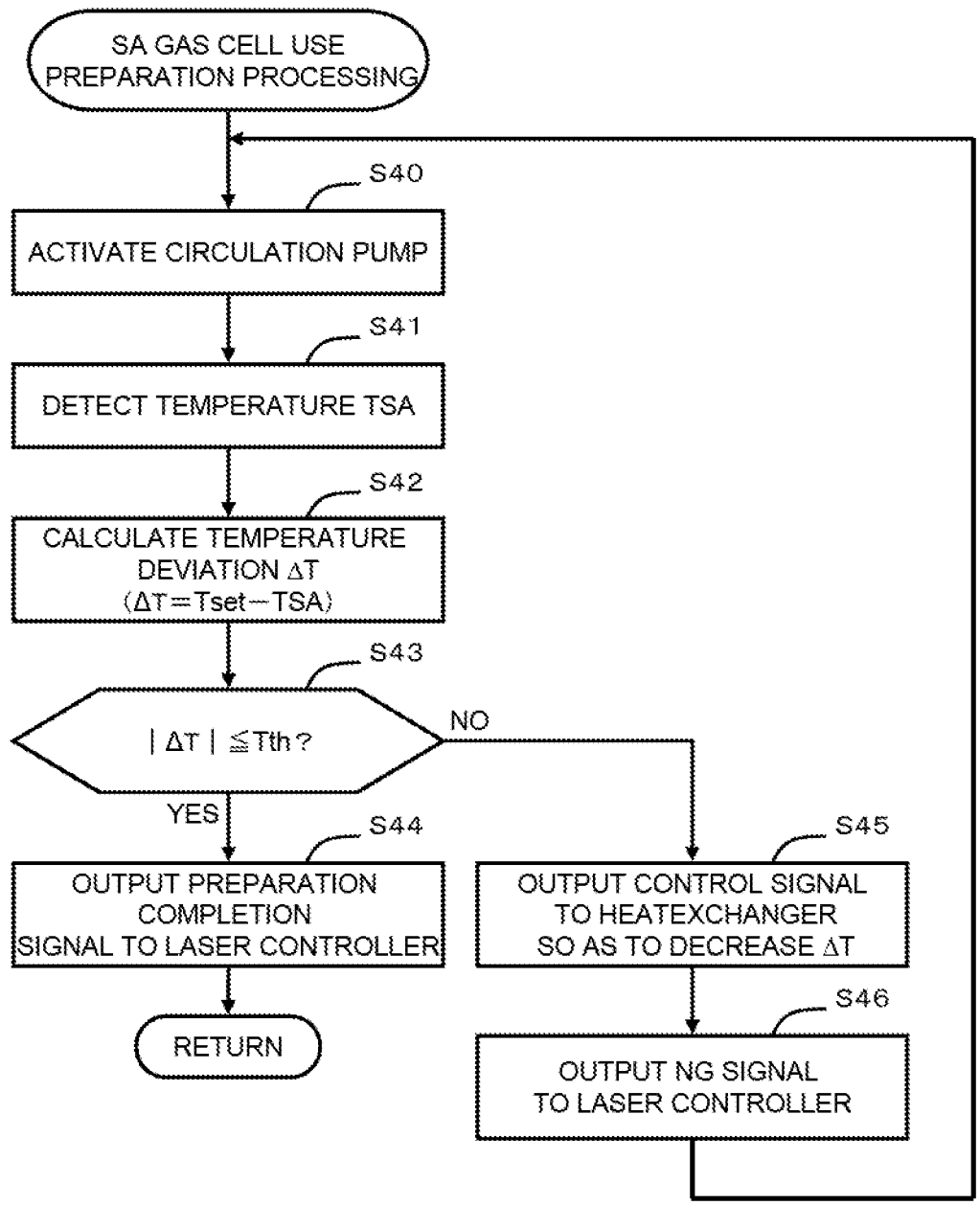
FIG. 8 is a flowchart depicting processing for preparing the SA gas cell for use.

FIG. 8 is a flowchart depicting processing for preparing the SA gas cell for use (S11 in FIG. 6). The SA gas cell controller 80 outputs a signal to the circulation pump 331 (1) for activation (S40). Then the SA gas cell controller 80 reads the temperature TSA that is detected by the temperature sensor 336 (2) (S41). The SA gas cell controller 80 calculates the deviation $\Delta T$ between the detected temperature TSA and a predetermined reference temperature Tset (S42).

The SA gas cell controller 80 determines whether the absolute value of the calculated deviation $\Delta T$ is a predetermined threshold Tth or less (S43). If the deviation $\Delta T$ is the predetermined threshold Tth or less (S43: YES), it is determined that the temperature of the mixed gas is being kept constant, and the SA gas cell controller 80 outputs a preparation completion signal of the laser controller 60 (S44). The preparation completion signal is a signal to indicate that the preparation of the SA device 33 for use is completed. Instead of the electric signal, a message or data may be used to notify the preparation completion from the SA gas cell controller 80 to the laser controller 60.

If the absolute value of the temperature deviation $\Delta T$ exceeds the predetermined threshold Tth, on the other hand (S43: NO), the SA gas cell controller 80 outputs the control signal from the gas temperature controller 82 to the heat exchanger 332, and operates the heat exchanger 332 so that the deviation $\Delta T$ becomes small (S45). In other words, if the temperature of the mixed gas is higher than the reference temperature Tset, the SA gas cell controller 80 decreases the temperature of the mixed gas using the heat exchanger 332.

Then the SA gas cell controller 80 outputs an NG signal to the laser controller 60 (S46), and processing returns to S40. The NG signal is a signal to indicate that the preparation of the SA device 33 for use is not yet completed.

Figure 9:
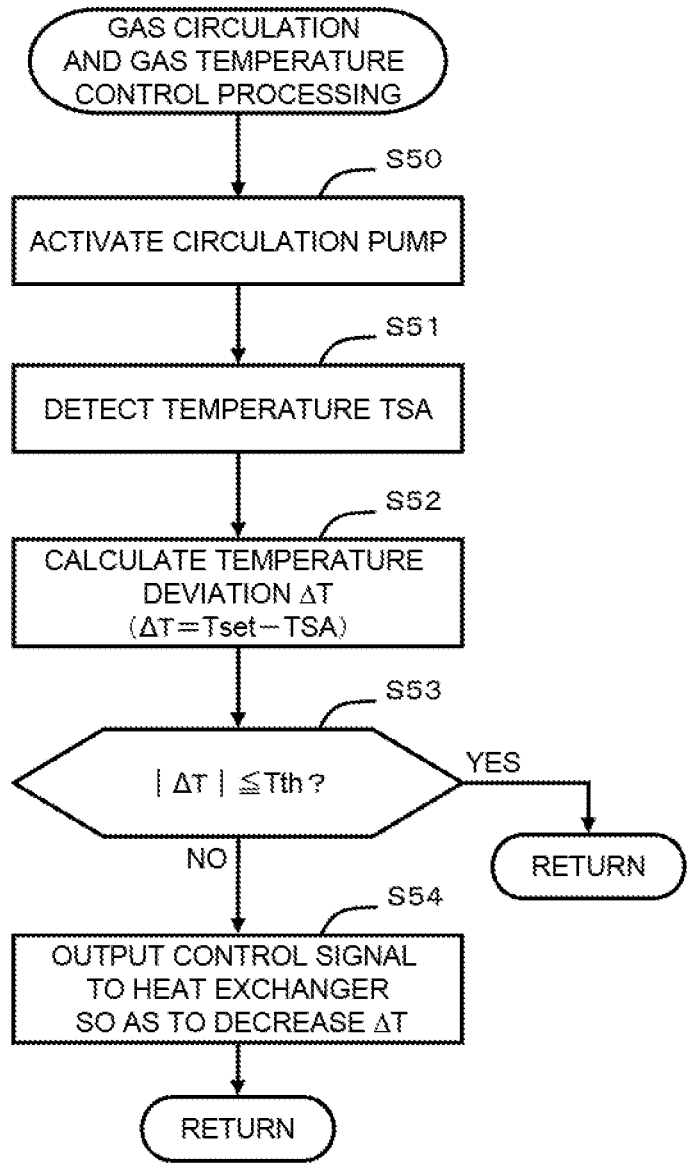
FIG. 9 is a flow chart depicting processing for controlling gas circulation and gas temperature.

FIG. 9 is a flow chart depicting the processing for controlling gas circulation and gas temperature (S13 in FIG. 6). The SA gas cell controller 80 outputs an activation start signal to the circulation pump 331 (1) to activate the circulation pump 331 (1) (S50). If the circulation pump 331 (1) has already been operating, it is not necessary to output the activation start signal.

The SA gas cell controller 80 detects the temperature TSA of the mixed gas in the SA gas cell 330 using the temperature sensor 336 (2) (S51), and calculates the deviation $\Delta T$ of the detected temperature TSA from the reference temperature Tset (S52).

The SA gas cell controller 80 determines whether the absolute value of the deviation $\Delta T$ is a predetermined threshold Tth or less (S53). If the absolute value of the deviation $\Delta T$ is the predetermined threshold Tth or less (553: YES), it is determined that the temperature of the mixed gas is maintained at the reference temperature Tset, and processing returns to the main routine shown in FIG. 6.

If the absolute value of the deviation $\Delta T$ exceeds the predetermined threshold Tth (S53: NO), on the other hand, it is determined that the mixed gas is not maintained at the reference temperature Tset. So the SA gas cell controller 80 outputs a control signal from the gas temperature controller 82 to the heat exchanger 332 so as to decrease the deviation ΔT (S54), and processing returns to the main routine.

Figure 10:
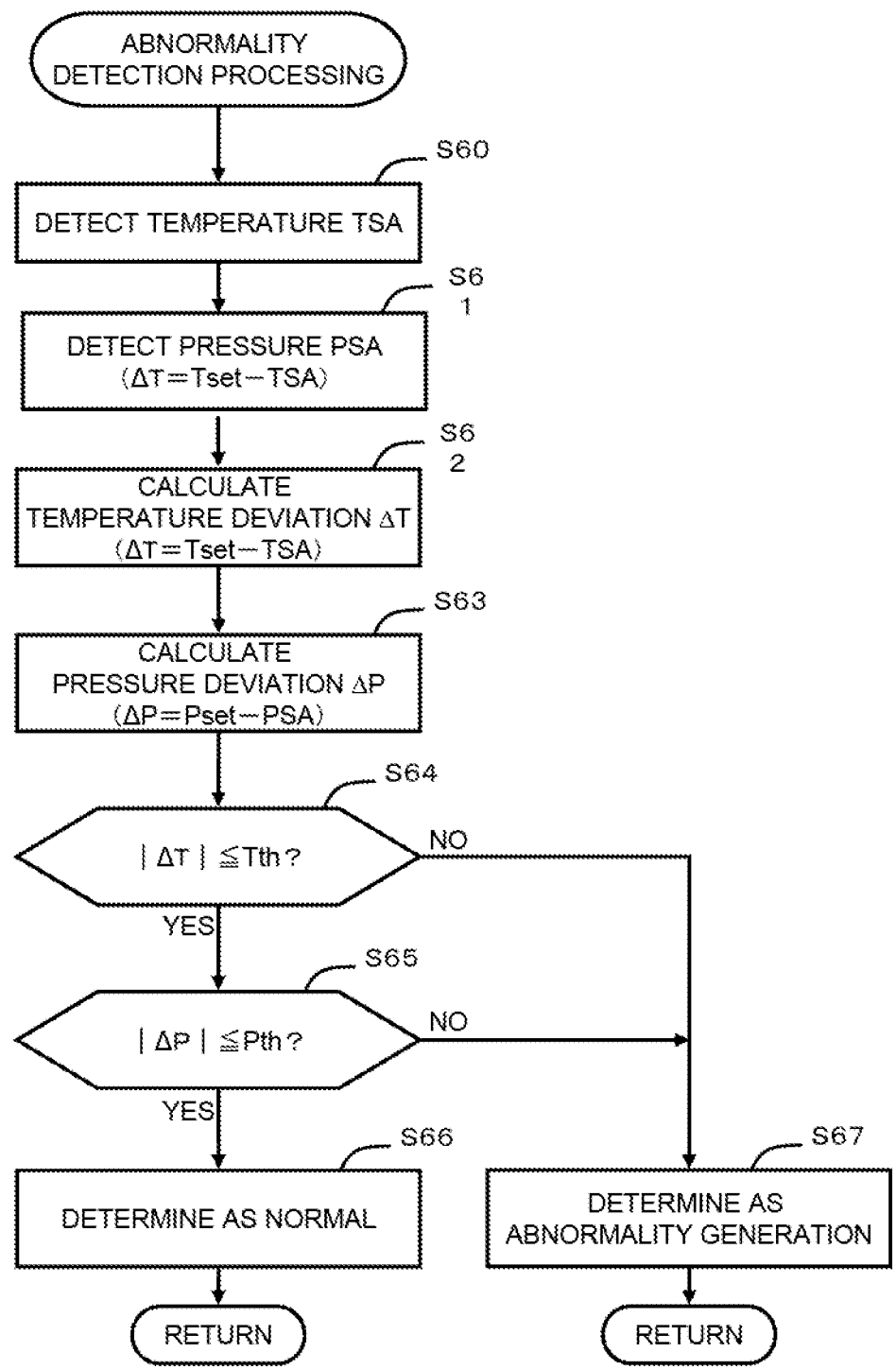
FIG. 10 is a flow chart depicting processing for detecting abnormality.

FIG. 10 is a flow chart depicting the abnormality detection processing (S14 in FIG. 6). The SA gas cell controller 80 detects the temperature TSA of the mixed gas in the SA gas cell 330 using the temperature sensor 336 (2) (S60). Then the SA gas cell controller 80 detects the pressure PSA in the SA gas cell 330 using the pressure sensor 336 (1) (S61).

The SA gas cell controller 80 calculates the deviation ΔT of the detected temperature TSA from the reference temperature Tset (S62), and calculates the deviation ΔP of the detected pressure PSA from the reference pressure Pset (S63). Then it is determined whether the absolute value of the calculated deviation ΔT is a predetermined threshold Tth or less (S64).

Then the SA gas cell controller 80 determines whether the absolute value of the deviation ΔP of the pressure value PSA detected by the pressure sensor 336 (1) from the predetermined mixed gas pressure Pset is a predetermined threshold Pth or less (S65).

If the temperature and pressure of the mixed gas are both normal (S62: YES and S63: YES), then it is determined that the SA device 33 is normally operated, and processing returns to the main routine (S66). If an abnormality is detected either in the temperature or pressure of the mixed gas (S62: NO or S63: NO), on the other hand, it is determined that an abnormality is generated in the SA device 33, and processing returns to the main routine (S67).

FIG. 10 is the case when the temperature and pressure of the mixed gas are monitored, but only the temperature of the mixed gas may be monitored instead. Or in addition to the temperature of the mixed gas, the flow rate and flow velocity of the mixed gas, that circulates in the SA device 33, may be monitored. The temperature or temperature distribution of the window 3332 may be monitored, as mentioned later.

Figure 11:
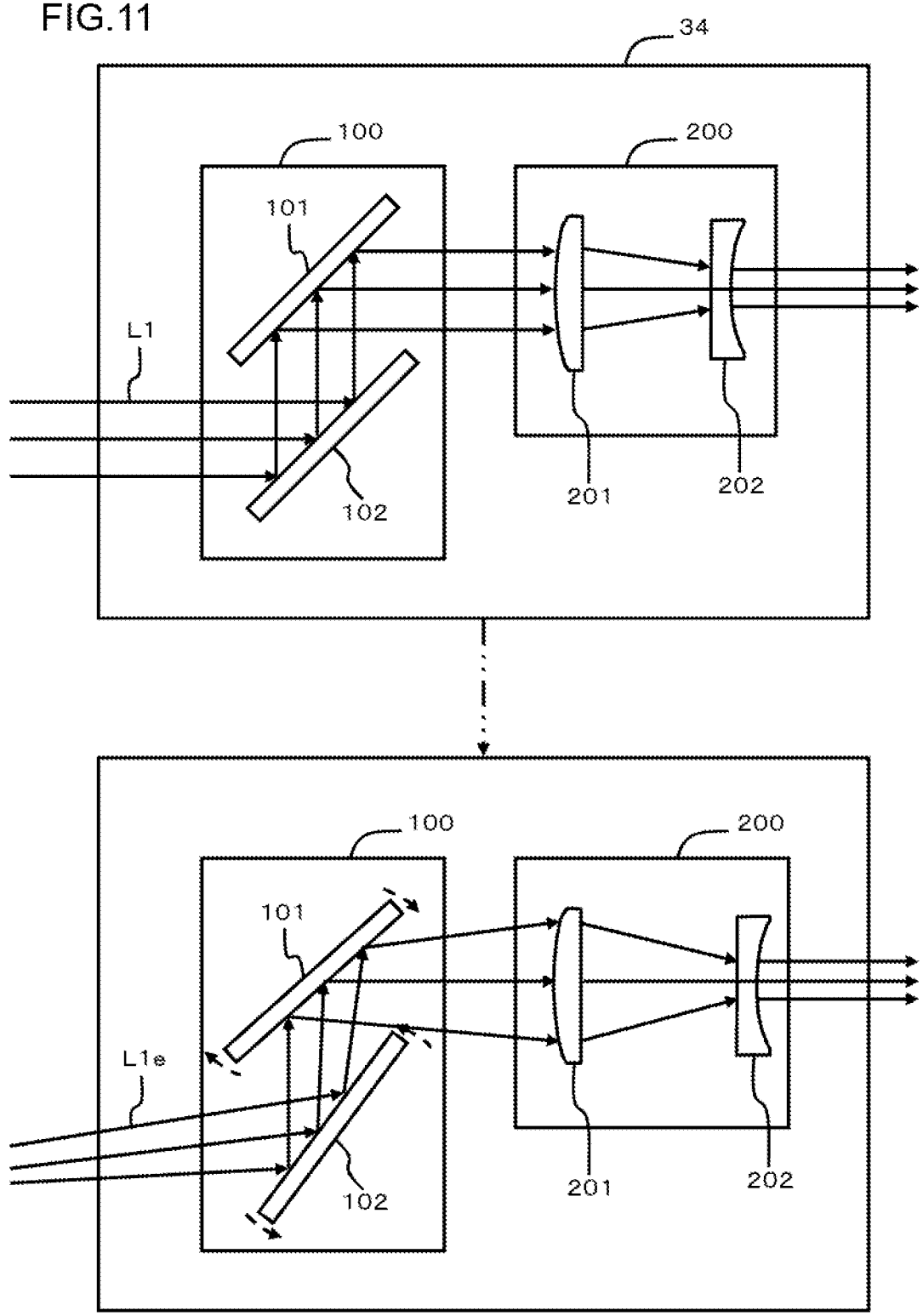
FIG. 11 is a diagram depicting configuration of a wavefront compensator.

FIG. 11 are diagrams depicting the principle of the wavefront compensator 34. The top diagram in FIG. 11 is a case when the heat load applied to the amplification system 30 (mainly the SA device 33) is low. The bottom diagram in FIG. 11 is the case when the heat load applied to the amplification system 30 (mainly SA device 33) is high.

The wavefront compensator 34 has an angle compensator 100 and the wavefront curvature compensator 200. The angle compensator 100 is an optical system for adjusting an angle (advancing direction) of the laser beam. The wavefront curvature compensator 200 is an optical system for adjusting the curvature of the wavefront of the laser beam (e.g. divergence of the beam). A concrete structure example will be described later as another embodiment.

The angle compensator 100 is comprised of two reflecting mirrors, 101 and 102, which are disposed to face each other in parallel. Each reflecting mirror 101 and 102 are rotatably disposed as shown in the diagram at the bottom in FIG. 11, so that the X axis (vertical axis to FIG. 11) and the Y axis (axis perpendicular to the X axis on the same plane) become the rotation centers respectively. In other words, each reflecting mirror 101 and 102 are installed so as to be able to tilt and rotate.

If the heat load is low, the laser beam L1 advances matching with the reference optical axis, so there is no need to change the orientation of each reflecting mirror 101 and 102. If the heat load is high, the laser beam L1e enters somewhat deviated from the reference optical axis. Therefore the attitude of each reflecting mirror 101 and 102 is changed appropriately so that the output direction of the laser beam matches with the reference optical axis.

The wavefront curvature compensator 200 can be constituted by an convex lens 201 and a concave lens 202, for example. By adjusting the relative positional relationship of each lens 201 and 202, the concave wave and convex wave can be compensated to a plane wave.

The wavefront compensation controller 50, as the "compensation control unit", drives the angle compensator 100 and the wavefront curvature compensator 200 based on the measurement result by the sensor 36, so as to clear deviations from the target values. Thereby the wavefront compensator 34 corrects the angle and the wavefront curvature of the incoming laser beam to a predetermined angle and predetermined curvature, and outputs the laser beam. The wavefront compensator 34 adjusts the laser beam so as to have an angle and wavefront curvature of the beam required for the main-amp to amplify at high efficiency, and outputs the adjusted beam, and transforms the beam into a predetermined laser beam luminous flux. The transformed laser beam is amplified by the main-amp 35.

As FIG. 1 shows, the sensor 36, as the "wavefront measurement unit", is disposed at the downstream side of the main-amp 35, and detects the angle and wavefront curvature of the laser beam that enters from the main-amp 35. The configuration of the sensor 36 is sufficient only if the angle and wavefront curvature of the laser beam can be measured directly or indirectly.

Figure 12:
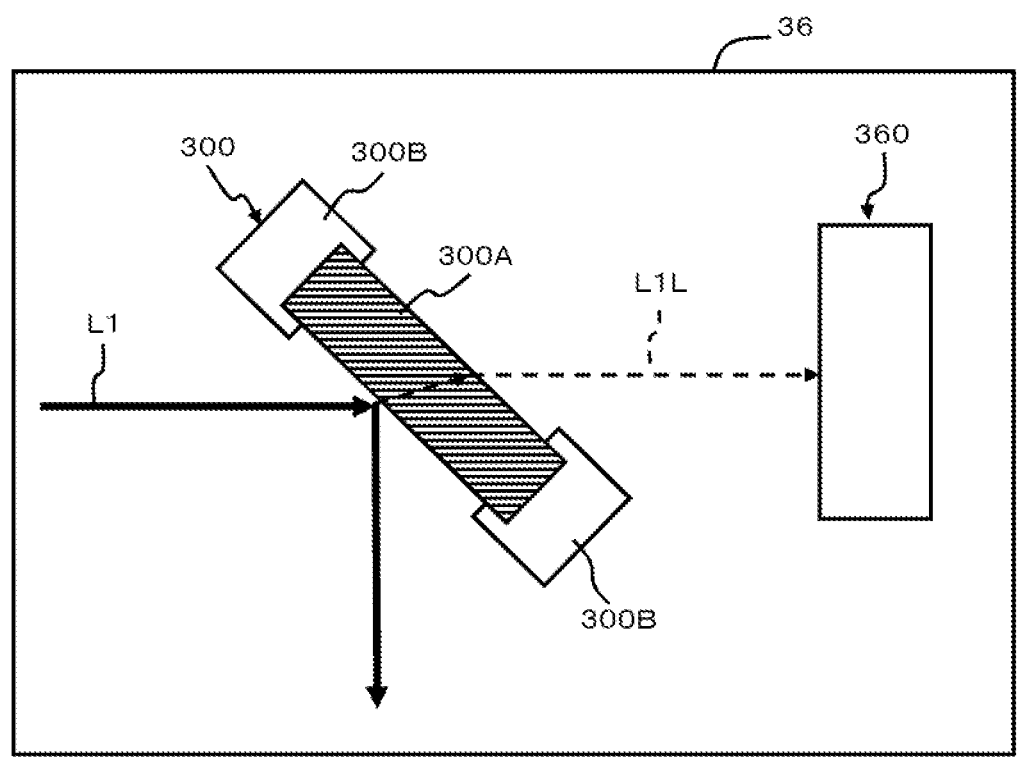
FIG. 12 is a diagram depicting a sensor.

An example of the sensor 36 will now be described with reference to FIG. 12. The sensor 36 has a reflecting mirror 300 that reflects the laser beam L1, and an optical sensor 360 for measuring a very small part of the laser beam L1L, that transmits through the reflecting mirror 300, for example.

The reflecting mirror 300 has a beam splitter substrate 300A coated by a coating that reflects the laser beam L1 at high reflectance, and a holder with a water-cooling jacket 300B for holding the beam splitter substrate 300A.

The beam splitter substrate 300A is constituted by such a substance as silicon (Si), zinc selenide (ZnSe), gallium arsenide (GaAs) and diamond. Most of the laser beam L1 is reflected by the high reflecting coating of the beam splitter substrate 300A, but a very small part of the laser beam L1L transmits through the beam splitter substrate 300A.

The very small part of the laser beam L1L that transmitted through the beam splitter substrate 300A enters the optical sensor unit 360 as a sample light. For the optical sensor unit 360, a beam profiler for measuring the intensity distribution of the laser beam, power sensor (calorimeter, pyro sensor) for measuring the laser duty and load of an optical element, and a wavefront sensor that can simultaneously measure the wavefront state of the laser beam and beam traveling direction (angle), for example, can be used.

As mentioned later, the wavefront state and angle (direction) of the laser beam may be measured using parameters related to the state of the laser beam (e.g. temperature of SA gas cell 330) and a data base acquired from simulation and experiment results.

Figure 13:
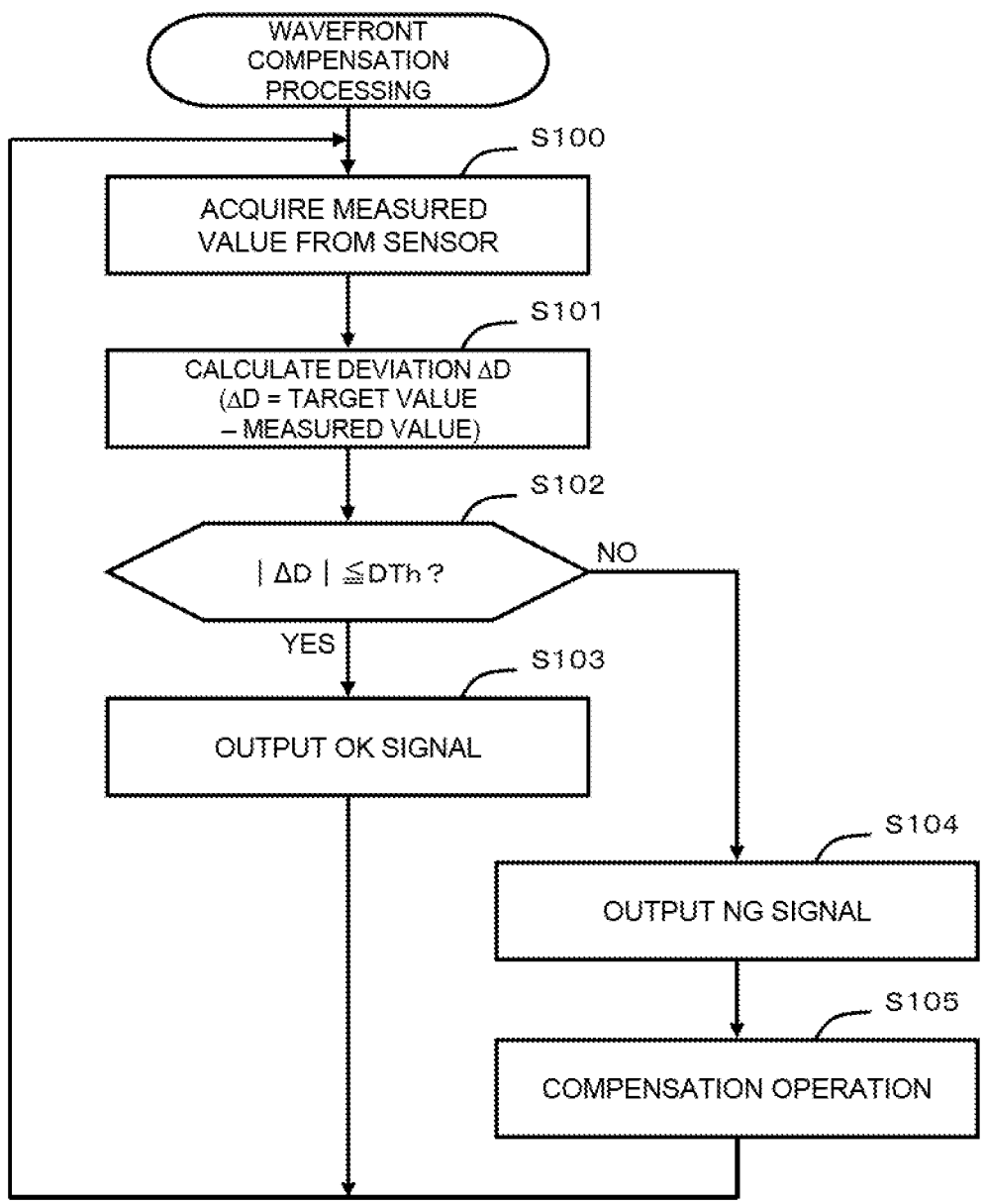
FIG. 13 is a flow chart depicting a wavefront compensating processing.

FIG. 13 is a flow chart depicting the wavefront compensation processing that is executed by the wavefront compensation controller (WFC-C) 50. This processing is executed at startup before the laser light source device 2 starts operation. In other words, in the adjustment stage of the laser light source device 2 before starting operation, a shutter, which is not illustrated, is closed before the laser beam is irradiated onto the target, for example, so that the laser beam does not enter the EUV chamber 10, and then the laser is oscillated and adjusted. When the seed light is output from the laser oscillator 20, the wavefront and angle (direction) of the laser beam line downstream from the laser oscillator 20 is adjusted so that the amplification efficiency of the main-amp 35 can be maintained as high.

The wavefront compensation controller 50 acquires the measured value from the sensor 36 (S100), and calculates the deviation ΔD, which is a difference between the target value and the measured value (S101). The wavefront compensation controller 50 determines whether the absolute value of ΔD is a predetermined allowed value Dth or less (S102). The allowable value Dth is set as a value which does not negatively influence the amplification characteristic of the laser beam, for example.

If the difference ΔD between the target value and the measured value is the allowed value Dth or less (S102: YES), the wavefront correction controller 50 outputs the OK signal to the laser controller 60 (S103). The OK signal is an adjustment completion signal to indicate that the wavefront of the laser beam was adjusted to a predetermined wavefront (curvature and direction).

If the absolute value of ΔD exceeds the allowed value Dth (S102: NO), on the other hand, the wavefront compensation controller 50 outputs an NG signal to the laser controller 60 (S104). The NG signal is an adjustment incompletion signal to indicate that the wavefront of the laser beam has not yet been adjusted to the predetermined wavefront.

The wavefront compensation controller (WFC-C) 50 outputs the drive signal to the wavefront compensator (WFC) 34, and has the wavefront compensator (WFC) 34 execute the compensation operation (S105). The wavefront compensator (WFC) 34 operates the angle compensator 100 and the wavefront curve compensator 200 according to the drive signal. By executing the compensation operation once or a plurality of times, the wavefront of the laser beam is matched with the predetermined wavefront.

Figure 14:
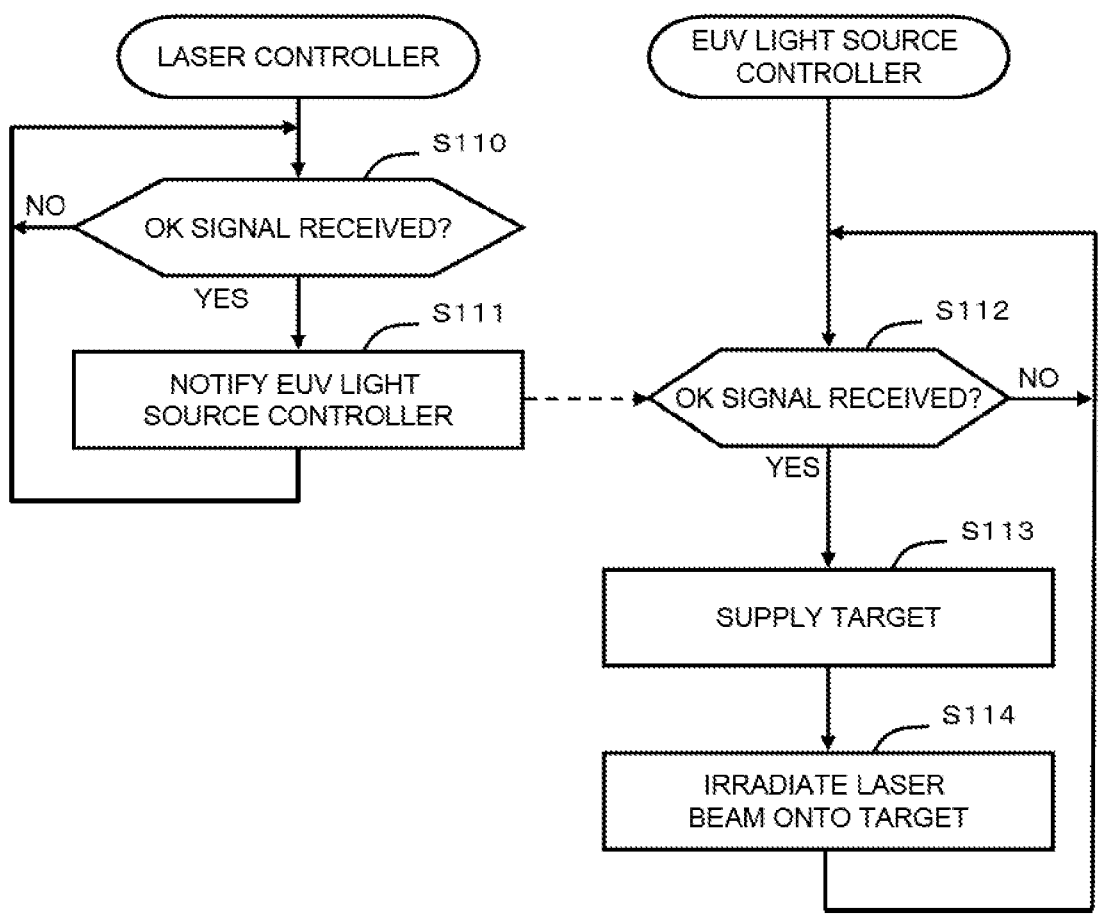
FIG. 14 is a flow chart depicting processing when a laser controller notifies adjustment completion to an EUV light source controller.

FIG. 14 is a flow chart depicting the operation of the laser controller 60 and the operation of the EUV light source controller 70. When the laser controller 60 receives an OK signal from the wavefront compensation controller (WFC-C) 50 (S110: YES), the laser controller 60 notifies the EUV light source controller 70 that adjustment of the laser light source device 2 has completed (5111).

The EUV light source controller 70 determines whether the OK signal was received from the laser controller (S112). When the adjustment completion notice or the OK signal is received from the laser controller 60, the EUV light source controller 70 supplies the droplet DP from the target material supply unit 15 to the chamber main body 11 (S113). Then the laser beam is irradiated onto the target (S114). Then it is determined whether the OK signal was received, and if the OK signal was not received, the EUV light source controller 70 cancels supplying the target and irradiating the laser beam onto the target. If the OK signal was received from the laser controller, on the other hand, the EUV light source controller 70 supplies the target (S113) and irradiates the laser beam onto the target (S114).

The laser controller 60 outputs the laser beam L1 from the laser oscillator 20 at a timing matching with the droplet DP supply timing. The laser beam L1 is amplified by the amplification system 30, and then enters the chamber 10 via the focusing system 40. The droplet DP, which is irradiated with the laser beam L1, turns into plasma PLZ. The EUV light L2 radiated from the plasma PLZ is collected to the intermediate focus IF by the EUV collector mirror 14, and is sent to the EUV exposure device 5.

The present embodiment having the above configuration exhibits the following effects. According to the present embodiment, the mixed gas including the SA gas is circulated and used in the SA device 33, and the temperature of the mixed gas is maintained to be a predetermined value, so the case of the EUV light source device 1, being operated continuously for a long time, can be supported. In other words, the EUV light source device 1 can operate the SA device 33 normally even when a high load state continues for a long time, and can supply a laser beam having stable pulse energy and pulse waveforms to the EUV light source device 1.

According to the present embodiment, each inlet 3336 (1) and 3336 (2) are disposed near the inner face side of the input window 3332 (1), so as to be axially symmetric with respect to the optical axis of the laser beam, and each outlet 3338 (1) and 3338 (2) are disposed near the inner face side of the output window 3332 (2), so as to be axially symmetric with respect to the optical axis of the laser beam. Therefore the temperature distribution of the windows 3332 (1) and 3332 (2) can be axially symmetric with respect to the optical axis of the laser beam by the mixed gas that flows to the inner face side of the windows 3332 (1) and 3332 (2). Hence the wavefront of the laser beam that transmitted through the SA gas cell 330 can be an axially symmetric wavefront, and the change of the wavefront can be minimized. As a result, the wavefront compensation by the wavefront compensator 34 can be easily executed.

According to the present embodiment, the wavefront compensator 34 for adjusting the curvature and direction of the laser beam, and the sensor 36 for detecting the curvature and direction of the wavefront of the laser beam, are disposed. Therefore according to the present embodiment, the curvature and direction (angle) of the wavefront of the laser beam that transmits through the SA gas cell 330 can be adjusted before starting operation of the laser light source device 2 by the wavefront compensator 34. Therefore even if a heat load is high in the operation state, the output characteristic of the laser beam can be stabilized.

Embodiment 2

A second embodiment will now be described with reference to FIG. 15. Each of the following embodiments is a variant form of the first embodiment. Therefore the main differences from the first embodiment are described. In the present embodiment, a total of four inlets 3336 (1), 3336 (2), 3336 (3) and 3336 (4) are disposed so that the SA gas turns around the inner surface of each window 3332 (1) and 3332 (2). In the present embodiment, two outlets 3338 (1) and 3338 (2) are disposed between each window 3332 (1) and 3332 (2).

Figure 15:
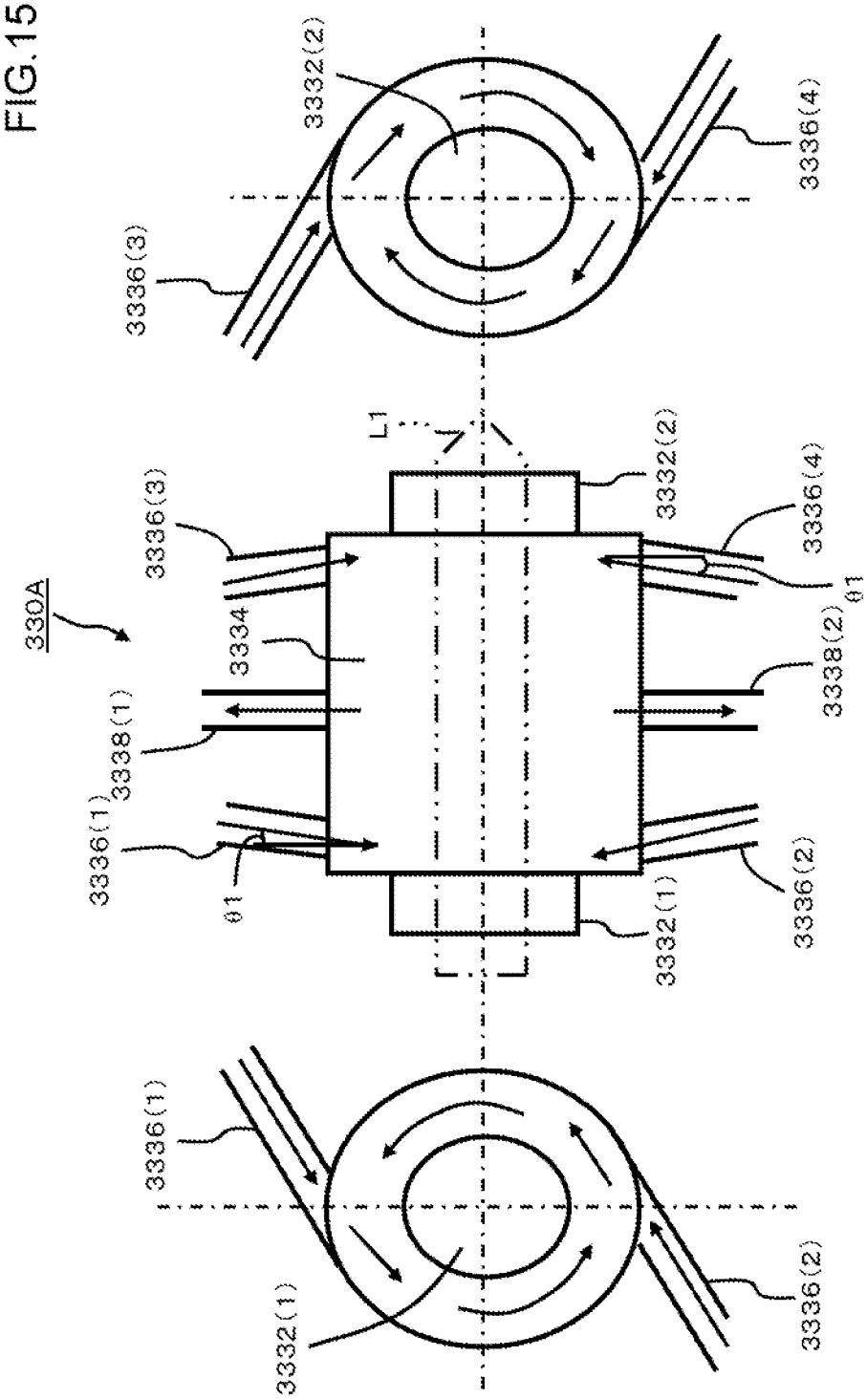
FIG. 15 is a diagram depicting configuration of an SA gas cell according to the second embodiment.

FIG. 15 is a diagram depicting an SA gas cell 330A. The drawing at the left in FIG. 15 shows a view from the input window 3332 (1), and the drawing at the center in FIG. 15 shows a side view of the SA gas cell 330A, and the drawing at the right in FIG. 15 shows a view from the output window 3332 (2).

Each inlet 3336 (1) and 3336 (2) at the input window side 3332 (1) is tilted at angle θ1, so that the SA gas turns and flows around the inner surface of the input window 3332 (1), and the inlets are disposed in parallel with the tangential line of the input window 3332 (1). Each inlet 3336 (1) and 3336 (2) is disposed so as to be axially symmetric with respect to the optical axis of the laser beam L1. The mixed gas that flows in from each inlet 3336 (1) and 3336 (2) flows to the center of the input window 3332 (1) while turning around in a predetermined direction, as shown at the left side of FIG. 15.

Then the mixed gas flows in a flow space 3334 along the optical axis of the laser beam approximately to the center of the flow space 3334. The two outlets 3338 (1) and 3338 (2) are disposed along the diameter direction so as to be connected to the center portion of the flow space 3334. Each outlet 3338 (1) and 3338 (2) is axially symmetric with respect to the optical axis of the laser beam.

While moving approximately to the center of the flow space 3334, the mixed gas absorbs the feeble light, not greater than a predetermined value, included in the laser beam L1, and increases its temperature. The mixed gas flows out from each outlet 3338 (1) and 3338 (2), and is sent to the heat exchanger 332 via the exhaust pipeline 333 (2).

As described on each inlet 3336 (1) and 3336 (2) at the input window 3332 (1) side, each inlet 3336 (3) and 3336 (4) at the output window 3332 (2) side is tilted at angle θ1, so that the SA gas turns and flows around the inner surface of the output window 3332 (2), and the inlets are disposed in parallel with the tangential line of the output window 3332 (2). Each inlet 3336 (3) and 3336 (4) is disposed so as to be axially symmetric with respect to the optical axis of the laser beam L1. The mixed gas that flows in from each inlet 3336 (3) and 3336 (4) flows to the center of the output window 3332 (2) while turning around in a predetermined direction, as shown at the right side of FIG. 15.

Then the mixed gas that turned around the inner surface of the output window 3332 (2) moves in the flow space 3334 along the optical axis of the laser beam toward the outlets 3338 (1) and 3338 (2). While moving, the mixed gas absorbs feeble light, not greater than a predetermined value, included in the laser beam.

The turning direction of the mixed gas at the input window 3332 (1) side and the turning direction of the mixed gas at the output window 3332 (2) side are the same.

The present embodiment having this configuration also has effects similar to the first embodiment. Furthermore according to the present embodiment, a plurality of inlets, in parallel with the tangential direction of each window, are disposed on both the input window 3332 (1) and the output window 3332 (2), so that the mixed gas turns around and flows on the inner surface of each window. Since the mixed gas passes on the inner surface of each window 3332 (1) and 3332 (2) while turning around each window, the temperature distribution of each windows 3332 (1) and 3332 (2) can be axially symmetric with respect to the optical axis of the laser beam.

Embodiment 3

Figure 16:
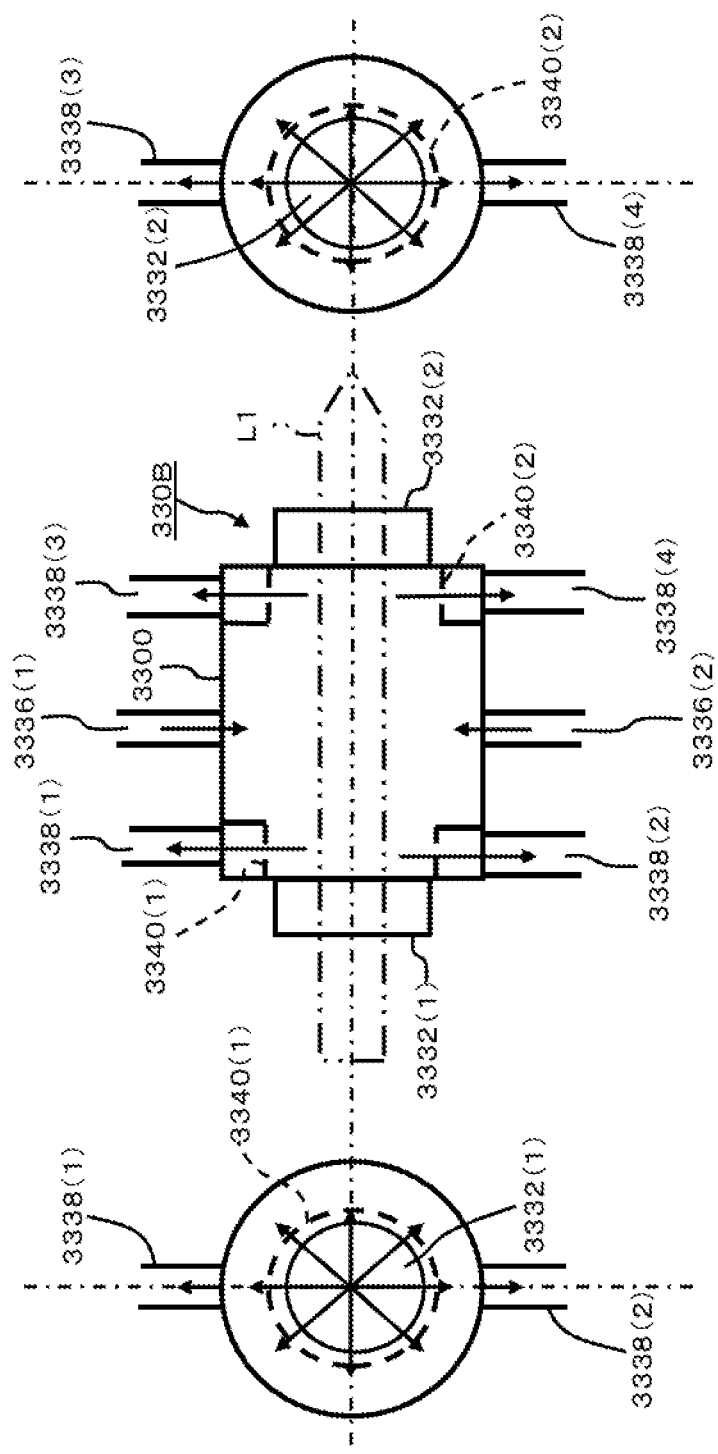
FIG. 16 is a diagram depicting configuration of an SA gas cell according to the third embodiment.
Figure 17:
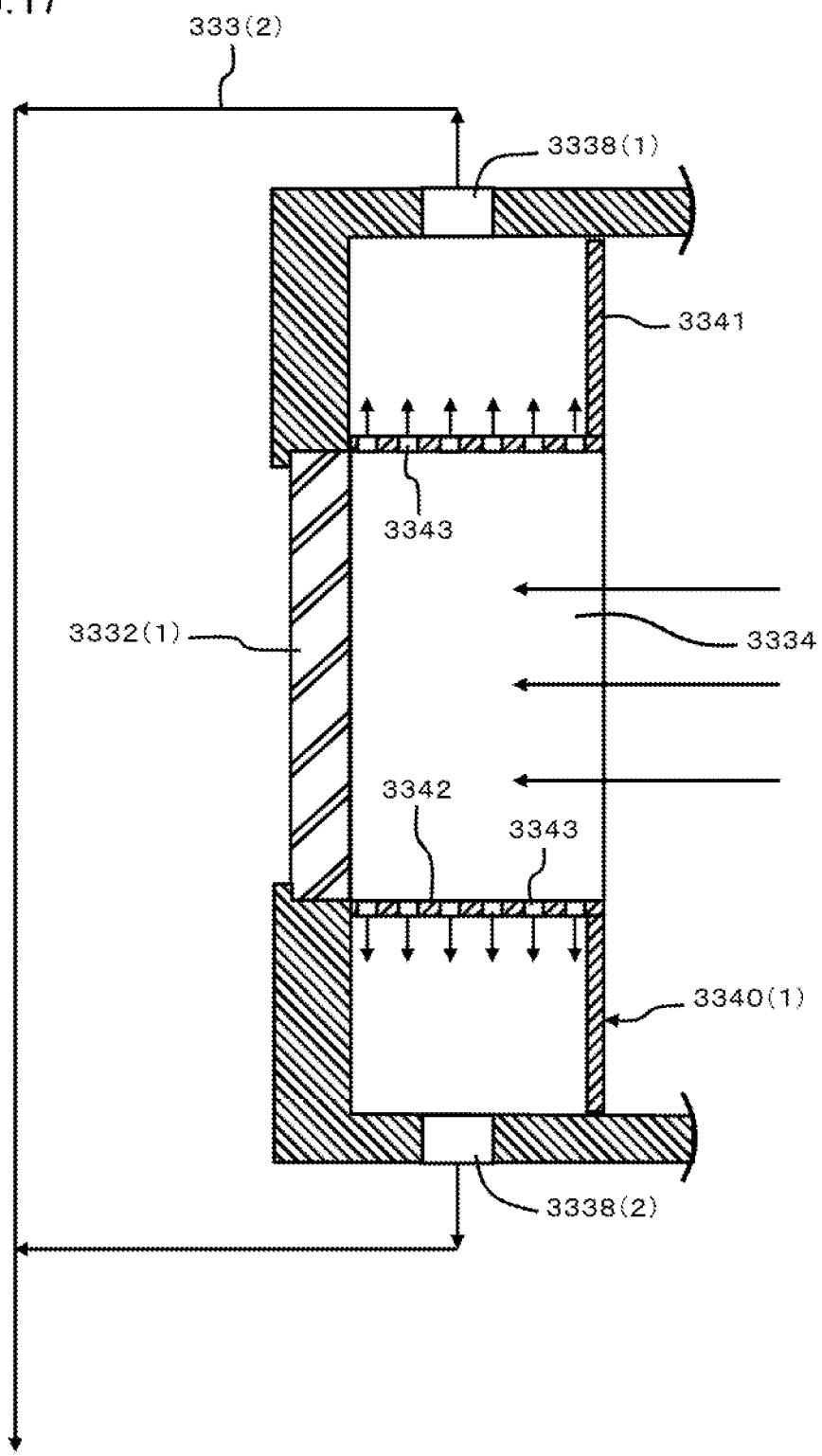
FIG. 17 is a cross-sectional view of a porus cylindrical pipe.

A third embodiment will now be described with reference to FIG. 16 and FIG. 17. In the present embodiment, porous cylindrical tubes 3340 (1) and 3340 (2), as "flow control elements", are disposed in the windows 3332 (1) and 3332 (2) respectively, so that the mixed gas in the flow space 3334 uniformly moves to each outlet 3338 (1) to 3338 (4). FIG. 16 is a diagram depicting an SA gas cell 330B according to the present embodiment. FIG. 17 is a cross-sectional view of a porous cylindrical tube 3340.

As the drawing at the left in FIG. 16 shows, two outlets 3338 (1) and 3338 (2) are disposed in the diameter direction so as to be axially symmetric with respect to the optical axis of the laser beam. The porous cylindrical tube 3340 (1) is disposed between the outer circumference side of the inner face of the input window 3332 (1) and the outlets 3338 (1) and 3338 (2).

As the drawing at the right in FIG. 16 shows, two outlets 3338 (3) and 3338 (4) are also disposed in the diameter direction, so as to be axially symmetric with respect to the optical axis of the laser beam. The porous cylindrical tube 3340 (2) is also disposed between the outer circumference side of the inner face of the output window 3332 (2) and the outlets 3338 (3) and 3338 (4).

Between each window 3332 (1) and 3332 (2), two inlets 3336 (1) and 3336 (2) are disposed in the diameter direction, so as to be axially symmetric with respect to the optical axis of the laser beam. The mixed gas flows in from each inlet 3336 (1) and 3336 (2) to the center portion of the flow space 3334. The mixed gas moves along the optical axis of the laser beam toward each outlet 3338 (1) to 3338 (4) at the left and right, while absorbing feeble light included in the laser beam. The mixed gas flows into each outlet 3338 (1) to 3338 (4) via the porous cylindrical tubes 3340 (1) and 3340 (2), and is exhausted to the exhaust pipeline 333 (2) via each outlet 3338 (1) to 3338 (4).

Now the cross-sectional view in FIG. 17 is referred to. FIG. 17 is a cross-sectional view depicting one side of the porous cylindrical tube 3340 (1). Description of the other side of the porous cylindrical tube 3340 (2), which is constructed in the same way as the one side of the porous cylindrical tube 3340 (1), is omitted.

The porous cylindrical tube 3340 (1) is coaxially disposed with the windows 3332 (1) and 3332 (2). As a result, the center of the porous cylindrical tube 3340 (1) approximately matches the center of the optical axis of the laser beam.

The porous cylindrical rube 3340 (1) has a collar portion 3341 and tubular portion 3342 which is integrated with the collar portion 3341. Many small holes 3343 for letting mixed gas flow are formed on the tubular portion 3342. The small holes 3343 correspond to the "flow holes". The tubular portion 3342 is formed to have a tubular shape, constituted by porous alumina ceramic or porous stainless sintered steel, for example.

One edge (left hand side in FIG. 17) of the tubular portion 3342 contacts the inner wall of the holder 3300, which is disposed at the inner face side of the input window 3332 (1). The other edge of the tubular portion 3342 (right hand side in FIG. 17) is integrated with the ring-shaped collar portion 3341.

The inner circumference side of the collar portion 3341 is integrated with the other edge of the tubular portion 3342, and the outer circumference side of the collar portion 3341 contacts the inner circumference of the holder 3300. The small holes are not formed in the collar portion 3341, therefore mixed gas cannot pass through the collar portion 3341 in any substantial way. However the collar portion 3341 may be constituted by a porous material, so that mixed gas can flow through.

In the present embodiment, each outlet 3338 (1) to 3338 (4) are disposed at each window 3332 (1) and 3332 (2) side, and the porous cylindrical tubes 3340 (1) and 3340 (2), that have many small holes 3343, are disposed so as to cover each outlet 3338 (1) to 3338 (4). The mixed gas that flows into the tubular portions 3342 of the porous cylindrical tubes 3340 (1) and 3340 (2) flow to the outlet side via each small hole 3343. As the drawings at the left and right of FIG. 16 show, the mixed gas flows out radially from the center axis of the SA gas cell 330B (this center axis approximately matches the optical axis of the laser beam).

Therefore according to the present embodiment, the mixed gas can radially and uniformly flow around the optical axis of the laser beam at the inner face side of the windows 3332 (1) and 3332 (2). Thereby the temperature distribution of the mixed gas that flows at the inner face side of each window 3332 (1) and 3332 (2) can be made axially symmetric with respect to the laser optical axis. As a result, the temperature distribution of each window 3332 (1) and 3332 (2) can be axially symmetric with respect to the optical axis of the laser beam.

Hence according to the present embodiment, just like the above embodiments, the wavefront profile of the laser beam that transmits through the SA gas cell 330B can be axially symmetric, and compensation by the wavefront compensator 34 can be executed easily.

Embodiment 4

The fourth embodiment will now be described with reference to FIG. 18. According to the present embodiment, a plurality of SA gas cells 330C (1) to 330C (4) are linked, and the flow directions of the mixed gas in adjacent SA gas cells are set to be opposite from each other. Also according to the present embodiment, the windows 3332 (2) to 3332 (4), between each SA gas cell 330C (1) to 330C (4), are commonly used.

Figure 18:
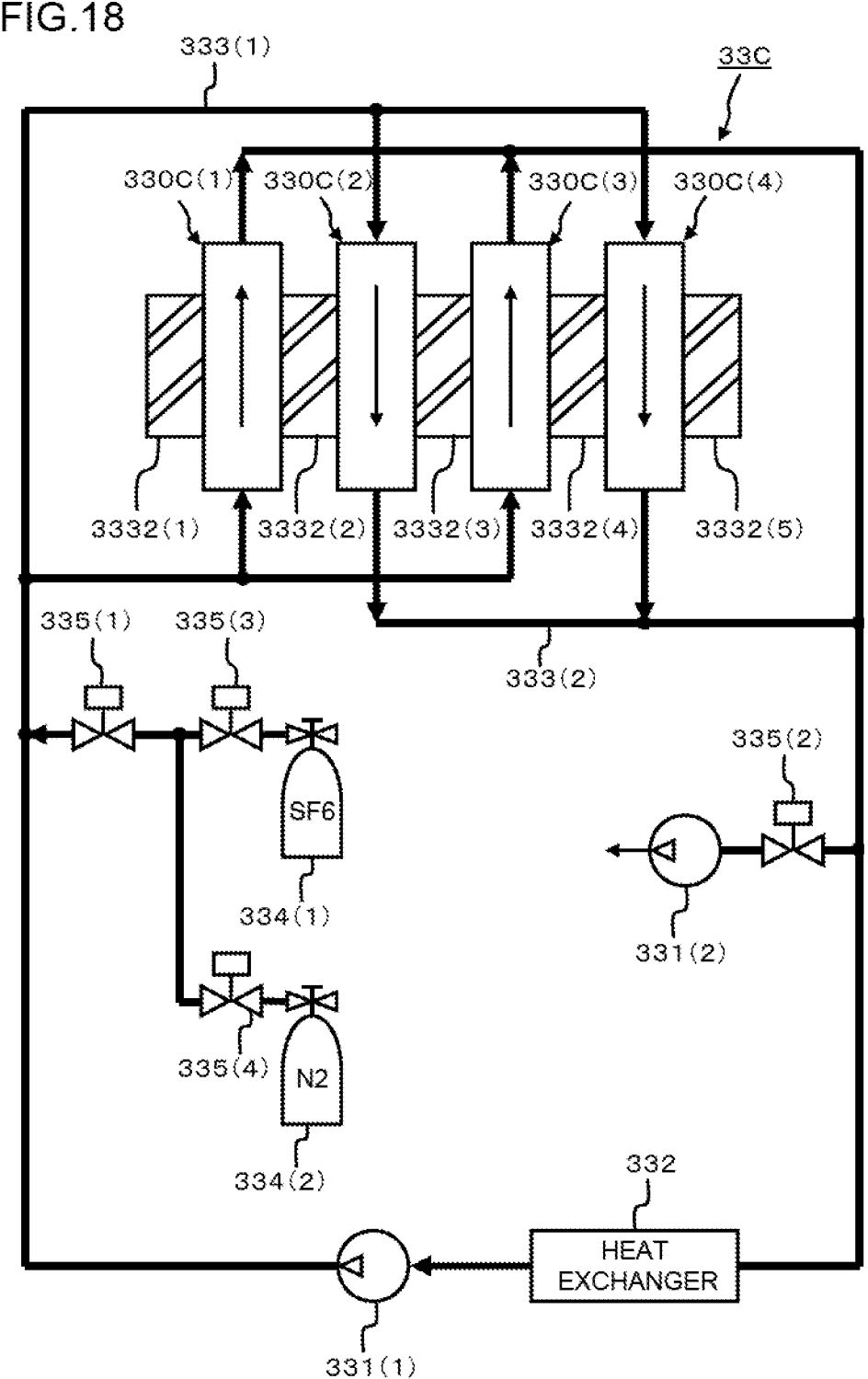
FIG. 18 is a block diagram of an SA device according to the fourth embodiment.

The block diagram in FIG. 18 shows the SA device 33C in a state where the SA gas cell controller 80, gas temperature controller 82, laser controller 60, pressure sensor 336 (1) and temperature sensor 336 (2) are removed for convenience of description.

A total of four SA gas cells 330C (1) to 330C (4) are disposed next to each other, and are parallel with the supply pipeline 333 (1) and exhaust pipeline 333 (2). Two adjacent SA gas cells form a pair. The first SA gas cell 330C (1) and the second SA gas cell 330C (2) form a first pair. The third SA gas cell 330C (3) and the fourth SA gas cell 330C (4) form a second pair. The flow directions of the mixed gas are opposite in the adjacent SA gas cells of each pair.

In the example in FIG. 18, the mixed gas in the first SA gas cell 330C (1) flows from bottom to top in FIG. 18, and the mixed gas in the second SA gas cell 330C (2), adjacent to the first SA gas cell 330C (1), flows from the top to bottom in FIG. 18. The mixed gas in the third SA gas cell 330C (3), adjacent to the second SA gas cell 330C (2), flows from bottom to top in FIG. 18, and the mixed gas in the fourth SA gas cell 330C (4), adjacent to the third SA gas cell 330C (3), flows from top to bottom.

According to the present embodiment, where each SA gas cell 330C (1) to 330C (4) are linked, the windows between the SA gas cells can be shared. The first window 3332 (1) is an input window of the first SA gas cell 330C (1). The second window 3332 (2) is an output window of the first SA gas cell 330C (1), and an input window of the second SA gas cell 330C (2). The third window 3332 (3) is an output window of the second SA gas cell 330C (2), and an input window of the fourth SA gas cell 330C (4). The fifth window 3332 (5) is an output window of the fourth SA gas cell 330C (4).

According to the present embodiment, flow directions of the mixed gas in adjacent SA gas cells are opposite from each other. When the laser beam transmits through one of SA gas cells, the wavefront thereof is distorted in one direction according to the temperature distribution of the window. In the other of SA gas cells, the flow direction of the mixed gas is the opposite of the flow direction of the one of SA gas cells, and similarly its temperature distribution is opposite the temperature distribution of the one of SA gas cells. Therefore when the mixed gas transmitted through the one of SA gas cells transmits through the other of SA gas cells, a function to distort the wavefront in the opposite direction is generated, and the generation of temperature distribution in the intermediate portion windows 3332 (2), 3332 (3) and 3332 (4) is suppressed, and as a result, a change of wavefront of the laser beam is suppressed.

Therefore the present embodiment has the same effects as the above mentioned embodiments. According to the present embodiment, the case of disposing the gas pipelines of each SA gas cell 330C (1) to 330C (4) in parallel was described, but the gas pipelines of each SA gas cell 330C (1) to 330C (4) may be disposed in series instead.

In other words, the supply pipelines 333 (1) is connected only to the inlet of the first SA gas cell 330C (1), the outlet of the first SA gas cell 330C (1) is connected to the inlet of the second SA gas cell 330C (2), and the outlet of the second SA gas cell 330C (2) is connected to the inlet of the third SA gas cell 330C (3). The outlet of the third SA gas cell 330C (3) may be connected to the inlet of the fourth SA gas cell 330C (4), and the exhaust pipeline 333 (2) may be connected to the outlet of the fourth SA gas cell 330C (4).

Also according to the present embodiment, a case of letting the mixed gas flow from top to bottom, or from bottom to top in FIG. 18, was described. However the mixed gas may flow in another direction, such as the lateral direction or diagonal direction, when a window is viewed from the front face instead. It is sufficient only if the flow directions of the mixed gas in adjacent SA gas cells are set to be opposite from each other.

Also according to the present embodiment, a case of linking four SA gas cells 330C (1) to 330C (4) was described, but two or six or greater even number of SA gas cells may be linked instead. Thereby the windows can be shared, and the manufacturing cost of the SA devices can be decreased.

Also according to the present embodiment, a plurality of SA gas cells 330C (1) to 330C (4) are linked sharing windows, but the present invention is not limited to this, for each SA gas cell may be disposed independently such that the flow directions of the mixed gas in the adjacent SA gas cells can be opposite from each other.

Embodiment 5

Figure 19:
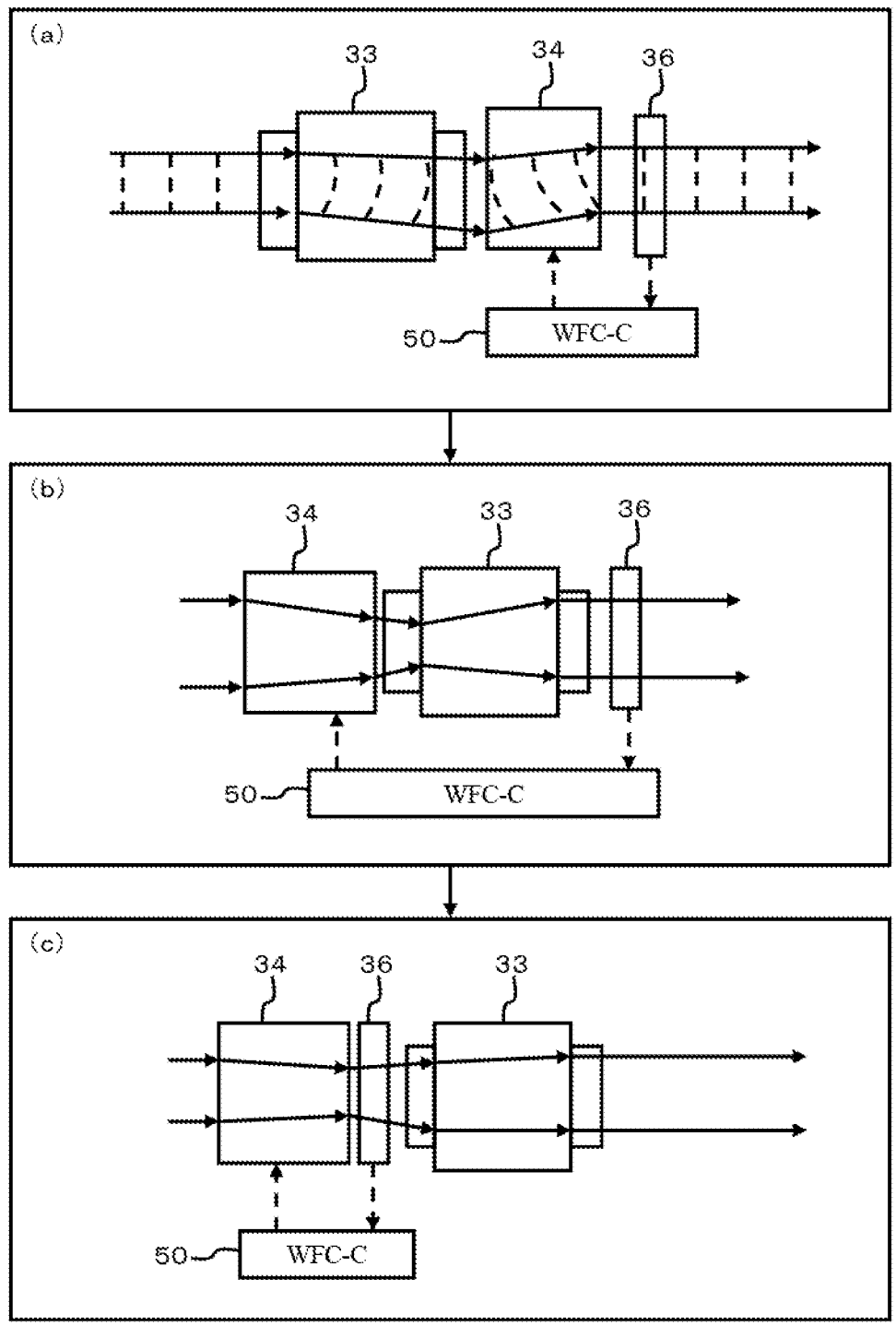
FIG. 19 are diagrams depicting a method for installing the wavefront compensator according to the fifth embodiment.

A fifth embodiment will now be described with reference to FIG. 19 and FIG. 20. In the present embodiment, variant forms of the positional relationship of the wavefront compensator 34, sensor 36 and SA device 33 will be described. Normally the laser beam transmits through the SA gas cell 330, but in this embodiment, it is assumed that the laser beam transmits through the SA device 33 for convenience of description.

FIG. 19A shows a configuration where the wavefront compensator 34 and the sensor 36 are disposed in the downstream side of the SA device 33. The laser beam, as a plane wave, transmits through the SA device 33 and the wavefront thereof becomes a convex wavefront. The direction of the wavefront of the laser beam that transmits through the SA device 33 is inclined downward in FIG. 19A. The wavefront of the laser beam that is transmitted through the SA device 33 is compensated by the wavefront compensator 34, and the compensated laser beam is input to the sensor 36.

The wavefront compensation controller (WFC-C) 50 controls the wavefront compensator 34 based on the beam characteristics detected by the sensor 36, so as to maintain predetermined beam characteristics. In this embodiment, the laser beam is output as a plane wave. The predetermined beam characteristics refer to a plane wave of which traveling direction (angle) is the same as the direction before the laser beam entered the SA device 33.

FIG. 19B shows a case when the wavefront compensator 34 is disposed at the upstream side of the SA device 33, and the sensor 36 is disposed at the downstream side of the SA device 33. The wavefront of the laser beam is compensated by the laser beam passing through the wavefront compensator 34. The laser beam of which wavefront was compensated transmits through the SA device 33, and then enters the sensor

36. Based on the beam characteristics detected by the sensor 36, the wavefront compensation controller 50 controls the wavefront compensator 34, so as to maintain predetermined beam characteristics.

FIG. 19C shows a case when the wavefront compensator 34 and the sensor 36 are disposed in this sequence at the upstream side of the SA device 33. The laser beam transmits through the wavefront compensator 34 and reaches the sensor 36. Based on the beam characteristics detected by the sensor 36, the wavefront compensation controller 50 controls the wavefront compensator 34 to maintain predetermined beam characteristics. The laser beam after passing through the sensor 36 enters the SA device 33. The laser beam is transformed into a plane wave by transmitting through the SA device 33, and is output. In this example, the wavefront compensation controller 50 estimates the distortion of the wavefront in the SA device 33, and controls the wavefront compensator 34 so that the wavefront returns to normal when the laser beam transmits through the wavefront compensator 34 and the SA device 33.

Figure 20:
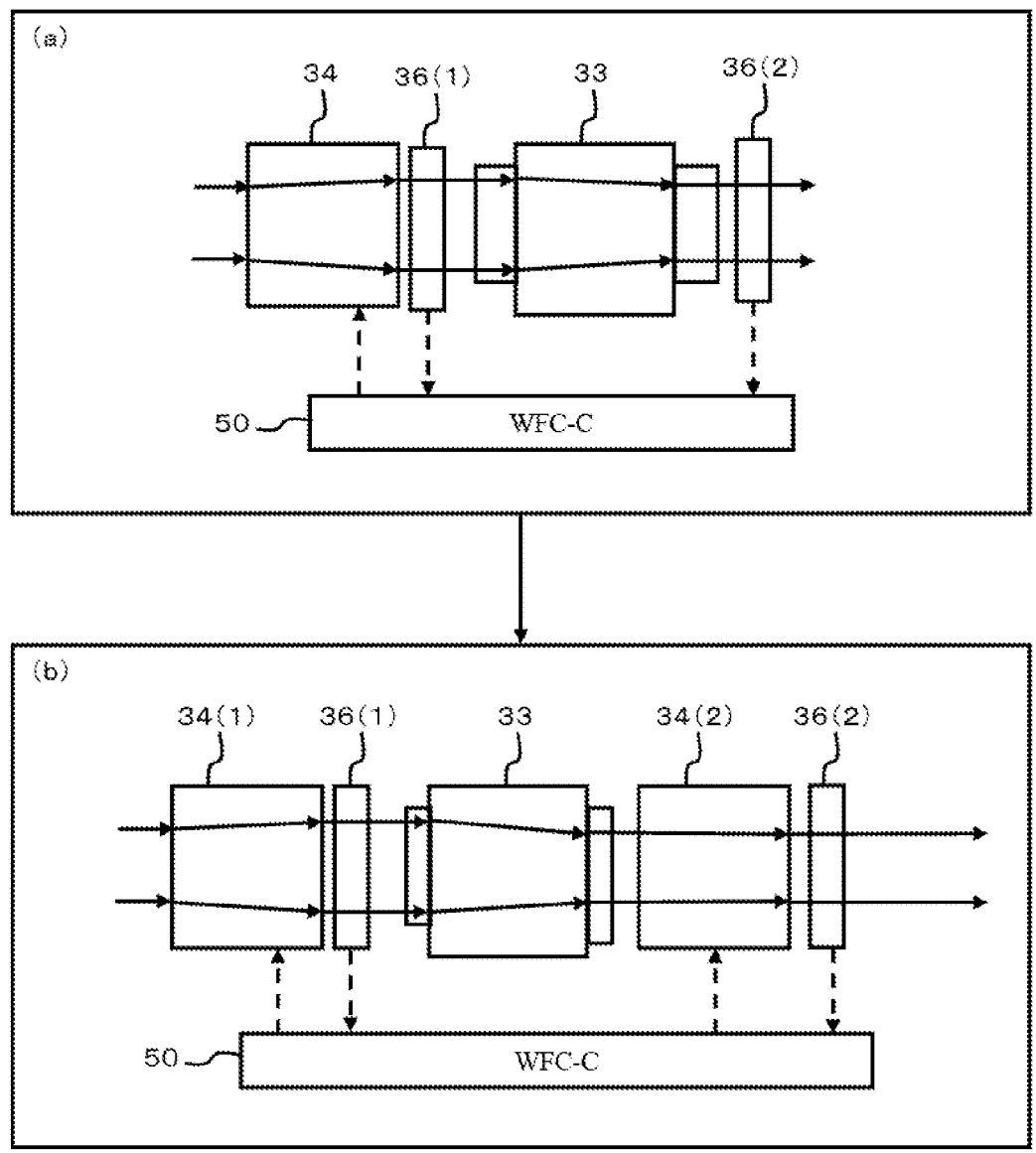
FIG. 20 are diagrams continuing from FIG. 19.

As shown in FIG. 20, a plurality of sensors 36 or a plurality of wavefront compensators 34 may be disposed. In FIG. 20A, the wavefront compensator 34 and the sensor 36 (1) are disposed in this sequence at the upstream side of the SA device 33, and another sensor 36 (2) is disposed at the downstream side of the SA device 33.

The laser beam transmits through the wavefront compensator 34, and is input to the first sensor 36 (1). The first sensor 36 (1) measures the characteristics of the laser beam that is input to the SA device 33, and sends the measurement result to the wavefront compensation controller 50.

After transmitting through the SA device 33, the laser beam is input to the second sensor 36 (2). The second sensor 36 (2) measures the characteristics of the laser beam, and sends it to the wavefront compensation controller (WFC-C) 50. Based on the two beam characteristics detected by the first sensor 36 (1) and the second sensor 36 (2), the wavefront compensation controller (WFC-C) 50 controls the wavefront compensator (WFC) 34, so as to reach predetermined beam characteristics respectively at the positions of both sensors. After passing through the second sensor 36 (2), the laser beam is output as a plane wave.

FIG. 20B shows a case when the first wavefront compensator (WFC) 34 (1) and the first sensor 36(1) are disposed at the upstream side of the SA device 33, and the second wavefront compensator (WFC) 34 (2) and the second sensor 36(2) are disposed at the downstream side of the SA device 33.

After transmitting through the wavefront compensator (WFC) 34(1), the laser beam is input to the sensor 36 (1). The sensor 36 (1) measures the characteristics of the laser beam that were input to the SA device 33, and outputs the measurement result to the wavefront compensation controller (WFC-C) 50. The laser beam that passed through the sensor 36 (1) transmits through the SA device 33, and is input to the wavefront compensator (WFC) 34 (2). After transmitting through the wavefront compensator (WFC) 34 (2), the laser beam is input to the sensor 36 (2). The sensor 36 (2) detects the characteristics of the laser beam, and outputs it to the wavefront correction controller (WFC-C) 50. Based on the two beam characteristics detected by the first sensor 36 (1) and the second sensor 36 (2), the wavefront compensation controller (WFC-1) 50 controls the first wavefront compensator (WFC) 34 (1) and the second wavefront compensator (WFC) 34 (2), so that predetermined beam characteristics are implemented respectively at the positions of these sensors.

Embodiment 6

The sixth embodiment will now be described with reference to FIG. 21. In the present embodiment, a case of constituting the wavefront curvature compensator 200 by a transmission optical system will be described. As FIG. 21 shows, the wavefront curvature compensator 200 can be constituted by a convex lens 201 and a concave lens 202.

FIG. 21A shows a state of outputting a plane wave, which was input, as a plane wave. If the focal position of the convex lens 201 and the focal position of the concave lens 202 match at a confocal point cf, then the laser beam in the plane wave state that transmitted through the convex lens 201 is transformed into a concave wavefront. The laser beam of the concave wavefront that passed through the concave lens 202 is transformed into a plane wave.

Figure 21:
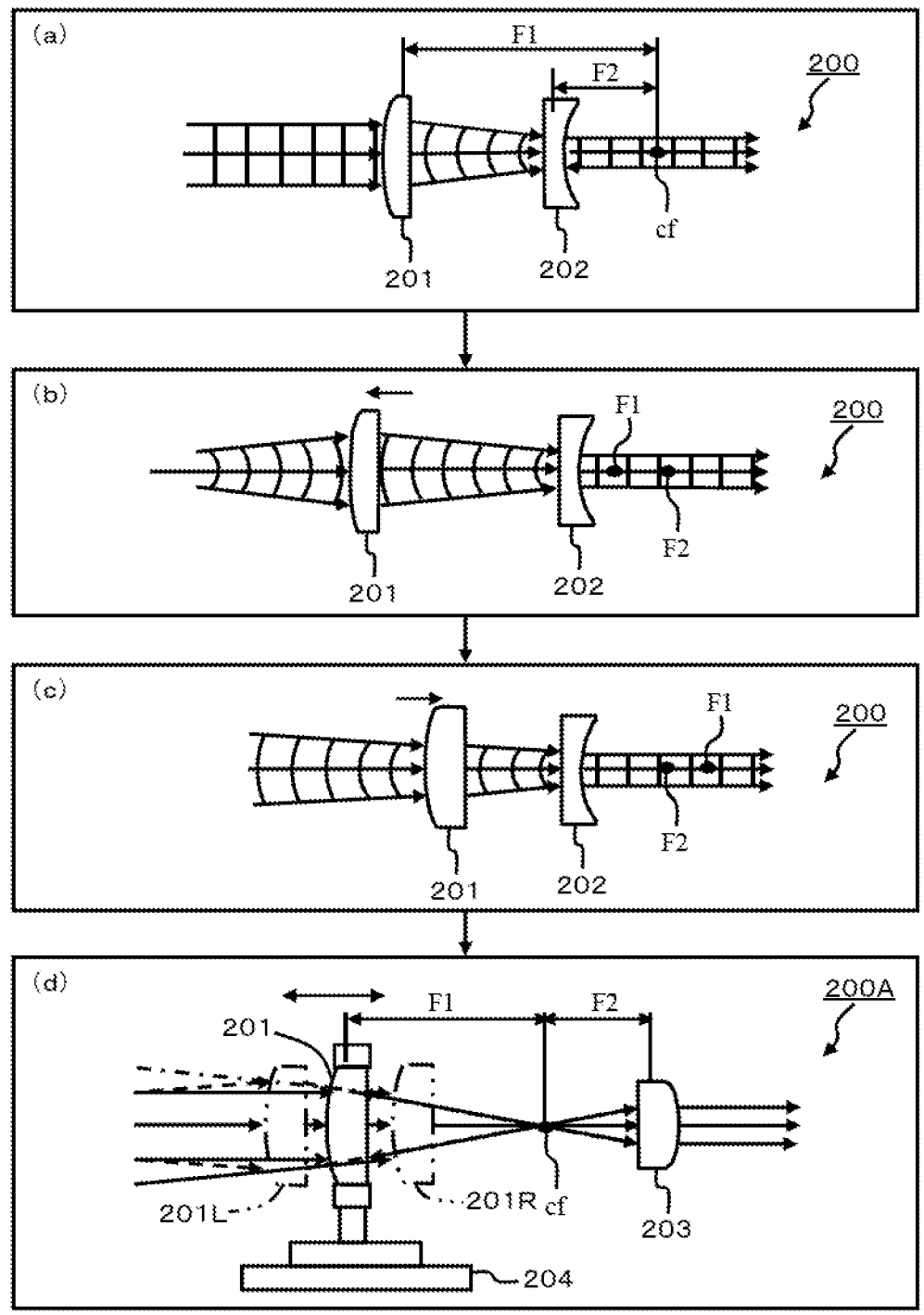
FIG. 21 are diagrams depicting a configuration of a wavefront curvature compensator according to the sixth embodiment.

FIG. 21B shows a state of transforming a convex wave into a plane wave. The convex lens 201 is shifted to the upstream side (left side in FIG. 21) from the position shown in FIG. 21A. The focal position F1 of the convex lens 201 and the focal position F2 of the concave lens are both on the optical axis of the laser beam, and the focal point F1 of the convex lens 201 is more to the upstream side.

When a laser beam is changed into a convex wave due to the influence of heat in the SA device 33, the laser beam enters the convex lens 201 in a state of divergent light, and is changed into a concave wave by the convex lens 201. The laser beam transformed into a concave wave transmits through the concave lens 202, and thereby is transformed into a plane wave.

FIG. 21C shows a state of transforming the concave wave into a plane wave. The focal position F1 of the convex lens 201 and the focal position F2 of the concave lens 202 are on a same optical axis, and the focal position F2 is disposed at the upstream side of the focal position F1. When the laser beam of the convex wave enters the convex lens 201, the convex wave is transformed into a concave wave. The laser beam of the concave wave passes through the concave lens 202, and thereby is transformed into a plane wave.

FIG. 21D shows an example of constructing the wavefront curvature compensator 200 using two convex lenses 201 and 203. The convex lens 201 can shift in the lateral direction (optical axis direction) in FIG. 21, by a single axis stage 204.

To output a laser beam, that is input as a plane wave (parallel light), as a plane wave (parallel light), the position of the convex lens 201 is set so that the focal position of the convex lens 201 and the focal position of the convex lens 203 match.

If the laser beam becomes convergent light (concave wavefront) by a heat load, the convex lens 201 is shifted to the downstream position 201R on the optical axis by the single axis stage 204. If the laser beam becomes divergent light (convex wavefront), on the other hand, the convex lens 201 is shifted to the upstream position 201L on the optical axis by the single axis stage 204.

Embodiment 7

Figure 22:
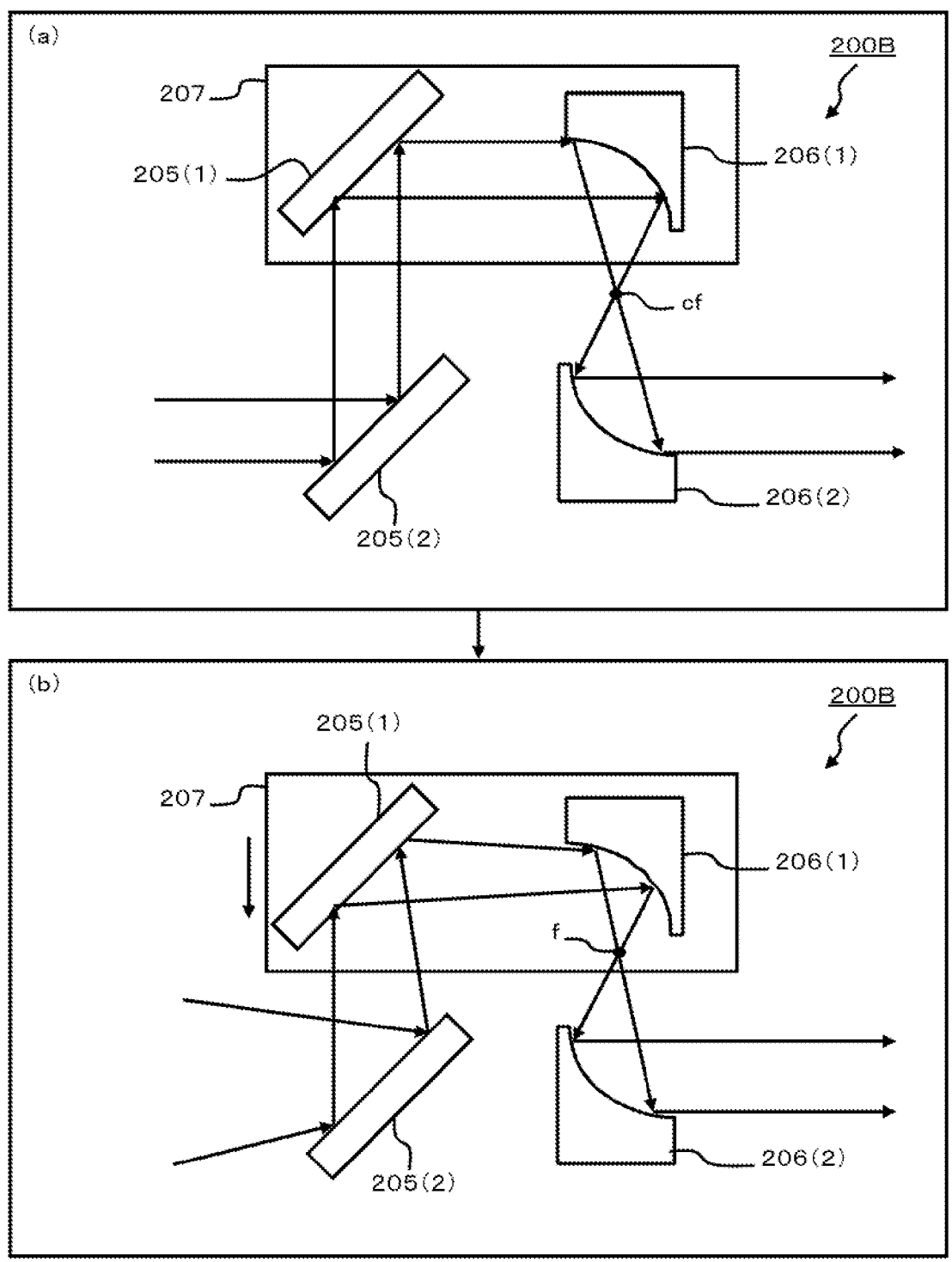
FIG. 22 are diagrams depicting a configuration of a wavefront curvature compensator according to the seventh embodiment.

A seventh embodiment will now be described with reference to FIG. 22. According to the present embodiment, an example of a case of constructing the wavefront curvature compensator 200B as a reflection optical system will be described. The wavefront curvature compensator 200B has two reflecting mirrors 205 (1) and 205 (2), and two off-axis parabolic concave mirrors 206 (1) and 206 (2). The reflecting mirror 205 (1) and the off-axis parabolic concave mirror 206 (1), which are positioned at the upper side in FIG. 22, are installed in plate 207. The plate 207 is moveable in the vertical direction in FIG. 22. Each mirror 205 (1) and 206 (1) moves vertically along with the plate 207.

FIG. 22A is an arrangement in the case when the laser beam that was input as parallel light (plane wave) is output still as parallel light (plane wave). In this case, the focal position of the off-axis parabolic concave mirror 206 (1) and the focal position of the off-axis parabolic concave mirror 206 (2) are matched to be a state of the confocal point cf.

The laser beam enters from the left side (upstream) in FIG. 22 to the reflecting mirror 205 (2), is reflected, and enters another reflecting mirror 205 (1). The laser beam reflected by this reflecting mirror 205 (1) enters the off-axis parabolic concave mirror 206 (1). The laser beam is reflected by the off-axis parabolic concave mirror 206 (1) at a 45 degrees reflection angle, and is focused at the focal position cf. The laser beam diverged from the focal position cf and enters the off-axis parabolic concave mirror 206 (2), and is reflected at a 45 degrees reflection angle.

FIG. 22B is an arrangement when the laser beam that is input as convergent light (concave wavefront) is transformed into parallel light (plane wave), and is output. In this case, the plate 207 is shifted downward, and the focal point position f of the off-axis parabolic concave mirror 206 (1) is shifted to downstream on the optical axis. Thereby the focal point position of the off-axis parabolic concave mirror 206 (1) and the focal position of the off-axis parabolic concave mirror 206 (2) are matched on the optical axis.

To enter the laser beam as divergent light (convex wavefront), the plate 207 is shifted to the upper side in FIG. 22.

In the wavefront curvature compensator 200B that has this configuration, the reflecting mirror 205 (1) and the off-axis parabolic concave mirror 206 (1) are secured on the plate 207, and both the mirrors 205 (1) and 206 (1) are simultaneously shifted on the optical axis (vertical direction in FIG. 22). Thereby according to the present embodiment, the optical axis of the input light and the optical axis of the output light are matched, and the wavefront curvature can be compensated.

The wavefront curvature compensator 200B of the present embodiment is constructed as a reflection optical system, so even if the laser beam passes through the wavefront curvature compensator 200B, the change of the wavefront due to heat of the wavefront curvature compensator itself can be minimized. Therefore even if a high output laser beam is used, the wavefront curvature can be compensated at high precision.

Embodiment 8

Figure 23:
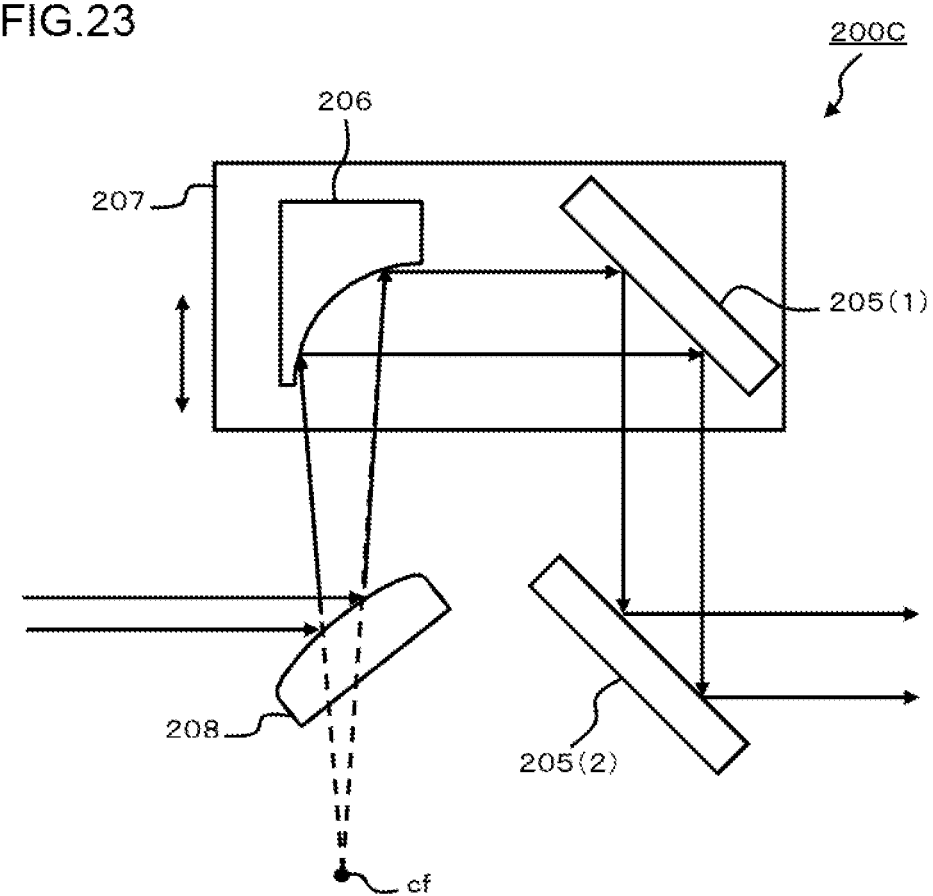
FIG. 23 is a diagram depicting a configuration of a wavefront curvature compensator according to the eighth embodiment.

An eighth embodiment will now be described with reference to FIG. 23. The wavefront curvature compensator 200C of the present embodiment is constituted by a reflection optical system including an off-axis parabolic concave mirror 206, an off-axis parabolic convex mirror 208, and two reflecting mirrors 205(1) and 205(2).

The off-axis parabolic concave mirror 206 and the reflection mirror 205 (1) are installed on the plate 207 that can move vertically. The focal position of the off-axis parabolic convex mirror 208 and the focal position of the off-axis parabolic concave mirror 206 are disposed so as to match at cf.

The laser beam of the plane wavefront is reflected by the off-axis parabolic convex mirror 208, enters the off-axis parabolic concave mirror 206 as divergent light, and is transformed into a plane wave. The laser beams of the plane wave are reflected by the reflecting mirrors 205 (1) and 205 (2), and are output. Just like the seventh embodiment, the wavefront of the input laser beam can be corrected to the plane wave and output by shifting the plate 207 vertically.

The present embodiment constructed like this also exhibits the effects, just like the seventh embodiment. Furthermore according to the present embodiment, the distance between both the off-axis parabolic mirrors can be decreased by combining the off-axis parabolic concave surface 206 and the off-axis parabolic convex surface 208. As a result, general dimensions can be decreased compared with the seventh embodiment.

Embodiment 9

A ninth embodiment will now be described with reference to FIG. 24 and FIG. 25. According to the present embodiment, the wavefront curvature compensators 200D and 200E are constructed as one convex mirror 209 and one concave mirror 210 which are disposed in a Z shape.

Figure 24:
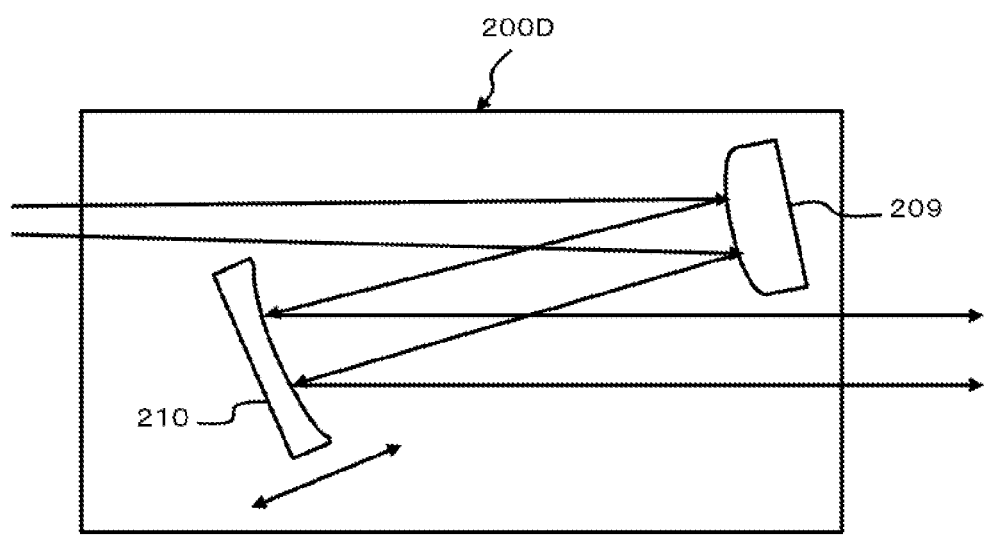
FIG. 24 is a diagram depicting a configuration of a wavefront curvature compensator according to the ninth embodiment.

FIG. 24 shows a wavefront curvature compensator 200D constituted by the spherical convex mirror 209 at the upstream side and the spherical concave mirror 210 at the downstream side in a Z shape. For example, if a laser beam of divergent light (convex wavefront) enters the convex mirror 209, the convex mirror 209 reflects the laser beam at an incident angle α that is 3 degrees or less. The reflected laser beam enters the concave mirror 210 at the incident angle α, and is transformed into parallel light (plane wave).

For example, as the arrow mark in FIG. 24 shows, the wavefront of the laser beam can be transformed into a plane wave by shifting the position of the concave mirror 210 along the reflection optical axis of the convex mirror 209.

Figure 25:
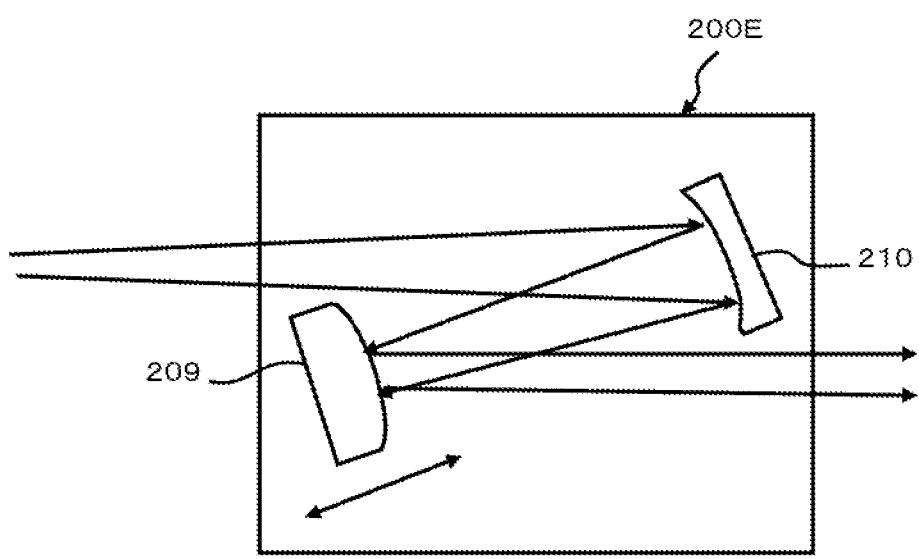
FIG. 25 is a diagram continuing from FIG. 24.

FIG. 25 shows a wavefront curvature compensator 200E constructed by the concave mirror 210 at the upstream side and the convex mirror 209 at the downstream side which are disposed in a Z shape. For example, if the laser beam of divergent light (convex wavefront) enters the concave mirror 210, the concave mirror 210 reflects the laser beam at small incident angle α (e.g. 3 degrees or less). The reflected laser beam enters the convex mirror 209 at the incident angle α, and is transformed into parallel light (plane wave). For example, the curvature of wavefront of the laser beam can be transformed into a plane by shifting the position of the convex mirror 209 along the reflection light axis of the concave mirror 210.

In this way, according to the present embodiment, the wavefront curvature compensator can be constituted by the convex mirror 209 and the concave mirror 210, so the manufacturing cost can be decreased. Since a reflection optical system is used, the change of wavefront generated when the laser beam passes through the wavefront curvature compensator can be minimized.

According to the present embodiment, the optical axis of the output laser beam parallel-shifts from the optical axis of the input laser beam. Hence an optical system for matching the optical axis of the output light with the optical axis of the input light may be added to the present embodiment.

Embodiment 10

Figure 26:
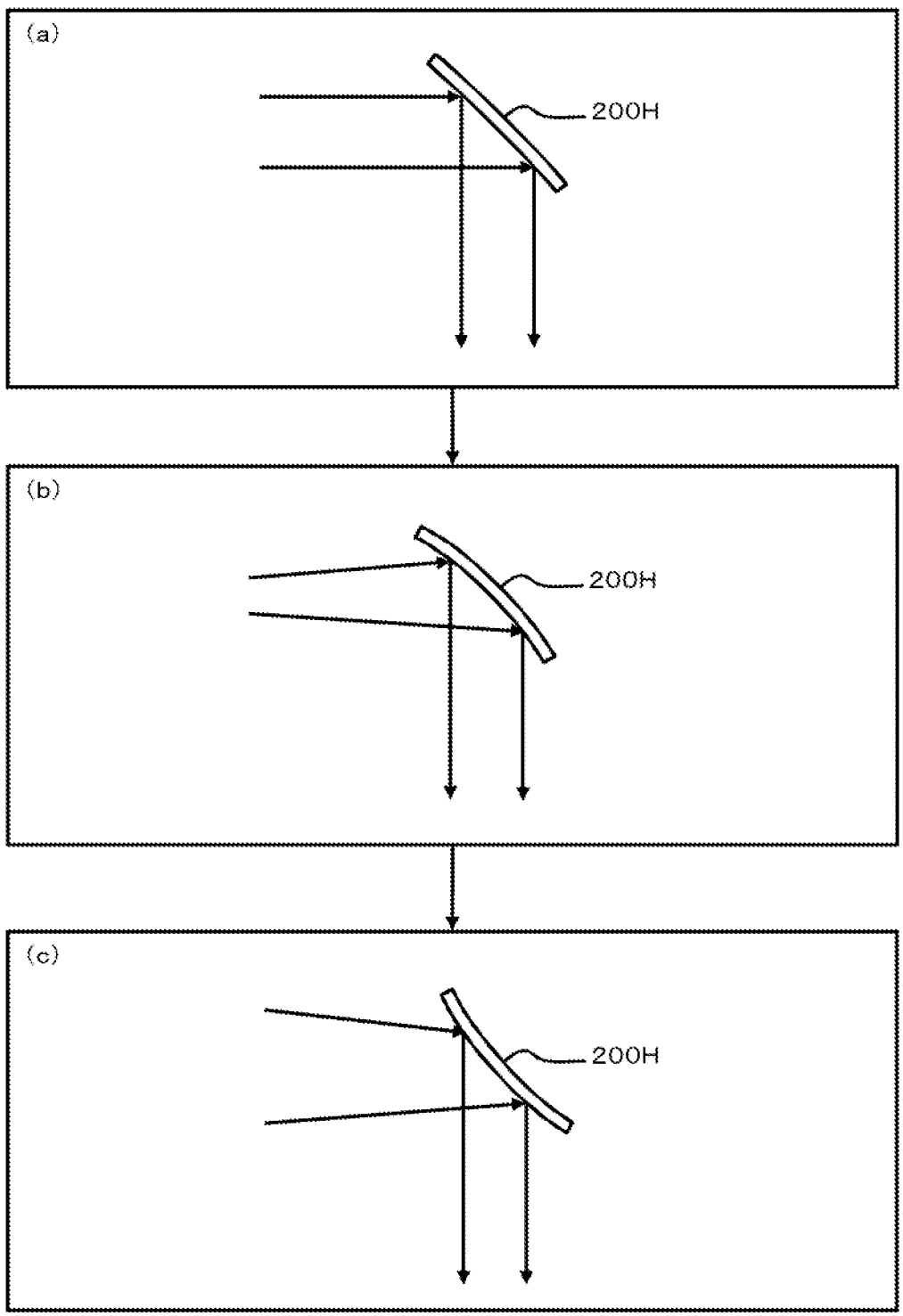
FIG. 26 are diagrams depicting a configuration of a wavefront curvature compensator according to the tenth embodiment.

The tenth embodiment will now be described with reference to FIG. 26. According to the present embodiment, a variable mirror that can variably control the curvature of the reflecting plane by a control signal from the wavefront compensation controller (WFC-C) 50 is used. Such a variable mirror is called a VRWM (Variable Radius Wavefront Mirror) in the present embodiment.

A wavefront curvature compensator 200H of the present embodiment is constituted by a VRWM which has a 45 degrees incident angle. FIG. 26A shows a case when the laser beam that enters as a plane wave (parallel light) is output as a plane wave (parallel light). When a plane wave is output as a plane wave, the surface of the VRWM is controlled to be flat.

FIG. 26B shows a case when the laser beam with a convex surface (divergent light) is transformed into a laser beam of a plane wave (parallel light). In this case, the shape of the VRWM is controlled to be a toroidal-shaped convex surface.

FIG. 26C shows a case when the laser beam with a concave surface (convergent light) is transformed into a laser beam of a plane wave (parallel light). In this case, the shape of the VRWM is controlled to be a toroidal-shaped convex surface.

According to the present embodiment having this configuration, the wavefront curvature compensator 200H can be constructed only by VRWM, so compactness can be achieved with fewer components, and efficiency is also high, since compensation is completed by reflection performed only once. Furthermore, the wavefront curvature compensator 200H of the present embodiment can shift the optical axis of the incident laser beam at 45 degrees, and output it. Therefore the wavefront curvature compensator 200H of the present embodiment can be used instead of a reflecting mirror for shifting the optical path of the laser beam by 45 degrees. A VRM with a 45 degrees incident angle is an optical element by which the mirror surface changes into a toroidal shape, and the plane wave is reflected with a 45 degrees incident angle, so that the wavefront can be transformed into a wavefront of a spherical surface with the desired radius of curvature.

Embodiment 11

Figure 27:
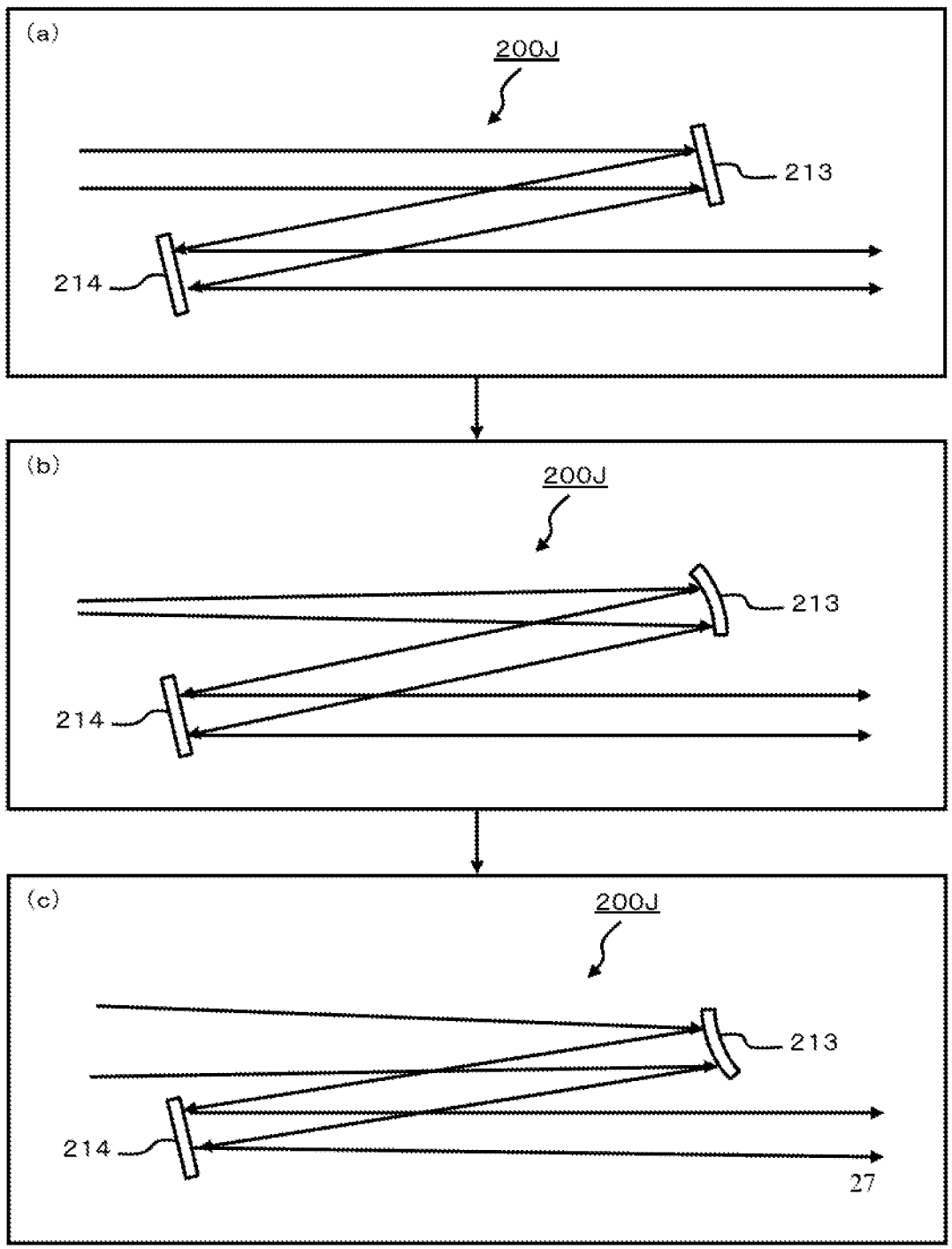
FIG. 27 are diagrams depicting a configuration of a wavefront curvature compensator according to the eleventh embodiment.

An eleventh embodiment will now be described with reference to FIG. 27. According to the present embodiment, a VRWM 213 that can change the surface of a mirror into a spherical shape with the desired radius of curvature and a reflecting mirror 214 are disposed in a Z shape, whereby a wavefront curvature compensator 200J is constructed.

As FIG. 27A shows, if the laser beam that enters the VRWM as a plane wave is output as a plane wave, the VRWM 213 is controlled to be a flat shape. As FIG. 27B shows, if the laser beam that enters as a convex wave is transformed into a plane wave, the shape of the VRWM 213 is set to be a concave spherical shape. As FIG. 27C shows, if the laser beam that enters as a concave wave is transformed into a plane wave, the shape of the VRWM is set to be a convex spherical shape.

The present embodiment having this configuration also exhibits similar effects as the tenth embodiment. According to the present embodiment, however, the incoming optical axis and the outgoing optical axis of the laser beam are parallel-shifted, and do not match. Hence an optical system to return the optical axis to its original state may be added to the present embodiment.

Embodiment 12

A twelfth embodiment will now be described with reference to FIG. 28. In the present embodiment, a wavefront compensator 34A, which can function as both an angle compensator and a wavefront curvature compensator, will be described. The wavefront compensator 34A has an VRWM 110 and a reflecting mirror 111.

FIG. 28A shows a case when the heat load is low. The laser beam of the plane wave enters the reflecting mirror 111 at 45 degrees and is reflected, and enters the VRWM 110 at a 45 degrees incident angle. The VRWM 110 is controlled to be a flat shape. The laser beam is reflected by a flat mirror surface of the VRWM 110, and is output in a state of a plane wave.

The present embodiment is not limited to the case of transforming the incoming light of the plane wave into an outgoing light of the plane wave. The focal distance of the VRWM can be controlled to be a constant value so that the laser beam that is input as divergent light (convex wavefront) is output as a laser beam having a wavefront with a desired curvature.

Figure 28:
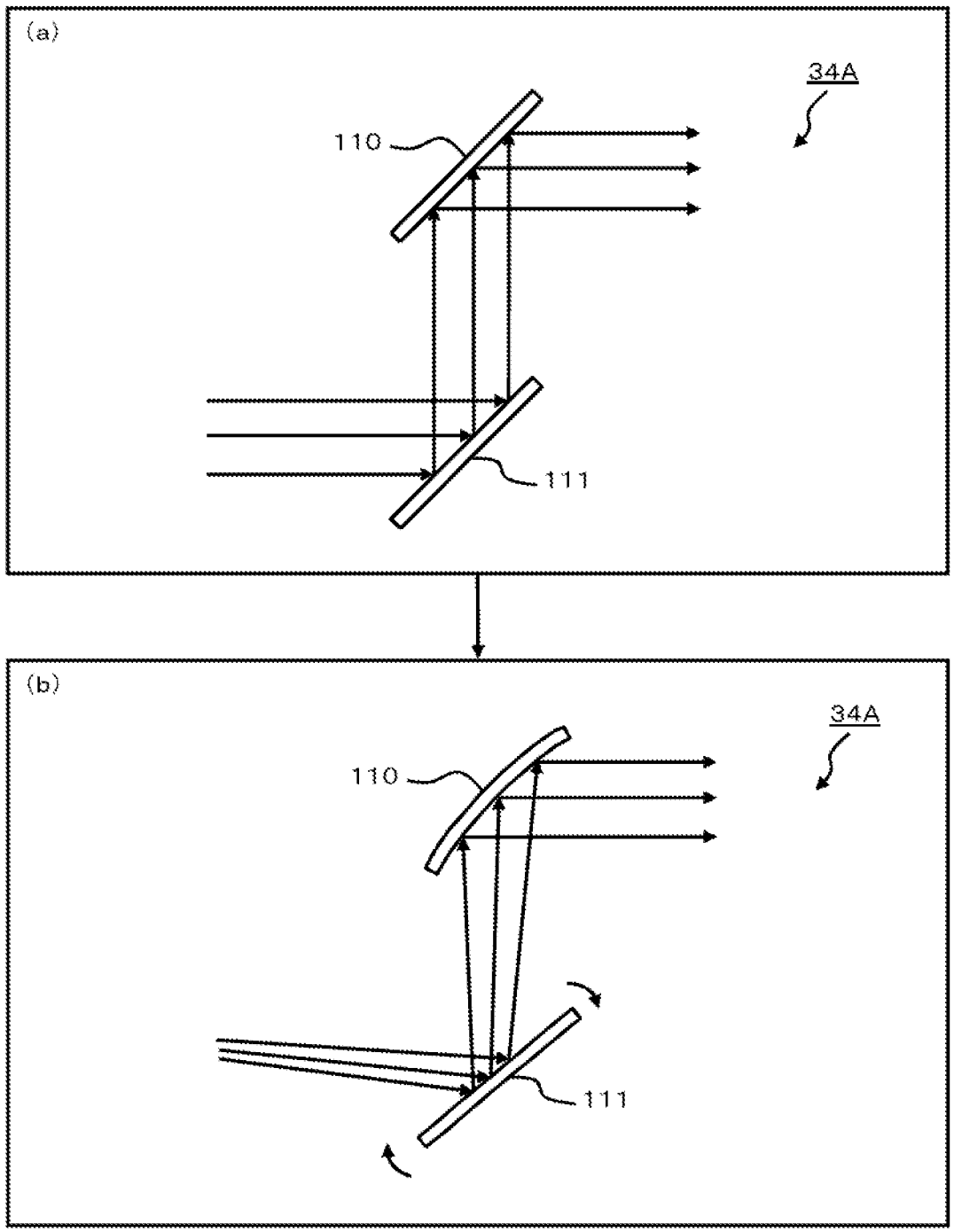
FIG. 28 are diagrams depicting a configuration of a wavefront compensator according to the twelfth embodiment.

FIG. 28B shows a case when the angle (direction) and wavefront curvature of the laser beam changed. It is assumed that the direction of the incoming laser beam inclines downward in FIG. 28, and the wavefront thereof changed to be divergent light (convex wavefront) due to the influence of a heat load. In this case, the angle of the reflecting mirror 111 is controlled so that the optical axis of the laser beam reflected by the reflecting mirror 111 matches with the reference optical axis.

The laser beam reflected by the reflecting mirror 111 enters the VRWM 110 at a 45 degrees incident angle. The shape of the VRWM 110 is set to be a toroidal concave shape, so that the laser beam reflected by the VRWM 110 becomes a plane wave.

The above is the case of transforming the laser beam of a convex wave into a plane wave, but the present invention is not limited to this. The laser beam of a concave wave could be transformed into a plane wave, or the incoming light of a convex wavefront or a concave wavefront could be transformed into an outgoing light having a wavefront with a desired curvature.

In the case of an incident angle which is within an allowable aberration, the optical axis of the outgoing light may be matched with the reference optical axis by controlling the angle of two axes, the horizontal direction and vertical direction, of the VRWM 110 (by controlling tilt and roll).

Embodiment 13

A thirteenth embodiment will now be described with reference to FIG. 29. In the present embodiment, a reflecting mirror 113 and a VRWM 112 are disposed in a Z shape, whereby a wavefront compensator 34B, which can function as both an angle compensator and a wavefront curvature compensator, is constructed. The incident angle is 2.5 degrees.

FIG. 29A shows a case when the heat load is low. The laser beam of the plane wave enters the reflecting mirror 113 at a 2.5 degrees incident angle and is reflected. The reflected laser beam enters the VRWM 112 as a 2.5 degrees angle. The shape of the VRWM 112 is controlled to be flat, so as to reflect the laser beam in a plane wave state. The case of a plane wave was described, but the present invention is not limited to this, but even when the convex wave or concave wave is input, for example, a laser beam having a wavefront with a predetermined curvature can be output by changing the shape of the VRWM 112.

Figure 29:
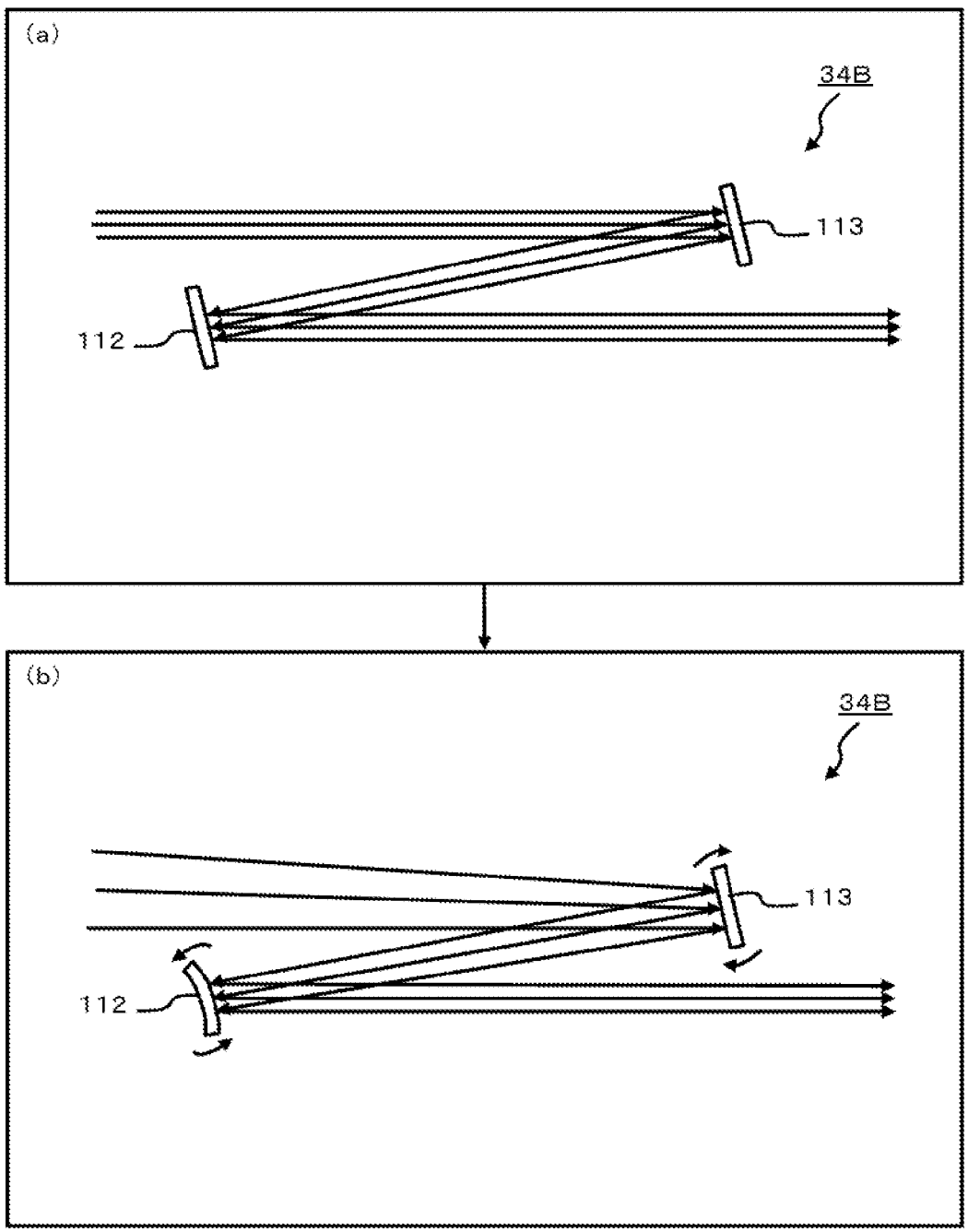
FIG. 29 are diagrams depicting a configuration of a wavefront compensator according to the thirteenth embodiment.

FIG. 29B shows a case when the heat load is high. The case when the angle of the incoming laser beam inclines downward in FIG. 29, and the wavefront of the laser beam becomes a convex wave will be described. In this case, the angle of the reflecting mirror 113 is changed so that the optical axis of the laser beam that is reflected by the reflecting mirror 113 matches with the reference optical axis (optical axis shown in FIG. 29A).

The light reflected by the reflecting mirror 113 enters the VRWM 112 at a 2.5 degrees incident angle. The shape of the VRWM 112 is changed to be a spherical convex shape, and the angle thereof is adjusted so that the laser beam reflected by the VRWM 112 becomes a plane wave. The present invention is not limited to transforming one wave into a plane wave, but the concave wave or convex wave may be transformed into a wavefront with a desired curvature and output. This is the same for each embodiment herein below.

Embodiment 14

A fourteenth embodiment will now be described with reference to FIG. 30. According to the present embodiment, a wavefront compensator 34C, which can function as both an angle compensator and a wavefront curvature compensator, is constructed by using two convex lenses 114 and 115. The convex lens 115 is disposed on a moving stage 117 for adjusting a position in a direction perpendicular to the optical axis (vertical direction in FIG. 30). This moving stage 117 is disposed on another moving stage 118 for adjusting a position in the optical axis direction. Therefore the convex lens 115 can move in both the axis direction and the direction perpendicular to the optical axis. The symbol 119 indicates a point where light transmitted through the convex lens 114 is focused (focal point).

FIG. 30A shows a case when the heat load is low. The laser beam of the plane wave transmits through the convex lens 114, and is focused to the focal position of the convex lens 114. The convex lens 115 is disposed so that the focal position of the convex lens 115 matches with the focal position of the convex lens 114 on a same optical axis. The light focused at the position becomes divergent light, and enters the convex lens 115, then is transformed into a plane wave by the convex lens 115, and is output.

Figure 30:
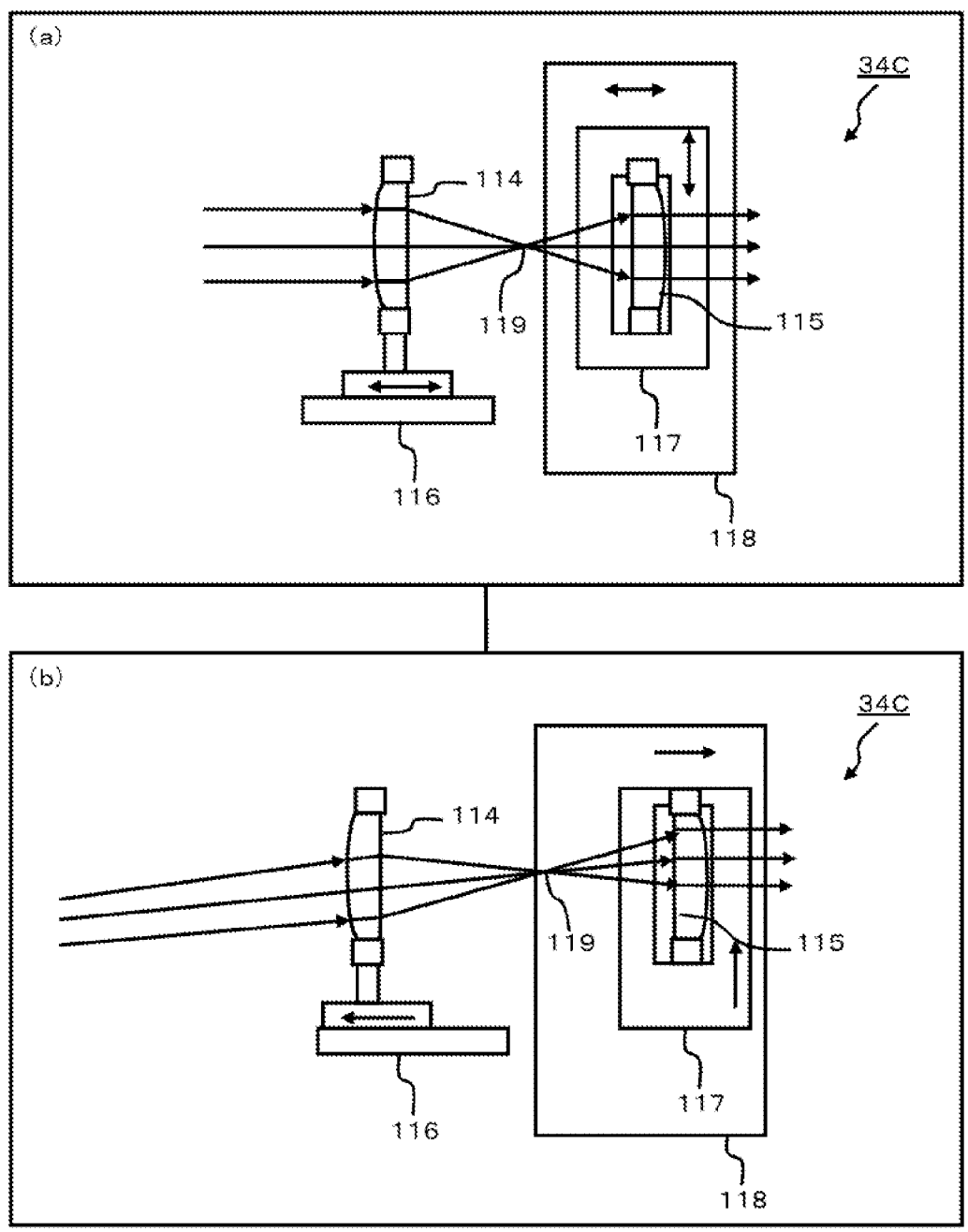
FIG. 30 are diagrams depicting a configuration of a wavefront compensator according to the fourteenth embodiment.

FIG. 30B shows a case when the heat load is high. Due to the influence of the head load, the entering direction of the laser beam is inclined diagonally upward, and the laser beam becomes divergent light (convex wavefront). The divergent light focuses more distant from the focal position of the convex lens 114. Therefore the position of the convex lens 114 is moved in the optical axis direction (horizontal direction in FIG. 30) so that this focal point 119 and the front side focal point of the convex lens 115 match. The convex lens 115 is moved in a direction perpendicular to the optical axis (vertical direction in FIG. 30). Thereby the outgoing direction of the laser beam is matched with the reference optical axis direction. The laser beam that passed through the convex lens 114 enters the convex lens 115 and is transformed into a plane wave, and is output along the reference optical axis.

The present invention is not limited to combining the convex lens 114 and the convex lens 115, but the wavefront compensator 34, for executing angle compensation and wavefront curvature compensation, may be constituted by one convex lens and one concave lens which are combined.

Embodiment 15

A fifteenth embodiment will now be described with reference to FIG. 31. In the present embodiment, a wavefront compensator 34D, which can function as both an angle compensator and a wavefront curvature compensator, is constructed using a deformable mirror 120 and a reflecting mirror 121.

Figure 31:
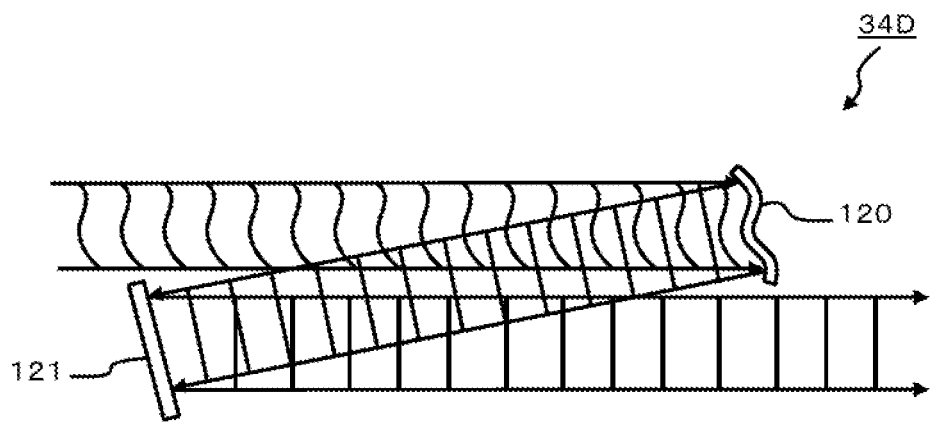
FIG. 31 is a diagram depicting a configuration of a sensor according to the fifteenth embodiment.

As FIG. 31 shows, the deformable mirror 120 and the reflecting mirror 121 are disposed in a Z shape. The shape of the reflecting plane of the deformable mirror 120 can be variably controlled according to the control signal that is input from the wavefront compensation controller 50.

When the laser beam having a deformed wavefront enters the deformable mirror 120, the reflecting plane shape of the deformable mirror 120 is adjusted according to this wavefront that enters. The deformable mirror 120 compensates the wavefront of the incoming laser beam to be a plane wave, and reflects it. The laser beam compensated to be a plane wave is reflected by the reflecting mirror 121, and is output.

By using the deformable mirror 120, even a wavefront that is not spherical, for example an S-shaped wavefront, can be transformed into a plane wave or desired spherical wave. If the angle is small, the direction of the laser beam can also be compensated. The direction of the laser beam can also be adjusted by controlling the tilt and roll of the reflecting mirror 121 and the deformable mirror 120 respectively. This is the same for Embodiment 16.

Embodiment 16

Figure 32:
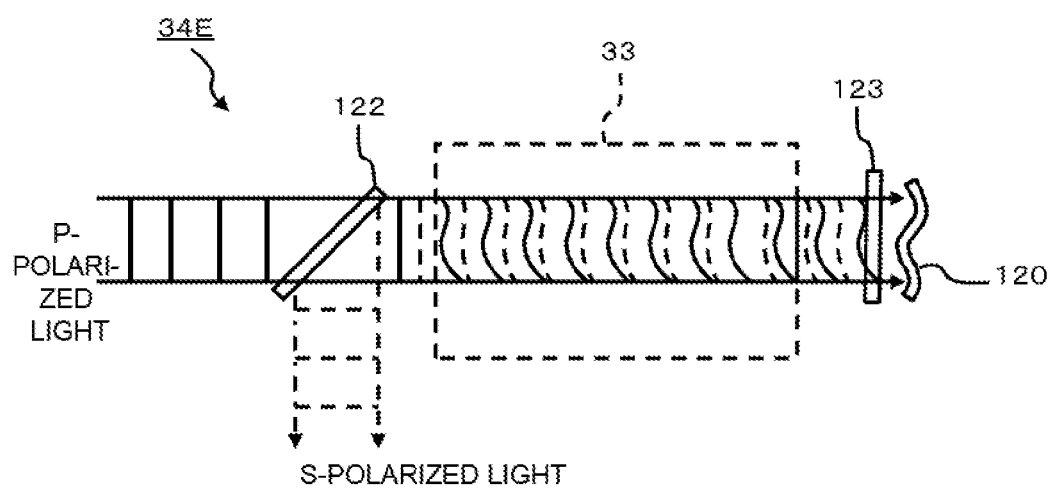
FIG. 32 is a diagram depicting a configuration of a sensor according to the sixteenth embodiment.

A sixteenth embodiment will now be described with reference to FIG. 32. According to the present embodiment, a deformable mirror 120 and polarization control are combined to construct a wavefront compensator 34E. The wavefront compensator 34E has a deformable mirror 120, beam splitter 122 and λ/4 plate 123. The SA device 33 can be disposed between the beam splitter 122 and the λ/4 plate 123.

For example, a laser beam of P-polarized light (polarization plane including page face) enters a beam splitter 122 in which a film, for separating P-polarized light and S-polarized light, is disposed. It is assumed that the wavefront of the laser beam is input to the beam splitter 122 in a state of a plane wave. And it is assumed that the wavefront is deformed to be S-shaped by passing through the SA device 33 from the beam splitter 122.

The laser beam that passed through the SA device 33 transmits through the λ/4 plate 123, whereby the laser beam is circularly polarized. The wavefront deformed in an S shape is compensated to be a predetermined wavefront by the deformable mirror 120, which is adjusted to be an appropriate shape.

The laser beam of which wavefront is compensated transmits through the λ/4 plate 123 again, and is transformed to an S-polarized light. The S-polarized laser beam transmits through the SA device 33, and the predetermined wavefront is transformed to be a plane wave. The laser beam transformed into a plane wave enters the beam splitter 122. The S-polarized laser beam is reflected by the beam splitter 122, and is output as a plane wave. The laser beam could also be output with a desired wavefront profile other than a plane wave by adjusting the surface shape of the deformable mirror 122.

Embodiment 17

Figure 33:
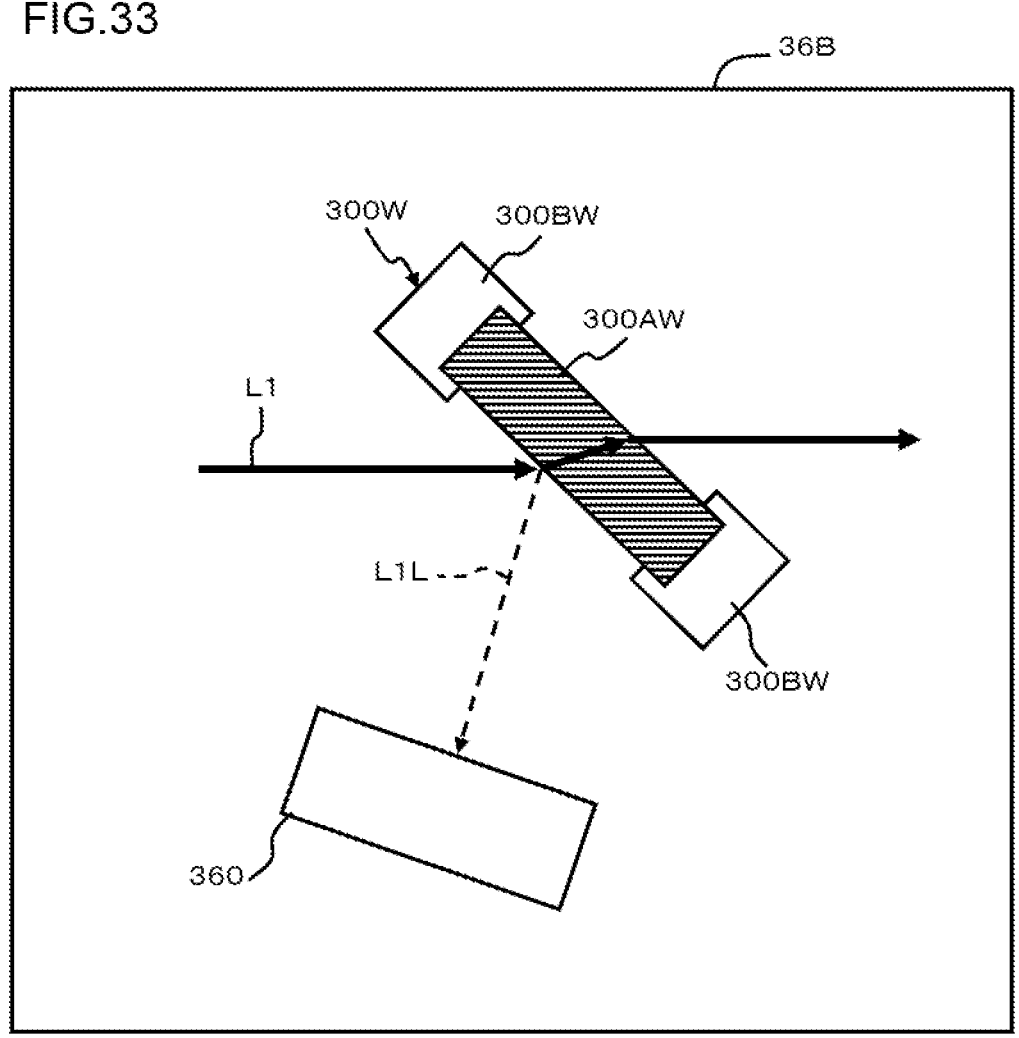
FIG. 33 is a diagram depicting a configuration of a sensor according to the seventeenth embodiment.

A seventeenth embodiment will now be described with reference to FIG. 33. In the present embodiment, a sensor 36B is constructed using a window 300W. The window 300W has a window substrate 300AW, and a holder 300BW for holding the window substrate 300AW. The holder 300BW has a water cooling jacket, which is not illustrated.

The window 300W is disposed on the optical axis of the driver laser beam in an inclined state. A very small part of the laser beam reflected on the surface of the window 300W enters the optical sensor unit 360 as a sample light.

For the window 300W, the window of the amplifier 32 or 35, or the window 13 of the EUV chamber 10 can also be used. In this case, it is unnecessary to dispose a window only for receiving the sample light for measurement, and manufacturing cost can be decreased. The window substrate 300A is constituted by a material having high thermal conductivity that transmits $CO_2$ laser beam, such as diamond, for example.

On the plane-parallel window 300W, a small part of a laser beam is reflected on both the front face and rear face, and enters the optical sensor unit 360 as sample light. Therefore this is not appropriate for measuring the beam profile. However if the sample light is focused at the focal position by a focusing lens, the position of the focal image can be measured, and the angle (direction) of the laser beam and the divergent angle of the beam can be measured. The duty and power of the laser beam line can also be measured without problem.

Embodiment 18

Figure 34:
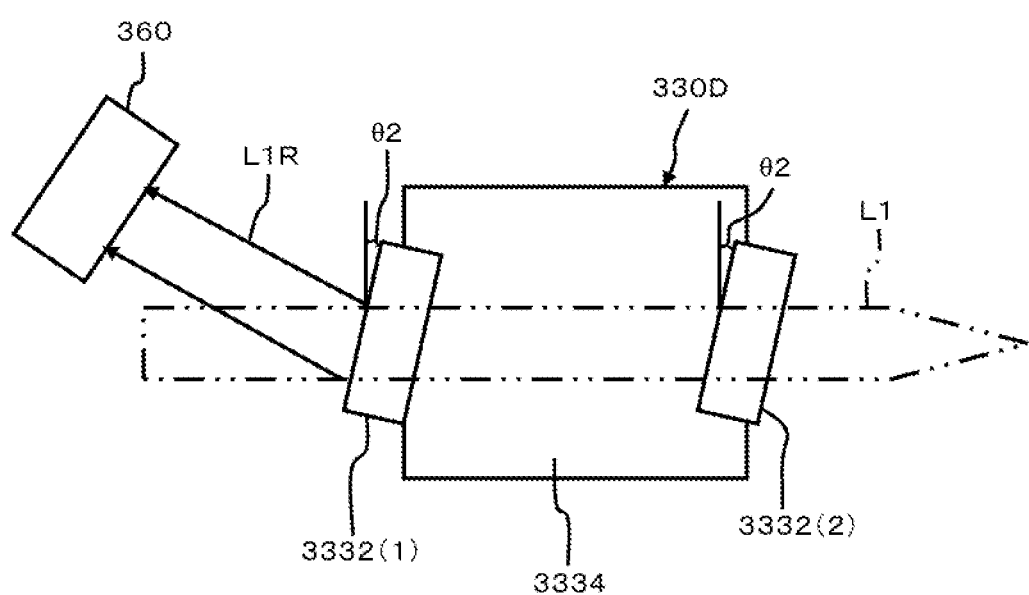
FIG. 34 is a diagram depicting a configuration of a sensor according to the eighteenth embodiment.

An eighteenth embodiment will now be described with reference to FIG. 34. In the present embodiment, light that is reflected by the entering window 3332 (1) of the SA gas cell 330 is measured by the optical sensor unit 360. In order to measure the reflected light, the window 3332 (1) is inclined at angle θ2 from the vertical direction.

According to the present embodiment, a dedicated optical element for sampling the laser beam is not required, but the window 3332 (1) is used, so laser beam loss can be minimized and cost can be decreased.

Embodiment 19

Figure 35:
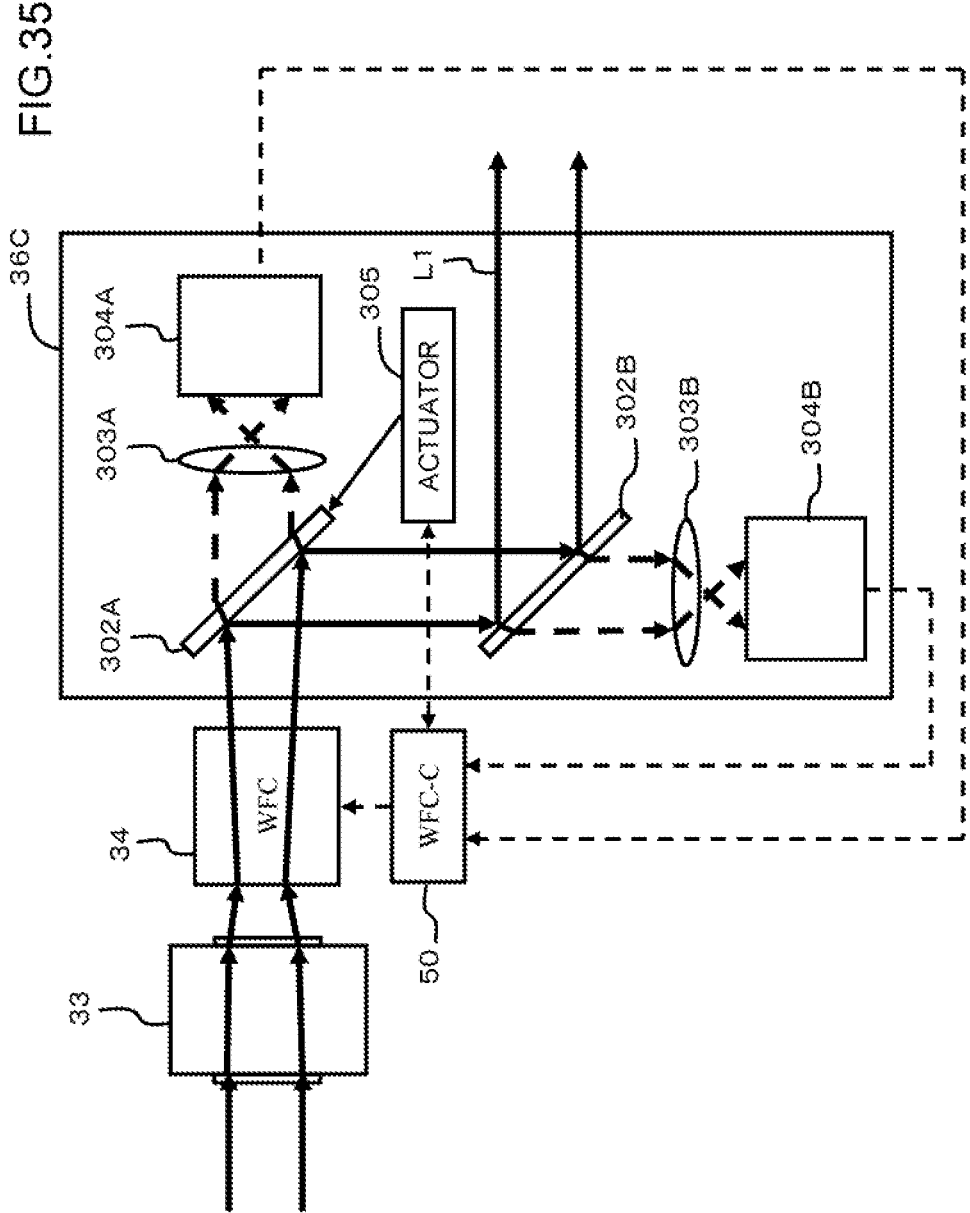
FIG. 35 is a diagram depicting a configuration of a sensor according to the nineteenth embodiment.

A embodiment will now be described with reference to FIG. 35. According to the present embodiment, a sensor 36C is constructed using beam profilers 304A and 304B. According to the present embodiment, a profile of the laser beam is detected by a transmitted light beam profiler 304A of the reflecting mirror 302A, and the transmitted light of the reflecting mirror 302B is detected by the beam profiler 304B. The wavefront compensator (WFC) 34 is adjusted according to the measurement result of the beam profiler.

A lens 303A is disposed between the rear face side of the reflecting mirror 302A and the beam profiler 304A. In the same way, a lens 303B is disposed between the rear face side of the reflecting mirror 302B and the beam profiler 304B.

The laser beam of the plane wave transmits through the relay optical system 31, and transmits through the SA device 33, whereby the direction of the laser beam and the curvature of the wavefront change. The laser beam, of which direction and wavefront curvature changed, enters the wavefront compensator (WFC) 34. The wavefront compensator (WFC) 34 compensates the wavefront curvature and the angle (direction) of the laser beam, and outputs the laser beam.

The laser beam compensated by the wavefront compensator (WFC) 34 is reflected by the reflecting mirror 302A and enters the reflecting mirror 302B. Meanwhile, a small part of the sample light that transmits through the reflecting mirror 302A is transferred onto a two-dimensional sensor of the beam profiler 304A by a transfer lens 303A. By this two-dimensional sensor, the beam profile and position of the laser beam are measured.

The measured data from the beam profiler 304A is input to the wavefront compensation controller (WFC-C) 50. The wavefront compensation controller (WFC-C) 50 sends a control signal to the wavefront compensator (WFC) 34 so that the position of the laser beam comes to the reference position.

A small part of the light transmitted through the reflecting mirror 302B, on the other hand, is transferred onto the two-dimensional sensor of the beam profiler 304B by the transfer lens 303B. The two-dimensional sensor measures the beam profile and position of the laser beam.

The data measured by the beam profiler 304B is input to the wavefront compensation controller (WFC-C) 50. The wavefront compensation controller (WFC-C) 50 outputs a control signal to the actuator 305 for adjusting the angle of the reflecting mirror 302A, and controls the angle of the reflecting mirror 302A so that the position of the laser beam measured by the beam profiler 304B comes to the reference position. The wavefront compensation controller 50 also sends a control signal to the WFC so that the laser beam profile becomes a predetermined value, in order to control the curvature of the wavefront of the laser beam.

In the present embodiment having this configuration, the beam profilers 304A and 304B are disposed at the side, where the laser beam transmits through the reflecting mirrors 302A and 302B (rear side of the reflecting mirrors), so the sensor 36C can be compactly constructed. Also influence of the measurement optical system shown in FIG. 37 on the wavefront of the driver laser beam can be minimized.

Embodiment 20

Figure 36:
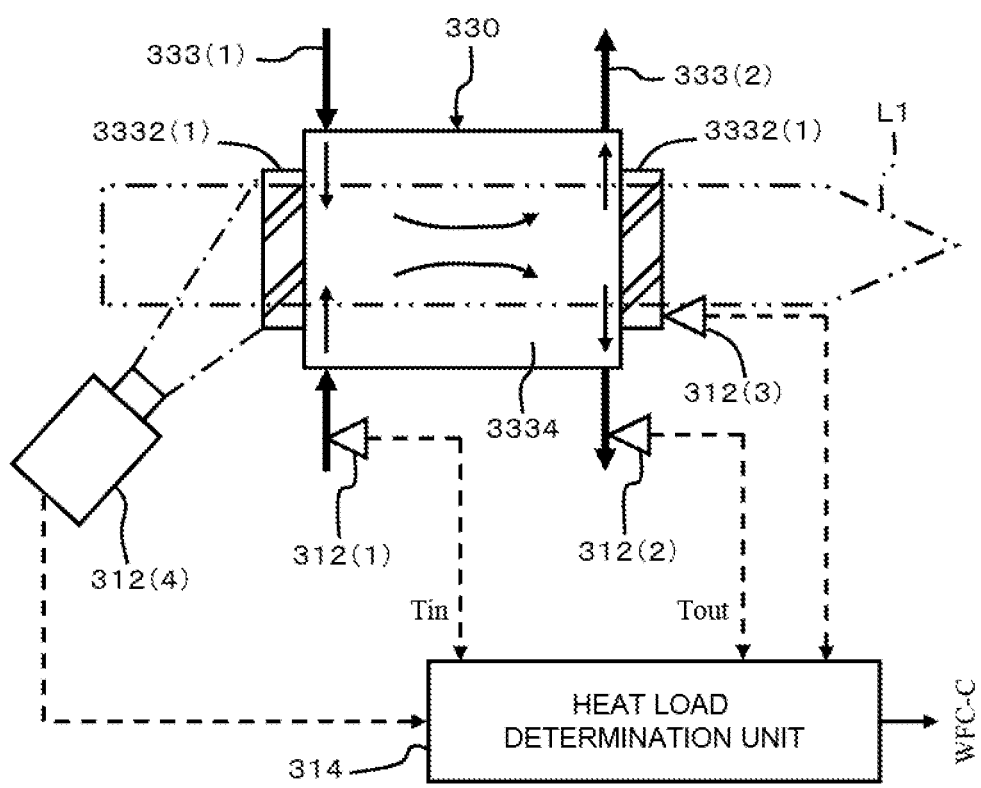
FIG. 36 is a diagram depicting a configuration of a sensor according to the twentieth embodiment.

A twentieth embodiment will now be described with reference to FIG. 36. According to the present embodiment, one or more of temperature sensors 312 (1) to 312 (4) are disposed in the SA gas cell 330, and the temperature distribution of the windows 3332 (1) and 3332 (2) is directly or indirectly measured.

The first temperature sensor 312 (1) measures the temperature of the mixed gas that flows into the flow space 3334 in the SA gas cell 330. The first temperature sensor 312 (1) can be disposed in the middle of the supply pipeline 333 (1) or at the inlet connected to the supply pipeline 333 (1), for example. The second temperature sensor 312 (2) measures the temperature of the mixed gas that is exhausted from the flow space 3334. The second temperature sensor 312 (2) can be disposed in the middle of the exhaust pipeline 333 (2) or at the outlet connected to the exhaust pipeline 333 (2), for example.

The heat load determination unit 314 can calculate calories Q from the difference between the temperature Tin at the inlet side and the temperature Tout at the output side (Q=k (Tout−Tin): k is a proportional constant). Calories Q correspond to the quantity of light absorbed by the mixed gas. Based on these calories Q, the state of the heat load of the SA gas cell 330 can be calculated. The heat load determination unit 314 outputs the calculation result to the wavefront compensation controller 50.

The third temperature sensor 312 (3) detects the temperature around the edge of the output window 3332 (1), and outputs it to the heat load determination unit 314. The third temperature sensor 312 (3) is constructed as a contact type temperature sensor, such as a semiconductor temperature sensor or thermocouple. The heat load determination unit 314 can measure the state of the heat load of the SA gas cell 330 based on this temperature.

The fourth temperature sensor 312 (4) is a non-contact type temperature sensor, and measures the surface temperature of the input window 3332 (1) at a distant location. The fourth temperature sensor 312 (4) is, for example, a radiation thermometer. Based on the temperature and the temperature distribution detected by the fourth temperature sensor 312 (4), the heat load determination unit 314 measures the state of the heat load of the SA gas cell 330.

Embodiment 21

Figure 37:
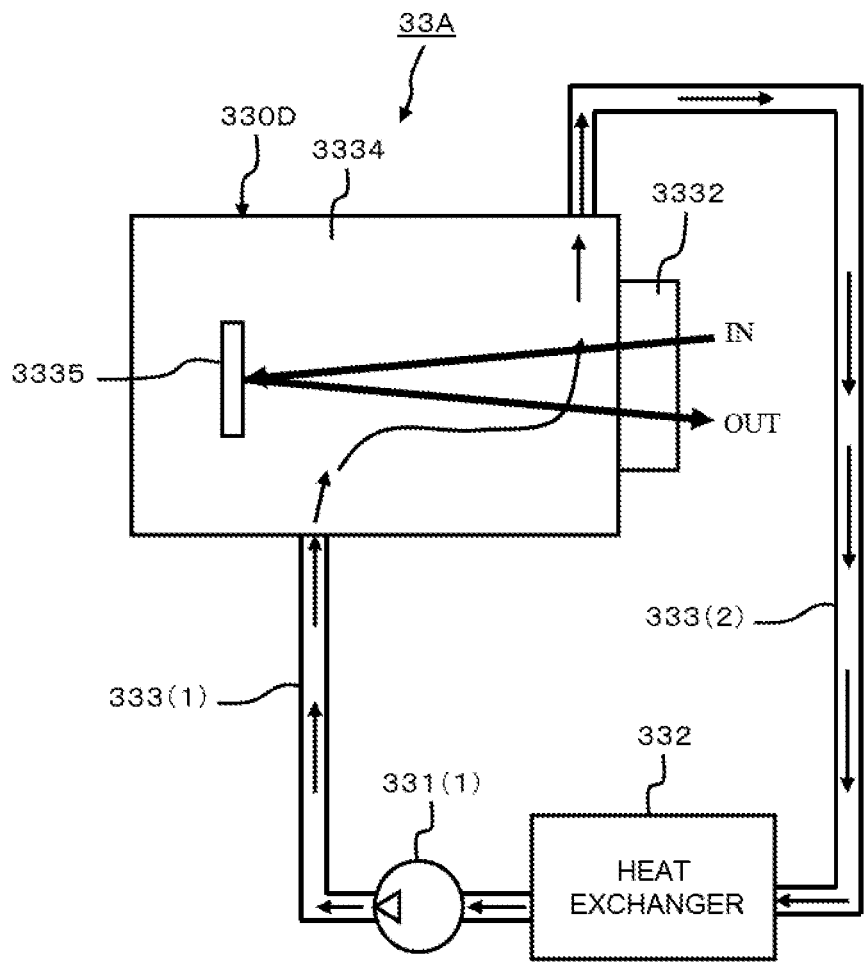
FIG. 37 is a diagram depicting a configuration of an SA device according to the twenty first embodiment.

A twenty first embodiment will now be described with reference to FIG. 37. According to the present embodiment, the input window and the output window are constructed as a common window, and a reflection optical system 3335, for reflecting the incoming laser beam, is disposed in the flow space 3334.

The SA gas cell 330D of the SA device 33A has a single window 3332 on one side. This single window 3332 is a diamond window, for example, and has both functions of the input window and reflecting window. A high reflection mirror 3335 is disposed in the SA gas cell 330D, so as to face the window 3332. The high reflection mirror 3335 is installed so that the laser beam enters and is reflected at a small incident angle. The installation angle of the high reflection mirror 3335 may be set to a value whereby the incoming beam of the laser and the reflecting beam of the laser are separated outside the saturable absorption cell. The high reflection mirror 3335 is a mirror that reflects the laser beam at high reflectance. In the high reflection mirror 3335, a cooling mechanism (not illustrated) using cooling water is disposed so that the mirror is not deformed by the heat of the laser beam.

The laser beam enters the flow space 3334 via the window 3332, and is reflected by the high reflection mirror 3335. The reflected laser beam passes through the window 3332, which was passed when entering, and is output to the outside of the SA gas cell 330D.

According to the present embodiment, as described above, the laser beam is reflected back to the SA gas cell 330D, so one window 3332 can be used as the input window and output window. Hence the SA gas cell 330D can be manufactured by using only one diamond window, which is expensive, the manufacturing cost can be decreased.

Embodiment 22

Figure 38:
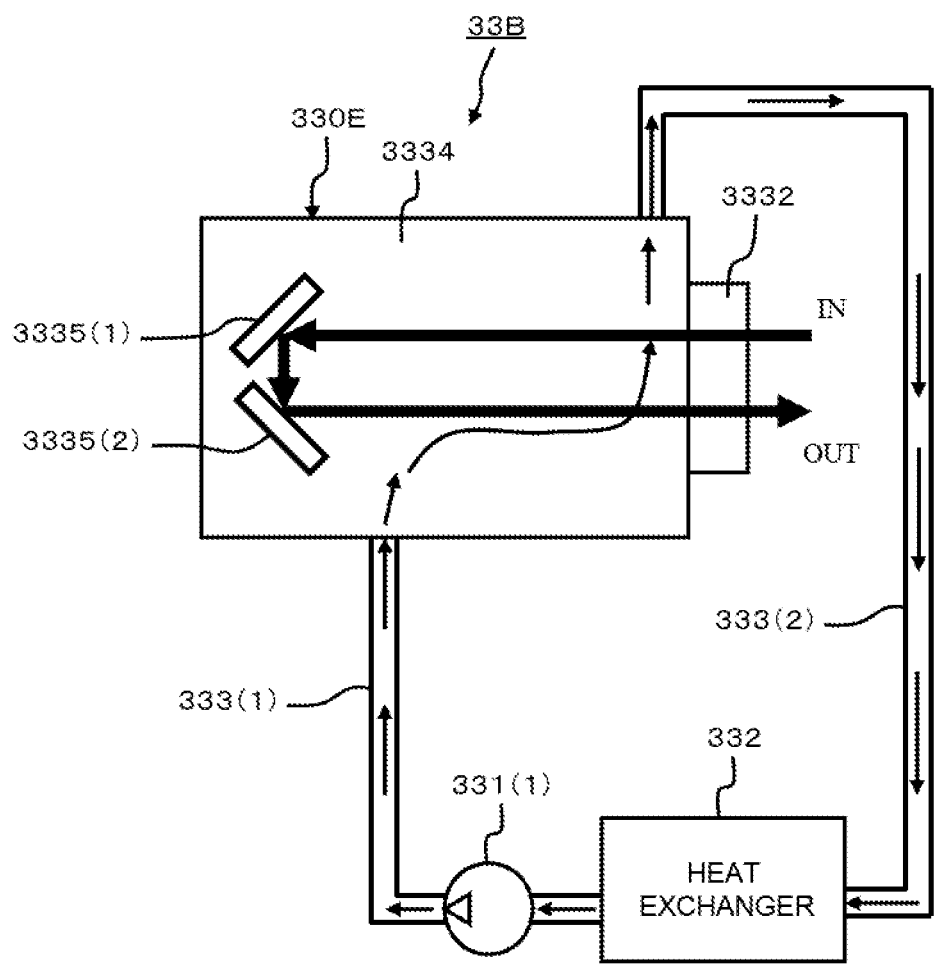
FIG. 38 is a diagram depicting a configuration of an SA device according to the twenty second embodiment.

A twenty second embodiment will now be described with reference to FIG. 38. In the SA device 33B of the present embodiment, two high reflection mirrors 3335 (1) and 3335 (2), with a 45 degrees incident angle, are used in the SA gas cell 330E. A cooling mechanism (not illustrated) is also disposed in each high reflection mirror 3335 (1) and 3335 (2).

Each high reflection mirror 3335 (1) and 3335 (2) are disposed inclined 45 degrees respectively from the optical axis of the laser beam, so as to reflect the laser beam that enters from the window 3332 toward the window 3332. The present embodiment having this configuration also exhibits the same effects as the twenty first embodiment.

The present invention is not limited to an individual embodiment. Those skilled in the art could add and change in various ways within the scope of the present invention. Configurations appropriately combining the above embodiments shall be included in the scope of the present invention.

What is claimed is:

1. An extreme ultraviolet light source device for generating extreme ultraviolet light, the device comprising:
a target material supply unit for supplying target material into a chamber;
a laser oscillator for outputting a pulse laser beam;
at least two amplifiers for amplifying the laser beam that is output from the laser oscillator;
a focusing optical system for irradiating the laser beam after the amplification onto the target material by focusing the laser beam, which is amplified by the amplifier and is output, to a predetermined position in the chamber; and
a saturable absorber device, disposed on an optical path between the laser oscillator and the predetermined position, for absorbing at least a laser beam having a light intensity not greater than a predetermined value and suppressing laser beam transmission, the saturable absorber device comprising:
a saturable absorber cell having a main body unit that has a flow space where the saturable absorber flows,
an inlet for letting the saturable absorber enter the flow space,
an outlet for letting the saturable absorber out from the flow space,
a window constituted by diamonds for passing the output laser beam from the laser oscillator to the flow space,
a mirror disposed in the flow space to reflect the laser beam traveling through the window, and
a cooling mechanism configured to cool the mirror.

2. A pulse laser device, comprising:
a laser oscillator for outputting a pulse laser beam;
at least two amplifiers for amplifying the laser beam that is output from the laser oscillator; and
a saturable absorber device, disposed on an optical path between the laser oscillator and the amplifier, or on an optical path between the amplifiers, for absorbing at least a laser beam having light intensity not greater than a predetermined value and suppressing laser beam transmission, the saturable absorber device comprising:
a saturable absorber cell having a main body unit that has a flow space where the saturable absorber flows;
an inlet for letting the saturable absorber enter the flow space;
an outlet for letting the saturable absorber out from the flow space;
a window for passing the output laser beam from the laser oscillator to the flow space;
a mirror disposed in the flow space to reflect the laser beam traveling through the window,
a cooling mechanism configured to cool the mirror;
a pipeline for connecting the inlet and the outlet;
a transport unit, disposed in the middle of the pipeline, for transporting the saturable absorber that flows out of the outlet, so as to flow into the flow space via the inlet; and
a temperature adjustment unit, disposed in the middle of the pipeline, for adjusting temperature of the saturable absorber transported by the transporting unit.

3. A laser device comprising:
an oscillator configured to output a laser beam;
amplifiers configured to amplify the laser beam from the oscillator;
a gas cell disposed between the oscillator and one of the amplifiers or between the amplifiers; and
a reservoir for a gas including a nitrogen gas or a rare gas, wherein
the gas cell includes:
an inlet through which the gas flows into the gas cell;
an outlet through which the gas flows out from the gas cell;
a first window through which the laser beam is introduced into the gas cell;
a mirror disposed in the gas cell to reflect the laser beam introduced through the window; and
a cooling mechanism configured to cool the mirror.

4. The laser device according to claim 3, wherein the gas further includes any one of $SF_6$, $CH_3OH$, $CH_3F$, $HCOOH$, $CD_3OD$, $CD_3F$, $DCOOD$, and $C_2F_2Cl$, where D is deuterium.

5. The laser device according to claim 3, wherein the gas cell further includes:
a path for connecting the inlet and the outlet;
a circulation mechanism configured to circulate the gas from the inlet through the gas cell and the outlet to the inlet; and
a temperature control mechanism configured to control a temperature of the gas.

6. The laser device according to claim 5, wherein the temperature control mechanism comprises a heat exhausting device configured to exhaust heat absorbed by the gas and a controller configured to control the temperature of the gas.

7. The laser device according to claim 3, wherein the mirror comprises at least one of a concave mirror, a convex mirror, a spherical concave mirror, a spherical convex, an off-axis parabolic concave mirror, and an off-axis parabolic convex mirror.

8. The laser device according to claim 3, wherein the mirror comprises at least one of a flat mirror, a concave mirror, a convex mirror, a spherical concave mirror, a spherical convex, an off-axis parabolic concave mirror, and an off-axis parabolic convex mirror.

9. The laser device according to claim 3, wherein the mirror is movably supported.

10. The laser device according to claim 3, further comprising a second window though which the laser beam is output from the gas cell.

11. The laser device according to claim 3, further comprising an exhaust pump configured to exhaust the gas from the gas cell.

12. An extreme ultraviolet light source device for generating extreme ultraviolet light, the device comprising:
    a chamber;
    a target material supply configured to supply target material into the chamber;
    an oscillator configured to output a laser beam;
    amplifiers configured to amplify the laser beam from the oscillator;
    a focusing optical system configured to focus the laser beam amplified by the amplifiers to a spot in the chamber where the target material is irradiated with the amplified laser beam; and
    a gas cell disposed in an optical path of the laser beam between the oscillator and the spot in the chamber; and
    a reservoir for a gas including a nitrogen gas or a rare gas, wherein
    the gas cell includes:
        an inlet through which the gas flows into the gas cell;
        an outlet through which the gas flows out from the gas cell;
        a first window through which the laser beam is introduced into the gas cell;
        a mirror disposed in the gas cell to reflect the laser beam introduced through the window; and
        a cooling mechanism configured to cool the mirror.

13. The extreme ultraviolet light source device according to claim 12, wherein the gas further includes any one of $SF_6$, $CH_3OH$, $CH_3F$, $HCOOH$, $CD_3OD$, $CD_3F$, $DCOOD$, and $C_2F_2Cl$, where D is deuterium.

14. The extreme ultraviolet light source device according to claim 12, wherein the gas cell further includes:
    a path for connecting the inlet and the outlet;
    a circulation mechanism configured to circulate the gas from the inlet through the gas cell and the outlet to the inlet; and
    a temperature control mechanism configured to control a temperature of the gas.

15. The extreme ultraviolet light source device according to claim 12, wherein the temperature control mechanism comprises a heat exhausting device configured to exhaust heat absorbed by the gas and a controller configured to control the temperature of the gas.

16. The extreme ultraviolet light source device according to claim 12, wherein the mirror comprises at least one of a concave mirror, a convex mirror, a spherical concave mirror, a spherical convex, an off-axis parabolic concave mirror, and an off-axis parabolic convex mirror.

17. The extreme ultraviolet light source device according to claim 12, wherein the mirror comprises at least one of a flat mirror, a concave mirror, a convex mirror, a spherical concave mirror, a spherical convex, an off-axis parabolic concave mirror, and an off-axis parabolic convex mirror.

18. The extreme ultraviolet light source device according to claim 12, wherein the mirror is movably supported.

19. The extreme ultraviolet light source device according to claim 12, further comprising a second window though which the laser beam is output from the gas cell.

20. The extreme ultraviolet light source device according to claim 12, further comprising an exhaust pump configured to exhaust the gas from the gas cell.

* * * * *